US012373851B2

(12) United States Patent
Roper, Jr. et al.

(10) Patent No.: US 12,373,851 B2
(45) Date of Patent: Jul. 29, 2025

(54) ARCHITECTURE FOR QUANTIFYING AVOIDED CARBON EMISSIONS IN A DIGITAL ENGINEERING PLATFORM

(71) Applicant: Istari Digital, Inc., Charleston, SC (US)

(72) Inventors: William Roper, Jr., Charleston, SC (US); Christopher Lee Benson, Arlington, VA (US); Sriram Krishnan, Cambridge, MA (US); Baha aldeen E. A. Abunojaim, Roslindale, MA (US); Danne Stayskal Huffaker, Eastsound, WA (US); Ellie Daw, Kirkland, WA (US)

(73) Assignee: Istari Digital, Inc., Charleston, SC (US)

( * ) Notice: Subject to any disclaimer, the term of this patent is extended or adjusted under 35 U.S.C. 154(b) by 0 days.

(21) Appl. No.: 18/920,709

(22) Filed: Oct. 18, 2024

(65) Prior Publication Data
US 2025/0131453 A1 Apr. 24, 2025

Related U.S. Application Data

(60) Provisional application No. 63/545,113, filed on Oct. 20, 2023.

(51) Int. Cl.
G06Q 30/018 (2023.01)
(52) U.S. Cl.
CPC ................. G06Q 30/018 (2013.01)
(58) Field of Classification Search
CPC .................................. G06Q 30/018
See application file for complete search history.

(56) References Cited

U.S. PATENT DOCUMENTS 8,756,441 B1 * 6/2014 Mullins ................ G06F 1/3209
713/320
10,382,380 B1 * 8/2019 Suzani .................... H04L 51/23
(Continued)

FOREIGN PATENT DOCUMENTS

WO WO-2022011411 A1 * 1/2022
WO WO 2024163759 A1 8/2024
(Continued)

OTHER PUBLICATIONS

[No Author Listed], "Department of Defense Handbook, Airworthiness Certification Criteria," MIL-HDBK-516C 4.1.4 & 5.2 failure conditions, Dec. 12, 2014, 527 pages.
(Continued)

Primary Examiner — Jan P Mincarelli
(74) Attorney, Agent, or Firm — Fish & Richardson P.C.

(57) ABSTRACT

Methods, systems, and apparatus, including computer programs encoded on computer storage media, for quantifying avoided carbon emissions. The approach includes receiving, from a client device in communication with a digital platform, a request to execute a task by the digital platform. A token is assigned by the digital platform, the token is configured to uniquely identify the received request to execute the task using the digital platform. The digital platform receives a first value representing a baseline execution cost associated with executing the task. The digital platform determines, using the assigned token and based on execution of the task using the digital platform, a second value representing a reduction in execution cost attained by using the digital platform. The digital platform generates, based on a comparison of the second value to the first value, an attained execution reduction cost associated with the execution of the task by the digital platform.

28 Claims, 26 Drawing Sheets

(56) References Cited

U.S. PATENT DOCUMENTS

| | | |
|---|---|---|
| 11,775,707 B1 | 10/2023 | Roper, Jr. et al. |
| 2019/0197448 A1 | 6/2019 | Nelaturi et al. |
| 2021/0349851 A1* | 11/2021 | Gebhart ................ G06F 16/144 |
| 2022/0222654 A1 | 7/2022 | Pronski et al. |

FOREIGN PATENT DOCUMENTS

| | | |
|---|---|---|
| WO | WO 2024186709 A1 | 9/2024 |
| WO | WO 2024191882 A2 | 9/2024 |
| WO | WO 2024253782 A1 | 12/2024 |
| WO | WO 2025029343 A1 | 2/2025 |

OTHER PUBLICATIONS

[No Author Listed], "EN 1090—part 1-5, Execution of steel structures and aluminum structures," European Standards, 2012, 7 pages (abstract only).

[No Author Listed], "IEC 60601-1-11:2015, Medical electrical equipment," International Organization for Standardization, Jan. 2015, 109 pages (abstract only).

[No Author Listed], "IEC 62304:2006, Medical device software, Software life cycle processes," International Organization for Standardization, May 2006, 151 pages (abstract only).

[No Author Listed], "ISO 10993-1:2018, Biological evaluation of medical devices, Part 1: Evaluation and testing within a risk management process," International Organization for Standardization, Oct. 2018, 41 pages (abstract only).

[No Author Listed], "ISO 11135:2014, Sterilization of health-care products, Ethylene oxide, Requirements for the development, validation and routine control of a sterilization process for medical devices," International Organization for Standardization, Jul. 2014, 78 pages (abstract only).

[No Author Listed], "ISO 11137-1:2006, Sterilization of health care products, Radiation," International Organization for Standardization, Apr. 2006, 37 pages (abstract only).

[No Author Listed], "ISO 11607-1:2019, Packaging for terminally sterilized medical devices," International Organization for Standardization, Feb. 2019, 44 pages (abstract only).

[No Author Listed], "ISO 13485:2016, Medical devices, Quality management systems, Requirements for regulatory purposes," International Organization for Standardization, Mar. 2016, 36 pages (abstract only).

[No Author Listed], "ISO 14004:2016 Environmental management systems, General guidelines on implementation," International Organization for Standardization, Mar. 2016, 59 pages (abstract only).

[No Author Listed], "ISO 14971:2019, Medical devices, Application of risk management to medical devices," International Organization for Standardization, Dec. 2019, 36 pages (abstract only).

[No Author Listed], "ISO 15223-1:2021, Medical devices, Symbols to be used with information to be supplied by the manufacturer, Part 1: General requirements," International Organization for Standardization, Feb. 2022, 36 pages (abstract only).

[No Author Listed], "ISO 9001:2015, Quality management systems, Requirements," International Organization for Standardization, Sep. 2015, 29 pages (abstract only).

[No Author Listed], "ISO 9013:2017, Thermal cutting, Classification of thermal cuts, Geometrical product specification and quality tolerances," International Organization for Standardization, Feb. 2017, 28 pages (abstract only).

Cdsco.gov.in [online], "Central Drugs Standard Control Organization," available on or before Aug. 1, 2018, retrieved on Apr. 4, 2024, retrieved from URL<https://cdsco.gov.in/opencms/opencms/en/Home>, 1 page.

Cpsc.gov [online], "General Certificate of Conformity," available on or before Jan. 20, 2014, retrieved on Apr. 4, 2024, retrieved from URL<https://www.cpsc.gov/Business--Manufacturing/Testing-Certification/General-Certificate-of-Conformity>, 4 pages.

FCC.gov [online], "Equipment Authorization Procedures," 2021 retrieved on Nov. 14, 2022, retrieved from URL <https://www.fcc.gov/general/equipment-authorization-procedures-0#:~:text=A%20Declaration%20of%20Conformity%20is,with%20the%20appropriate%20technical%20standards>, 2 pages.

Iecee.org [online], "About IECEE," IEC System of Conformity Assessment Schemes for Electrotechnical Equipment and Components (IECEE), 2022, retrieved online Nov. 14, 2022, retrieved from URL <https://www.iecee.org/about/what-it-is/>, 2 pages.

Iecee.org [online], "CB scheme," available on or before Feb. 21, 2023, retrieved on Apr. 4, 2024, retrieved from URL<https://www.iecee.org/who-we-are/cb-scheme>, 3 pages.

International Search Report and Written Opinion in International Appln. No. PCT/US2024/052115, mailed on Dec. 26, 2024, 7 pages.

[No Author Listed], "ISO 10204:2017, Iron ores, Determination of magnesium, Flame atomic absorption spectrometric method," International Organization for Standardization, Jul. 2017, 14 pages (abstract only).

* cited by examiner

Example Model Types and File Extensions for Steps of a Data Flow Generated by Digital Thread

720

| Stage | Document Type | File Formats |
|---|---|---|
| Requirements Analysis | Functional flow block diagram | .vsd (Visio), .dia (Dia), .mm |
| Requirements Analysis | Use case model | .uml (Unified Modeling |
| Requirements Analysis | Requirements traceability matrix | .xlsx (Microsoft Excel), .ods |
| Requirements Analysis | Systems modeling language | .xml (eXtensible Markup |
| Requirements Analysis | User stories | .txt (Plain text), .md |
| Concept Development | Concept of operations | .docx (Microsoft Word), .pdf |
| Concept Development | System architecture diagram | .vsd (Visio), .dia (Dia), .mm |
| Concept Development | Block definition diagram (BDD) | .uml (Unified Modeling |
| Concept Development | Object-oriented analysis (OOA) | .uml (Unified Modeling |
| System design | Technical data package (TDP) | .pdf (Adobe Acrobat), .docx |
| Implementation | Source code | .java (Java), .py (Python), .c |
| Verification and Validation | Test plans and procedures | .docx (Microsoft Word), .pdf |
| Operation and | Configuration management | .xlsx (Microsoft Excel), .ods |
| Retirement | Data archiving and preservation | .zip (ZIP archive), .tar (TAR |
| Retirement | Decommissioning procedures | .docx (Microsoft Word), .pdf |
| Retirement | Asset management and | .xlsx, .csv |

FIG. 7B

ARCHITECTURE FOR QUANTIFYING AVOIDED CARBON EMISSIONS IN A DIGITAL ENGINEERING PLATFORM

CROSS-REFERENCE TO RELATED APPLICATIONS

The present application claims the benefit of U.S. Provisional Application No. 63/545,113 filed on Oct. 20, 2023, which is incorporated herein by reference in its entirety.

TECHNICAL FIELD

This disclosure relates to the secure provision and usage of tools for digital engineering, e.g., including modeling and simulation tools, and certification of digitally engineered products.

BACKGROUND

Digital engineering tools, including modeling and simulation tools that accurately virtualize physical systems or processes for real-world decisions, enable agile development of components and/or systems. Certification of these components and/or systems still largely occurs in the physical world using physical manifestations of digitally engineered components and/or systems (sometimes referred to generally herein as "products").

SUMMARY

This document describes an interconnected digital engineering and certification ecosystem having several advantages over existing techniques for designing, engineering, testing, and certifying products.

In recent years, digital engineering tools such as modeling and simulation (M&S) tools, computer-aided design (CAD) tools, model-based systems engineering (MBSE) tools, augmented reality (AR) tools, product lifecycle management (PLM) tools, and simulation engines can be utilized to access corresponding digital engineering models. The digital engineering models can include, for example, requirements models, electronics models, test-plan models, cost-models, schedule models, software modeling, supply-chain models, manufacturing models, cyber security models, multi-attribute trade-space tools, mission effects models, etc. The proliferation of the digital engineering tools and the digital engineering models have increased the agility of hardware development and manufacturing by virtualizing physical systems and/or processes for real-world decisions. However, a number of challenges remain given the current state of these digital engineering tools and digital engineering models.

First, a large number and variety of digital engineering tools and models exist (often designed by different parties), which presents challenges for interoperability and can result in vendor lock-in issues. In particular, direct integration of individual digital engineering tools with one another is costly in terms of both time and money, with the number of interfaces between digital engineering tools scaling with the square of the number of distinct digital engineering tools (i.e., $N^2$ complexity). The large number and variety of digital engineering tools that exist can also present challenges for implementing scalable applications, automations, machine learning, and/or artificial intelligence across digital engineering tools. Better interoperability between digital engineering tools can play an important role for developing, testing, and certifying products via processes that may involve a number of distinct digital engineering tools used in parallel or in sequence. Seamless interoperability between digital engineering tools is therefore desirable for implementing such processes by enabling the development of "digital threads" or pipelines that string together the inputs and outputs of multiple digital engineering tools for particular tasks.

Second, because of the highly technical nature of many digital engineering tools and models, operating such tools effectively often requires a highly specialized skillset, which limits the number of individuals qualified to make use of these digital engineering tools. Moreover, individuals skilled at utilizing one digital engineering tool (e.g., a CAD tool produced by a first software company) may not be qualified to use a different kind of digital engineering tool (e.g., a MBSE tool) or even a similar digital engineering tool produced by a different company (e.g., a CAD tool produced by a second software company). This applies not only to using the tools via their custom graphical user interfaces, but also via their tool-specific or vendor-specific APIs, which can also require a highly specialized skill set.

Third, products and solutions designed using one digital engineering tool may not only be non-shareable between digital engineering tools (e.g., due to lack of interoperability), but in some cases, previously designed products and solutions may not be shareable with or searchable by others using the same digital engineering tool to solve a similar problem. For example, no repository of previously designed products, solutions, etc. may exist to share information about said products, solutions, etc. between individuals within the same team, company, technical field, etc. Moreover, even if such a repository of previously designed products and solutions do exist, it is unlikely to include information about how and why the previously designed products and solutions were arrived at, or to include simple ways to reuse the prior engineering work from the models which can potentially limit duplicative efforts and/or provide useful suggestions to an individual working on a similar, but slightly different product or problem. This can result in many engineering problems needing to be redeveloped from scratch, rather than building upon the work of past efforts.

Fourth, products and solutions designed using digital engineering often require the use of many different tools that not all people will know how to use. For example, a digital engineering model may be built using a particular MBSE tool, i.e., digital engineering tool, and someone who needs to access the model (or data generated from the model) may not know how to use this tool. This problem compounds with the fact that many complex systems use many different kinds of tools, meaning that in order to understand such systems, an individual may have to know how to use many different tools, which can be quite rare. This problem is compounded even further by the fact that the people who review information for certification of a product may not be familiar with some or all of the digital engineering tools, and may seek to review all of the data in a legacy format (e.g., PDF report). This poor ease-of-use between different modeling tools can cause significant delays and cost increases when developing new products, as models cannot be easily shared between different people or organizations, especially if those people or organizations have different technical skill sets.

A system may operate using multiple network transport layers, which serve different enclaves of separate information domains relying on multiple message brokers for data stream management. Data distribution across this network of enclaves may be managed by individual applications, which can lead to issues such as surges, increased latency, and geographic dependence. Furthermore, given the nature of operating in Denied, Disrupted, Intermittent and limited Impact (DDIL) bandwidth areas, these issues are compounded and can flood the network with retries when disconnected and re-transmissions of messages when connectivity is restored. This lack of control and management of data distribution results in efficient usage of network resources and decreased performance for high priority mission data.

For the reasons provided above, most digital engineering tools today are still built by people, for people in a world that increasingly operates with machine-to-machine autonomy. For example, in designing a complex system such as an aircraft, various regulatory standards may need to be adhered to, which may require a host of distinct models and simulations to assess (and consequently, the use of a host of distinct digital engineering tools). Today, such efforts require collaboration between a large number of highly specialized subject matter experts consulting a host of regulatory standard documents, necessarily involving many slow and expensive human steps in the design and engineering process. Moreover, current certification processes typically require producing physical manifestations of digitally engineered components and/or systems for evaluation in the physical world (e.g., for physical testing), which can slow down the iterative design and engineering process.

Furthermore, the ongoing costs associated with the physical manifestation of systems-whether in terms of project completion times, financial expenditure, or carbon emissions-remain a key area of concern across industries. Digital engineering tools, when accurately virtualizing physical systems or processes, present significant opportunities to reduce these costs, particularly in financial savings and carbon emissions reductions. However, a consistent and detailed assessment of such cost reductions in digital engineering remains lacking. This gap is primarily due to interoperability challenges among tools and the inability to reliably track and quantify these reductions across diverse digital workflows.

The interconnected digital engineering and certification ecosystem described herein (sometimes referred to as a "digital engineering metaverse") addresses each of these issues, and more. Among other things, the interconnected digital engineering and certification ecosystem can include a computing system (e.g., including network-connected centralized or distributed computing subsystems or components) that interfaces with various centralized or distributed digital engineering tools (e.g., via an application programming interface (API) and/or software development kit (SDK)), which can be separate from the computing system or can themselves be considered part of the computing system. The digital engineering tools can be interfaced with by an API, and/or an SDK can allow for users of the ecosystem (including digital engineering tool providers) to develop their own APIs for their tools or models to enable them to interact with the system. For example, a new company can create a new MBSE tool, then use the SDK to add their tool to the ecosystem, thus allowing it to be automatically interoperable with the rest of the tools within the ecosystem via an API. The new company can then maintain that API over time such that the manager of the overall ecosystem does not have to maintain all of the different APIs for all of the different tools. This architecture can have the advantage of increasing the ease of interoperability between digital engineering tools. For example, rather than requiring each individual digital engineering tool to be integrated with every other individual digital engineering tool in the ecosystem, the computing system can enable the interoperable use of multiple digital engineering tools implemented in multiple other computing systems (or, in some cases, within the same computing system) as long as each of the tools is integrated with the computing system. Furthermore, rather than requiring a user of the digital engineering tools to interact separately with the various digital engineering tools to perform modeling and simulations, the computing system can enable the user to interface with and utilize a single user interface of the ecosystem's computing system which, in turn, interfaces with a host of digital engineering tools. This can result in a more gradual learning curve for the user, who only has to become familiar with a single user interface (e.g., a user interface associated with the computing system) rather than several distinct user interfaces (e.g., associated with the various digital engineering tools). It can also simplify the number of interfaces between digital engineering tools from $N^2$ to $N$ complexity, where N represents the number of digital engineering tools included in the ecosystem. This, in turn, can simply create scalable applications, automations, and/or machine learning and artificial intelligence across a variety of digital engineering tools.

The interconnected digital engineering and certification ecosystem also has the advantage of including digitized regulatory and certification standards, compliances, calculations, and tests (e.g., for the development, testing, and certification of products and/or solutions), which can enable users to incorporate relevant regulatory and certification standards, compliances, calculations, and test data directly into their digital engineering workflow. Regulatory and certification standards, compliances, calculations, and tests are sometimes referred to herein as "common validation and verification (V&V) products." In some implementations, the computing system of the ecosystem can interface with regulatory and/or certification authorities (e.g., via websites operated by the authorities) to retrieve digitized common V&V products published by the regulatory authorities that may be relevant for a product that a user is designing. In some implementations, the user can upload digitized common V&V products to the ecosystem themselves. The inclusion of digitized common V&V products in the ecosystem can be particularly beneficial for the completion of complex systems engineering projects, where many regulatory requirements may need to be satisfied using a number of different digital engineering tools. By connecting both digital engineering tools and digitized common V&V products, the entire product design and engineering process (or part of it) can be digitized, removing or reducing time-intensive and costly steps (e.g., human review of regulatory standards to identify regulatory requirements, human determination of what digital engineering tools are needed, human evaluation of whether the regulatory requirements are satisfied, etc.). For example, the computing system of the digital engineering and certification ecosystem can be configured to process regulatory and/or certification data corresponding to the digitized common V&V products, and engineering-related data outputs received from one or more digital engineering tools to automatically evaluate whether one or more regulatory and/or certification requirements specified in a common V&V product are satisfied. The computing system can generate a report, which can be presented to the user in an easily readable format, and can even include recommendations for improvements to a user's digital prototype of a product (e.g., to satisfy a failed regulatory and/or certification requirement). Importantly, all of this can be done without the need for any physical manifestation of the product to be manufactured, and without physical testing. As digital models and simulations continue to become increasingly high fidelity, certification of products such as unmanned aerial vehicles or other aircraft can also be performed digitally, saving time, cost, and materials associated with the physical evaluation and certification of products. Although unmanned aerial vehicles and other aircraft are mentioned as example products throughout this description, the ecosystem can be readily used for the design, engineering, testing and/or certification of any product or solution (e.g., automobiles, drugs, medical devices, processes, etc.) that can be developed using digital engineering tools and/or that is subject to regulatory and/or certification requirements.

The interconnected digital engineering and certification ecosystem also has the advantage of providing a single computing system (which may be a centralized or distributed computing system) through which various kinds of data flow throughout the design, engineering, testing, and/or certification process. Further, this unlocks collaborative computing techniques even when models or model-like files are maintained at the edge, such as a client device. The security architecture provides zero-trust access to digital models on a one-off basis for individual models, and also provides greater security through machine learning and data analytics on security related implementations of other models and model transactions in the digital engineering ecosystem. For example, data related to prototypes, common V&V products, the use of digital engineering tools to satisfy particular common V&V products, the successes or failures of particular digital engineering models and simulations, and various design iterations of a product can all be configured to securely flow through, and be corroborated by, the computing system of the ecosystem (e.g., using zero-trust security). In some implementations, these data can be tracked and stored. This stored data can be audited for various purposes (e.g., to prevent a security breach or to perform data quality control). The stored data can also be explored to identify patterns in the data (e.g., using a machine-learning engine). For example, after many uses of the digital engineering and certification ecosystem by subject matter experts, patterns in the stored data can be used to determine what digital engineering tools will be most useful for satisfying certain regulatory requirements, to suggest adjustments to inputs or parameters for effectively running models and simulations, to perform sensitivity analyses on a particular design, to design or partially design systems using machine learning and artificial intelligence, etc. This can have the advantage of making the digital engineering and certification ecosystem increasingly user-friendly for non-subject matter experts, who can be assisted by the computing system throughout the design and engineering process based on data collected from more specialized and/or experienced users, as well as accelerating the entire engineering and certification process.

The interconnected digital engineering and certification ecosystem can further have the advantage of enabling the development of a repository of previous designs and/or solutions that have already been evaluated in relation to one or more common V&V products that can be easily re-used with minimal additional engineering effort. Such designs and/or solutions can be suggested to users (e.g., both human and artificial intelligence users) for use as is, or as a starting point for modifications, thereby reducing duplicative work and streamlining the design, engineering, testing, and certification process. In some implementations, the repository can be searchable by the user to identify previous designs and/or solutions generated by others. In some implementations, the repository (or certain elements within the repository) can also be specific to users with particular credentials (e.g., users associated with a particular company, team, technical field, etc.) to avoid the disclosure of confidential materials while still promoting effective collaboration. In some cases, user credentials can additionally or alternatively be used in the interconnected digital engineering and certification ecosystem for other purposes such as moderating the kinds of digital engineering tools (or functionalities within the digital engineering tools) that a user may access. For example, the user credentials may correspond to a skill level of a user, and can be checked to ensure that a user is not overwhelmed with the functionalities of a digital engineering tool beyond their skillset.

The interconnected digital engineering and certification ecosystem can further have the advantage of allowing highly valuable digital engineering models to be shared while still protecting the intellectual property contained within the models. Many modern technology development projects include multiple entities working together (e.g., a customer, a prime integrator, a supplier, etc.), requiring access to one another's models, but with different access permissions to the data. This system allows for the detailed specification of exactly which data within a model is to be shared with each individual entity, without exposing all of the data to all of the entities. This selective sharing of information allows for the measurement and tracking of which data is consumed by each entity (e.g., only sharing the inputs and outputs of a hydrodynamic pressure model) and how much data is consumed (e.g., how many runs of the hydrodynamics model are performed). This measuring and tracking allow for new business models based upon the creation of models and data that can be monitored and monetized. In some implementations, this measurement and tracking go beyond the first sharing of the data, but can also be applied to measuring and/or tracking subsequent or derivative uses of the data by third parties not engaged in the initial sharing agreement. For example, a prime contractor can share data with a first government organization, who is then free to share the data with a second government organization, and the prime contractor can have the ability to allow/disallow, track, and potentially monetize this further sharing. Such implementations have the advantage of enabling extremely close capturing and traceability of model data.

Maintaining the security of assets within the interconnected digital engineering ecosystem (e.g. models, model inputs, model outputs, user information, data flows throughout the interconnected digital engineering ecosystem, etc.) is important to avoid liability and to maintain the trust of parties (e.g., users, model providers, regulatory authorities, certification authorities, etc.) who may interact with the interconnected digital engineering ecosystem. Thus, the present document discloses various implementations of security architectures and security-related processes for the interconnected digital engineering ecosystem, which are particularly well suited for the structure and purpose of the interconnected digital engineering ecosystem, compared to existing security solutions. These security architectures and security-related processes aim to protect digital models and their data in addition to traditional zero-trust security measures for users and computer networks. The zero-trust security architecture includes policy, embodiments, and example implementations of a secure storage environment, restricted access to models, attribute-based access control, handling of read vs. write queries, traceability and auditability, and model trust policy.

In some implementations, the security architectures and security-related processes described herein can have the advantage of implementing zero-trust not only for users and networks within the interconnected digital engineering ecosystem, but also for the models themselves. In other words, the security architecture and security-related processes are able to ensure (i) the right authenticated users are able to access the right authenticated models (and only the right authenticated parts of models) for specific types of data, (ii) models are credibly authentic because access to read and write can be explicitly granted, and (iii) complex computations involving multiple models can be executed securely because access can be explicitly granted for each step at the user, network, model, and model splice levels.

The security architecture and security-related processes described herein can also have the advantage of least privilege. In some implementations, the security architecture and secure-related processes can extend the traditional implementation of least privilege where the smallest amount of access is granted to include an extension where the smallest amount of data exists within the digital engineering platform itself because models remain in the customer's (e.g., a model owner's or a model developer's) own storage. This decreases potential compromise of intellectual property, decreases the amount of legal process required to share models (e.g., sharing parties signing NDAs), and, when used in the security architecture described throughout this specification, it allows for models to assess integrations without leaving each customer's environment. In some examples, the digital engineering platform is referred to as the control plane whereas the customer environment is referred to as the data plane, to further elaborate the security architecture. A control plane is responsible for making decisions about how data traffic should be forwarded within a network or system. A data plane is the "inference engine" that acts based on the control plane's decisions. The digital engineering platform as a control plane manages orchestration, authentication, and routing rules for tasks performed on digital models. Within the customer environment, the data plane executes the actual API calls to the digital models and manages data transfer. The control plane decides which digital model to interact with and how to interact with the digital model, whereas the data plane manages the execution of the tasks.

The security architecture and security-related processes described herein can additionally have the advantages of traceability, auditability, and model integrity. In some examples, the endpoint transactions can be logged so there is comprehensive traceability of all actions on models connected via the digital engineering ecosystem. Further, outputs from approved actions may produce updated models, hashes of which are stored in the endpoint transaction database, which can be implemented in various embodiments including a secure database, a distributed database, or a ledger, to name a few examples. This ensures the integrity of the models being used in further actions without requiring customers (e.g., model owners or model developers) to entrust their full model to the digital engineering platform.

In some implementations, the interconnected digital engineering ecosystem can provide security features that ensure secure processing of various requests. In further detail, the interconnected digital engineering ecosystem can ensure secure processing of various requests by implementing a cell-based architecture, treating digital engineering models as microservices, where the microservices can be bundled together according to logical technical actions. The security features of this ecosystem are enhanced by the combined use of a micro gateway and a Wide Application Firewall (WAF) to control traffic entry into each cell. Additionally, an API Gateway manages traffic direction and is fortified with a Customer Identity Access Management (CIAM) system, responsible for generating and verifying access tokens at each gateway. This setup ensures that access is granted only to authorized individuals and designated cells.

The API Manager plays a crucial role in this ecosystem by enforcing access policies and establishing network traffic control. This comprehensive approach to securing the digital engineering ecosystem allows for robust protection of intellectual property and sensitive information within requests while maintaining the necessary accessibility and functionality for efficient operation in various environments.

In some implementations, this secure architecture enables the orchestration of discrete digital engineering tasks on third-party data while providing strong privacy guarantees. Through the use of a hybrid deployment model, the system enables an untrusted third-party to execute specific digital engineering tasks on models and simulations without direct access to sensitive data. In this way, users may collaborate on sensitive projects—such as company research and development efforts—with third parties who would otherwise be untrusted with direct access to the constituent digital models.

In some implementations, the digital engineering platform can utilize idempotency tokens with fungible and non-fungible options for managing task execution, efficiently utilizing resources, and providing enhanced scalability. Moreover, the use of the idempotency tokens allows for tracking of usage while preserving data sovereignty within the digital engineering platform. In this manner, the digital engineering platform can track usage within the digital engineering platform while meeting zero-trust security requirements, as will be further outlined below.

The digital engineering platform can provide numerous advantages by connecting digital engineering models and tools through an integrated environment that provides digital threads, e.g., to perform certification workflows for a system. The digital engineering platform utilizes idempotency tokens (e.g., fungible, and non-fungible tokens) to log and analyze activity data. Thus, the digital engineering platform quantifies computational loads and associated costs, e.g., in time, financial costs and associated carbon emissions, to perform the tasks. The digital engineering platform can result in fewer iterations of physical prototypes to complete testing and verification workflows but can also entirely replace physical prototypes in some cases. The digital engineering platform reduces the processing time, computational cost, and carbon emissions for performing the workflows. The digital engineering platform can also provide savings by expediting digital workflows by selecting more efficient digital engineering tools for the same task. In other implementations, the digital engineering platform can also provide savings by expediting digital workflows by applying AI-based techniques, e.g., running a machine learning model as a proxy for a digital simulation. The solution space of desired performance based on the design parameters for the digital engineering process can be predicted by the machine learning model instead of performing multiple iterations of the simulation.

The digital engineering platform can link digital engineering models at different levels of a workflow in an integrated engineering (e.g., system engineering) environment. The digital engineering platform provides that defects detected at one level of the digital engineering process can be rectified prior to propagating to other levels of the workflow, e.g., downstream effects that can generate excess computational demands in the integrated environment. The digital engineering platform provides improved efficiency in the integrated environment through removing the demand for physical prototyping. For example, the digital engineering platform performs multi-domain modeling and initial validation of model outputs that are as accurate as a physical prototype, in less time and with fewer resources than the physical prototype. Thus, the digital engineering platform provides concurrent development and validation of multi-domain models to perform digital engineering tasks at a similar fidelity to physical prototypes.

The digital engineering platform also provides scalability for designing multi-model environments, as digital computing resources for models can be more accessible and readily scaled than physical prototypes. The digital engineering platform provides that different models and tools can be linked into digital threads, e.g., with linkages connecting models, tools, or some combination thereof. By linking digital assets such as models and tools into a digital thread, the digital engineering platform can replace the demand for iterative design physical prototyping, e.g., adjusting design parameters of the physical prototype and performing testing, verification, and validation of the physical prototype.

The digital engineering platform can provide improvements to system engineering workflows such as improving the ease of use for a non-expert user, enabling interoperability between different systems, and increasing the computational efficiency of workflows. Some examples of digital engineering tasks can include tasks for defining or decomposing system workflows, e.g., systems engineering plans, concept of operations, system-level requirements, sub-system requirements. Other examples of digital engineering tasks can include integration and test tasks, e.g., component verification, sub-system verification, system verification, system validation, and commissioned system operations and maintenance. Furthermore, the digital engineering platform integrates software and hardware to link both types of tasks. The digital engineering platform can also include AI-techniques to improve data processing throughout the workflows, e.g., improving the accuracy of digital engineering models and tools through the digital engineering platform.

In one general aspect, a computer-implemented method is performed. The computer-implemented method includes receiving, from a client device in communication with a digital platform, a request to execute a task by the digital platform. The method also includes assigning, by the digital platform, a token to the received request. The token can be configured to uniquely identify the received request to execute the task using the digital platform. The method also includes receiving, by the digital platform, a first value representing a baseline execution cost associated with executing the task. The method also includes determining, using the assigned token and based on execution of the task using the digital platform, a second value representing a reduction in execution cost attained by using the digital platform. The method also includes generating, based on a comparison of the second value to the first value, an attained execution reduction cost associated with the execution of the task by the digital platform.

Implementations can include one or more of the following features. The computer-implemented method can include the token being an idempotency token configured to identify one or more tasks each having an operation common to an operation of the task for the received request. The computer-implemented method can include identifying one or more tasks each having an operation common to an operation of the task for the received request; and executing, by the digital platform, the operation of the identified one or more tasks that is common to the operation of the task for the received request to reduce execution redundancy by the digital platform.

In some implementations, the computer-implemented method can include determining the second value representing the reduced execution cost attained by using the digital platform based on the execution of the operation of the identified one or more tasks that is common to the operations of the task for the received request. The computer-implemented method can include generating, based on the attained execution reduction cost associated with the execution of the task by the digital platform, a certified carbon credit, and providing the certified carbon credit to a computing device in communication with the digital platform.

In some implementations, the task is one or more of (i) an inference task, or (ii) a training task, of a digital model. The digital platform can be configured to monitor execution of the task for a period of time. The digital model can be one or more of (i) a machine learning model, or (ii) a model configured to apply artificial intelligence techniques.

In some implementations, the digital thread can include a plurality of connected modules. The computer-implemented method can include monitoring, by the digital platform, an update to a module from the plurality of connected modules of the digital thread, and determining, based on the update to the module, a cost impact to one or more other modules from the plurality of connected modules of the digital thread. The token can be configured to collect data related to one or both of (i) the update to the module, or (ii) the cost impact to the one or more other modules. The token can be configured to determine, based on the collected data, a third value representing an additional reduction in execution cost attained by using the digital platform.

In some implementations, the digital platform is configured to utilize an engine configured to determine a cost associated with performing a workflow by the digital platform. Determining the cost can include applying at least one of (i) machine learning or (ii) artificial intelligence techniques, to data related to the execution of the task collected by the token. The token that uniquely identifies the received request can include a unique identifier for monitoring the task by the digital platform. The attained execution reduction can be (i) a computational processing cost, or (ii) an amount of carbon emissions reduced. Each token of the set of tokens can include data that identifies the selected tool for the set of tools. The computer-implemented method can include associating, by the digital platform, the token for the received request to the set of tokens for the execution of the task using the digital platform. The method can include determining, by the set of tokens, an amount of carbon emissions associated with the execution of the task on the digital platform. Selecting the tool for executing the task by the digital platform can include identifying, by the digital platform and from a tools database, a set of tools. The method can include for each tool of the set of tools, identifying by the digital platform, a cost associated with performing the execution of the task using the tool. The cost can be at least one of (i) an amount of carbon emissions, or (ii) a computational load of the digital platform. The method can include selecting, by the digital platform, the tool whose cost associated with performing the execution of the task by the digital platform satisfies a threshold value.

In some implementations, the computer-implemented method can include generating, using the digital platform and for a plurality of tasks, a plurality of values corresponding to the plurality of tasks, each of the plurality of values representing an attained execution reduction cost associated with the execution by the digital platform of the respective task from the plurality of tasks.

In an aspect, a system includes one or more computers and one or more storage devices storing instructions that are operable, when executed by the one or more computers, to cause the one or more computers to perform operations. The operations include receiving, from a client device in communication with a digital platform, a request to execute a task by the digital platform. The operations also include assigning, by the digital platform, a token to the received request. The token can be configured to uniquely identify the received request to execute the task using the digital platform. The operations also include receiving, by the digital platform, a first value representing a baseline execution cost associated with executing the task. The operations also include determining, using the assigned token and based on execution of the task using the digital platform, a second value representing a reduction in execution cost attained by using the digital platform. The operations also include generating, based on a comparison of the second value to the first value, an attained execution reduction cost associated with the execution of the task by the digital platform.

The system can also include the digital platform being configured to utilize an engine configured to determine a cost associated with performing a workflow by the digital platform. Determining the cost can include applying at least one of (i) machine learning or (ii) artificial intelligence techniques, to data related to the execution of the task collected by the token.

The system can also include a digital thread, the digital thread can include a plurality of connected modules. The operations for the system can include monitoring, by the digital platform, an update to a module from the plurality of connected modules of the digital thread; and determining, based on the update to the module, a cost impact to one or more other modules from the plurality of connected modules of the digital thread. The token can be configured to collect data related to one or both of (i) the update to the module, or (ii) the cost impact to the one or more other modules. The token can be configured to determine, based on the collected data, a third value representing an additional reduction in execution cost attained by using the digital platform.

The task can be one or more of (i) an inference task, or (ii) a training task, of a digital model, and the digital platform can be configured to monitor execution of the task for a period of time. The operations for the system can further include generating, based on the attained execution reduction cost associated with the execution of the task by the digital platform, a certified carbon credit, and providing the certified carbon credit to a computing device in communication with the digital platform.

In an aspect, a non-transitory computer-readable medium storing software that includes instructions executable by one or more computers which, upon such execution, cause the one or more computers to perform operations. The operations include receiving, from a client device in communication with a digital platform, a request to execute a task by the digital platform. The operations also include assigning, by the digital platform, a token to the received request. The token can be configured to uniquely identify the received request to execute the task using the digital platform. The operations also include receiving, by the digital platform, a first value representing a baseline execution cost associated with executing the task. The operations also include determining, using the assigned token and based on execution of the task using the digital platform, a second value representing a reduction in execution cost attained by using the digital platform. The operations also include generating, based on a comparison of the second value to the first value, an attained execution reduction cost associated with the execution of the task by the digital platform.

The non-transitory computer-readable medium can include the digital platform being configured to utilize an engine configured to determine a cost associated with performing a workflow by the digital platform. Determining the cost can include applying at least one of (i) machine learning or (ii) artificial intelligence techniques, to data related to the execution of the task collected by the token. The digital thread can include a plurality of connected modules.

The non-transitory computer-readable medium can perform operations that include monitoring, by the digital platform, an update to a module from the plurality of connected modules of the digital thread. The operations for the non-transitory computer-readable medium can include determining, based on the update to the module, a cost impact to one or more other modules from the plurality of connected modules of the digital thread. The token can be configured to collect data related to one or both of (i) the update to the module, or (ii) the cost impact to the one or more other modules; and determine, based on the collected data, a third value representing an additional reduction in execution cost attained by using the digital platform. The task is one or more of (i) an inference task, or (ii) a training task, of a digital model. The digital platform can be configured to monitor execution of the task for a period of time. The operations for the non-transitory computer-readable medium can include operations that further include generating, based on the attained execution reduction cost associated with the execution of the task by the digital platform, a certified carbon credit; and providing the certified carbon credit to a computing device in communication with the digital platform.

The subject matter described in this specification can be implemented in various embodiments and may result in one or more of the following advantages. In some implementations, the proposed technology provides several significant advantages, primarily centered around its robust, four-layer security framework. This framework includes multiple components including the implementation of a policy by the API manager, utilization of an identity token through the CIAM, the isolation of individual cells using a gateway, and granular protection provided to each cell through the implementation of a WAF. By employing this comprehensive security approach, valuable assets and sensitive information are effectively shielded from unauthorized access.

One notable advantage is the potential to establish an "Internet of Models," where digital engineering models become the most valuable distributed assets across various stacks. The proposed system described in this specification facilitates seamless sharing of these models through a cell-based methodology, enabling isolation and decoupling of logical systems and processes. The isolation and sharing of specific digital engineering models is specifically safeguarded through the use of a WAF, ensuring the protection of these valuable assets.

In some examples, the proposed architecture maintains accessibility through APIs while simultaneously enforcing robust protection by isolating each digital model. The combination of accessibility and security within the digital engineering ecosystem provides significant benefits to stakeholders, particularly in safeguarding critical intellectual property and enabling efficient collaboration across multiple platforms.

The technology described embodies an architecture based on cells that supports scalability. The architecture features decoupled logic, enabling scaling as the demand for models and users increases. Additionally, the technology provides for flexibility due to the isolation of models and the incorporation of APIs, which allows the system to adapt to changing business requirements and integrate with various platforms.

The technology includes a customizable security feature characterized by the granular protection of a Web Application Firewall (WAF). This functionality enables the application of distinct security measures to individual cells based on specific operational needs. Moreover, the technology includes a comprehensive security framework designed to mitigate unauthorized access and potential data breaches, thereby enhancing data protection.

Improved collaboration is another feature of the technology. The cell-based security methodology facilitates secure sharing of models across platforms, promoting collaboration between stakeholders while ensuring protection for proprietary data and intellectual insights.

The technology includes an access management system, namely, the Customer Identity and Access Management (CIAM) system, which eases the task of granting and verifying access permissions for authorized individuals. The access management system simplifies the process of granting and verifying access permissions, thereby reducing administrative burdens. The inclusion of robust security measures serves to foster an environment of increased trust among stakeholders, potentially leading to a broader adoption of the digital engineering ecosystem.

In some embodiments, the proposed cellular security architecture can be deployed in a hybrid manner across on-premises and cloud environments. This approach merges the scalability of public cloud infrastructure with the reliability and security-control afforded by on-premises deployments, resulting in cost-effectiveness and optimal performance. The hybrid model accommodates both specific regulatory and security compliance requirements, allowing the cloud components to prioritize less-sensitive high-volume data while ensuring appropriate safeguards around sensitive files held by enterprise customers of the platform. This division enhances security with minimal cost-consequence and assures superior resilience, bolstering continuity and disaster recovery capabilities for various customers.

In some implementations, the proposed cellular security architecture can utilize a trained machine learning model to identify security risks associated with requests. The machine learning model can be trained using prior requests that include both malicious and non-malicious data. In this manner, the machine learning model can be trained to identify portions of a request or the request itself that appear to be malicious and/or not malicious and signal this information. The trained machine learning model can output a score that reflects a likelihood of the maliciousness of the request, which can aid the WAF in determining whether to allow the request to be passed into the cell architecture. Should the WAF determine the score output by the trained machine learning models satisfies, e.g., meet or exceed, the threshold, the WAF can discard the request as the request may include a likelihood of malicious activity.

The proposed cellular security architecture provides advantages that ensure network congestion is minimized between one or more cells. The cellular security architecture can rely on an API manager that enables close monitoring of network traffic, applications, performance, and resources between the one or more cells, among other features. The API manager can utilize API throttling and rate limiting, for example, to avoid or reduce the amount of congestion when such network traffic or other satisfies a threshold value. In particular, the API manager can vary or throttle the amount of network data between cells based on monitored events between the cells. Periodically, a-periodically, or on a continuous basis, the API manager can monitor the network traffic between one or more cells and compare the network traffic to a predefined threshold value. If the API manager determines the network traffic between the one or more cells satisfies the threshold value, e.g., exceeds or meets the threshold value, then the API manager can throttle the traffic between the one or more cells whose network traffic satisfies the threshold value. In some cases, the API manager can analyze the network traffic to determine a cause for the congestion if the network traffic between one or more cells satisfies the threshold value.

Moreover, the hybrid infrastructure facilitates the use of advanced cloud services like artificial intelligence, machine learning, and analytics, in a privacy-preserving manner thereby enriching the value of digital engineering models. A hybrid model also facilitates a smoother transition for organizations aiming for a full cloud-based model, allowing a gradual shift due to operational, financial, and/or security considerations. Consequently, this hybrid deployment offers a balanced, flexible, and secure solution that efficiently navigates the complexity of managing security across varied platforms.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7B is a table showing examples of model types and file extensions of data generated by a digital thread.

DETAILED DESCRIPTION

This disclosure describes an interconnected digital engineering and certification ecosystem that can enable new capabilities and improve the process for digital product development, including the digital design, digital engineering, digital testing, and digital certification of products. For the purposes of this disclosure the terms "design" and "engineer" are used largely synonymously and are broadly defined to encapsulate the process of intelligently developing a product to solve a particular problem (e.g., to improve performance, increase aesthetic appeal, satisfy one or more regulatory requirements, etc.).

Figure 1:
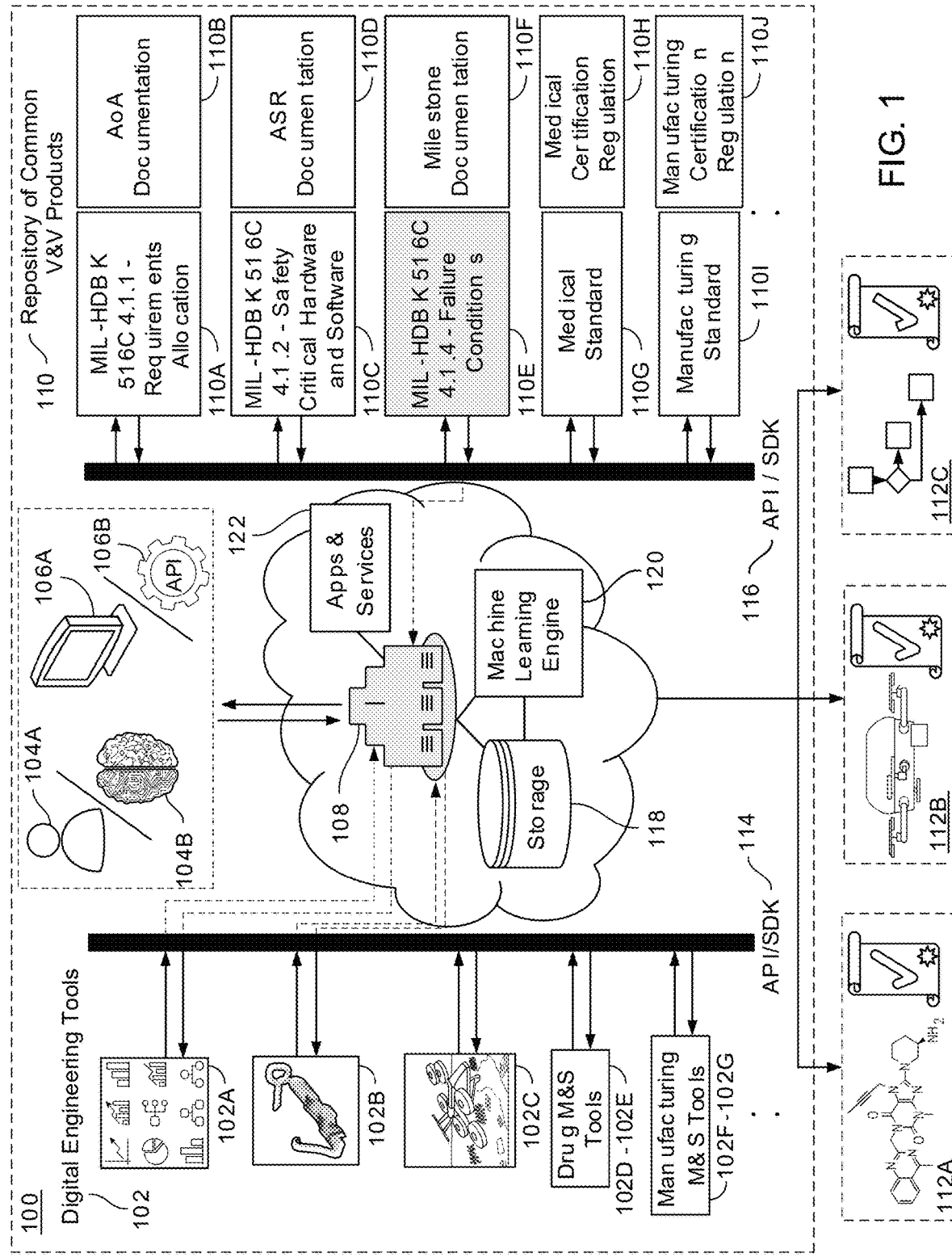
FIG. 1 is a diagram showing an example interconnected digital engineering and certification ecosystem, and digitally certified products.

FIG. 1 shows an example interconnected digital engineering and certification ecosystem 100 and examples of digitally certified products 112A-112C (collectively referred to as digitally certified products 112). For example, in some implementations, the digitally certified product 112A can be an unmanned aerial vehicle (UAV) or other aircraft, the digitally certified product 112B can be a drug or other chemical or biologic compound, and the digitally certified product 112C can be a process such as a manufacturing process. In general, the digitally certified products 112 can include any product, process, or solution that can be developed, tested, or certified (partially or entirely) using digital engineering tools (e.g., the digital engineering tools 102). In some implementations, the digitally certified products 112 may not be limited to physical products, but can include non-physical products as well (e.g., processes, software, etc.). While physical and physically-interacting systems often require multiple digital engineering tools to assess for compliance with common V&V products simply by virtue of the need for M&S, many complex non-physical systems may also require multiple digital engineering tools for product development, testing, and/or certification. With this in mind, various other possibilities for digitally certified products will be recognized by one of ordinary skill in the art.

The digitally certified products 112 can be designed and/or certified using the interconnected digital engineering and certification ecosystem 100. The interconnected digital engineering and certification ecosystem 100 can include a user device 106A or API 106B (or other similar machine-to-machine communication interface) operated by a user (e.g., human users 104A of various skill levels, or artificial users 104B such as algorithms, artificial intelligence, or other software), and a computing system 108 connected to (and/or including) a data storage unit 118, a machine learning engine 120, and an application and service layer 122. For the purposes of clarity, any user selected from the various potential human users 104A or artificial users 104B are referred to herein simply as the user 104. In some implementations, the computing system 108 can be a centralized computing system, while in other implementations, the computing system 108 can be a distributed computing system. In some cases, the user 104 can be considered part of the ecosystem 100, while in other implementations, the user 104 can be considered separate from the ecosystem 100. The ecosystem 100 also includes one or more digital engineering tools 102 (e.g., data analysis tool 102A, CAD and finite element analysis tool 102B, simulation tool 102C, drug M&S tools 102D-102E, manufacturing M&S tools 102F-102G, etc.) and a repository of common V&V products 110 (e.g., regulatory standards 110A-110F related to the development and certification of a UAV, medical standard 110G [e.g., CE marking (Europe), FCC Declaration of Conformity (USA), IECEE CB Scheme (Europe, North America, parts of Asia and Australia), CDSCO (India), FDA (USA), etc.], medical certification regulation 110H [e.g., ISO 13485, ISO 14971, ISO 9001, ISO 62304, ISO 10993, ISO 15223, ISO 11135, ISO 11137, ISO 11607, IEC 60601, etc.], manufacturing standard 110I [e.g., ISO 9001, ISO 9013, ISO 10204, EN 1090, ISO 14004, etc.], manufacturing certification regulation 110J [e.g., General Certification of Conformity (GCC), etc.], etc.).

The computing system 108 of the ecosystem 100 is centrally disposed within the architecture of the ecosystem 100 and is configured to communicate with (e.g., receive data from and transmit data to) the user device 106A or the API 106B (e.g., an API associated with an artificial user 104B), the digital engineering tools 102 (e.g., via an application programming interface [API]/software development kit [SDK] 114), and the repository of common V&V products 110 (e.g., via the API/SDK 116). For example, the computing system 108 can be configured to communicate with the user device 106A and/or the API 106B to send or receive data corresponding to a prototype of a design, information about a user (e.g., user credentials), engineering-related inputs/outputs associated with the digital engineering tools 102, digitized common V&V products, an evaluation of a product design, user instructions (e.g., search requests, data processing instructions, etc.), and more. The computing system 108 can also be configured to communicate with one or more digital engineering tools 102 to send engineering-related inputs for executing analyses, digital engineering models, simulations, tests, etc. and to receive engineering-related outputs associated with the results. The computing system 108 can also be configured to communicate with the repository of common V&V products 110 to retrieve data corresponding to one or more digitized common V&V products 110 and/or upload new common V&V products (e.g., those received from the user 104) to the repository of common V&V products 110. All communications can be transmitted and corroborated securely, for example, using methods relying on zero-trust security.

In some implementations, the computing system 108 can employ zero-trust security for various components within the digital engineering and certification ecosystem. Specifically, the computing system 108 can employ zero-trust security under the various industries that can utilize the computing system 108. For example, these industries can include automotive industries, aerospace industries, and medical device industries. The computer system 108 can include secure storage of various models within customer environments (e.g., environments owned, accessible, or operated by customers such as model developers or owners) or in a secure storage environment from the digital engineering platform. The computer system 108 can offer restricted access to models through attribute-based access control, handling of read requests versus write requests, traceability and auditability through digitally signed endpoint transactions, and a model trust policy that assesses model truth and user credibility. The zero-trust security aspect related to the computing system 108 is further described below.

In some implementations, the computing system 108 can utilize security architecture policies to employ the zero-trust security feature. The security architecture policies can include, for example, a model storage policy, a model access policy, a data restrictions policy, a traceability and auditability policy, and an authenticity policy. In some cases, the computing system 108 can employ a model storage policy for the zero-trust policy. The model storage policy can ensure the secure storage of models within customer environments or in a secure storage environment separate from the digital engineering platform. Moreover, the models may be linked to the platform through private model storage. By implementing the model storage policy, the computing system 108 can ensure the confidentiality and integrity of the models themselves, and the data of those models.

In some implementations, the computing system 108 can employ a model access policy for the zero-trust policy. The model access policy can restrict access to a specific subset of API functions through a model wrapper or a model splicer. For example, the model wrapper and wrapping of the models can be used interchangeably with a model splicer and splicing of the models. The restricted access can be based on an authentication level of the user, for example. Moreover, the model access policy can enable model authentication and user authentication from various endpoints. In some cases, a customer (e.g., a model owner or model developer) may provide additional access control policies that can be implemented at the various endpoints. For example, the additional access control policies can include read access from the models and write access to the models. In some examples, the authentication of models and users can be achieved through attribute-based access control. As further described below, the models may be digitally watermarked (e.g., with digitally signed endpoint transactions) to improve the overall traceability and auditability of the models. In some examples, non-fungible idempotent tokens (NFITs) can be used for attestation of digital watermarks. NFITs can serve as references to the integrity of changes to digital models in the data plane, and present options of digital watermarking, such as agency, which entity asked for a particular change to happen, and time-domain, e.g., when did the change happen.

In some implementations, the computing system 108 can employ a data restrictions policy for the zero-trust policy. The data restrictions policy can enable and allow customers to set policies for the handling of the data of the respective models. In this implementation, customers can determine how to secure their digital engineering models. For example, customers can implement policies that include data restrictions such as encryption, security controls, and zero-knowledge approaches. Moreover, customers can configure the digital engineering ecosystem to provide verification of transactions and consensus mechanisms to validate outputs from the models for open-access storage models. Consensus mechanisms can enable a group of nodes, which comprise different digital engineering tools to evaluate or verify a specific digital model or multiple digital models within open-access storage, to agree on the output from the specific model. The consensus mechanisms may include methods such as Proof of Stake (POS), or Proof of Reputation (POR) approaches. These consensus mechanisms can ensure that all nodes in a network of open-access storage digital engineering models have the same view of the specific model's data, even in the presence of faulty or malicious nodes. For example, the PoR approach can include a blockchain consensus mechanism that depends on the reputation of the participants to keep the network secure. The PoS approach can include a consensus mechanism for blockchain networks, where cryptocurrency holders can validate block transactions by staking transactions.

In some implementations, the computing system 108 can employ a traceability and auditability policy for the zero-trust policy. The traceability and auditability policy can ensure the recorded transactions at endpoints are in a standard format within a secure database, on a cloud network, on a blockchain network, or some combination of the aforementioned networks. Moreover, the computing system 108 can utilize various data analytics approaches to support threat detection, alerts, threat mitigation, and threat debugging. Moreover, the traceability and auditability policy can help aid the computing system 108 in meeting specific standards, such as those established by standards organizations such as NIST, or various customer needs or criteria.

In some implementations, the computing system 108 can employ an authenticity policy for the zero-trust policy. The authenticity policy ensures the right or correct authenticated user has access to the right authenticated model attributes. The right authenticated model attributes can include the models in which the users are authenticated to access and perform updates with respect to the authenticated models. The authenticity policy ensures the correct authenticated user accesses the right authenticated model attributes by addressing the issues of (i) user identity, (ii) continuity, and (iii) accord, to assess model truth and user credibility. In some examples, the computing system 108 can employ the authenticity policy to help ensure the validity and reliability of models, along with the validity and reliability of the data used by the models.

In some implementations, the authenticity policy addresses user identity by ensuring the right authenticated user can access the models and the right authenticated user can access the specific data from the right authenticated model. The authenticity policy ensures the user accessing the authenticated model is a credible user. Moreover, continuity is addressed by assessing user credibility within a digital engineering platform, such as the digital engineering platform of computing system 108. Moreover, the authenticity policy addresses accord by determining how to assess model truth. Specifically, model truth can be addressed when the model owner owns ground truth or when the model owner does not own ground truth of the model data.

The computing system 108 can process and/or store the data that it receives, and in some implementations (e.g., using the storage 118), can access a machine learning engine 120 and/or an application and service layer 122 (either included as part of the computing system 108 or external to it) to identify useful insights based on the data, as further described herein. The central disposition of the computing system 108 within the architecture of the ecosystem 100 has many advantages including reducing the technical complexity of integrating the various digital engineering tools 102; improving the product development experience of the user 104; intelligently connecting common V&V products (e.g., standards 110A-110F) to the digital engineering tools 102 most useful for satisfying requirements associated with the common V&V products; and enabling the monitoring, storing, and analysis of the various data that flows between the elements of the ecosystem 100 throughout the product development process. In some implementations, the data flowing through (and potentially stored by) the computing system 108 can also be auditable to prevent a security breach, to perform data quality control, etc.

Referring to one particular example shown in FIG. 1, the user 104 can use the digital engineering and certification ecosystem 100 to produce a digitally certified UAV 112B. For example, the user 104 may be primarily concerned with certifying the UAV as satisfying the requirements of a particular regulatory standard 110E relating to failure conditions of the UAV (e.g., "MIL-HDBK 516C 4.1.4—Failure Conditions"). In this usage scenario, the user 104 can develop a digital prototype of the UAV on the user device 106A or using the API 106B and can transmit the prototype data (e.g., as at least one of a CAD file, a MBSE file, etc.) to the computing system 108. Along with the prototype data, the user 104 can transmit, via the user device 106A, additional data including an indication of the common V&V product for which the user 104 is interested in certifying the product (e.g., regulatory standard 110E), user credential information for accessing one or more capabilities of the computing system 108, and/or instructions for running one or more digital models, tests, and/or simulations using a subset of the digital engineering tools 102.

Referring to another example shown in FIG. 1, the user 104 can use the digital engineering and certification ecosystem 100 to produce a digitally certified drug, chemical compound, or biologic 112A. For example, the user 104 may be primarily concerned with certifying the drug, chemical compound, or biologic 112A as satisfying the requirements of a particular medical standard 110G and medical certification regulation 110H. In this usage scenario, the user 104 can develop a digital prototype of the drug, chemical compound, or biologic on the user device 106A or using the API 106B and can transmit the prototype data (e.g., as a molecular modeling file) to the computing system 108. Along with the prototype data, the user 104 can transmit, via the user device 106A, additional data including an indication of the common V&V products for which the user 104 is interested in certifying the product (e.g., medical standard 110G and medical certification regulation 110H), user credential information for accessing one or more capabilities of the computing system 108, and/or instructions for running one or more digital models, tests, and/or simulations using a subset of the digital engineering tools 102 (e.g., drug M&S tools 102D-102E).

Referring to yet another example shown in FIG. 1, the user 104 can use the digital engineering and certification ecosystem 100 to produce a digitally certified manufacturing process 112C. For example, the user 104 may be primarily concerned with certifying the manufacturing process 112C as satisfying the requirements of a particular manufacturing standard 110I and manufacturing certification regulation 110J. In this usage scenario, the user 104 can develop a digital prototype of the manufacturing process on the user device 106A or using the API 106B and can transmit the prototype data to the computing system 108. Along with the prototype data, the user 104 can transmit, via the user device 106A, additional data including an indication of the common V&V products for which the user 104 is interested in certifying the process (e.g., manufacturing standard 110I and manufacturing certification regulation 110J), user credential information for accessing one or more capabilities of the computing system 108, and/or instructions for running one or more digital engineering models, tests, and/or simulations using a subset of the digital engineering tools 102 (e.g., manufacturing M&S tools 102F-102G).

In any of the above examples, the computing system 108 can receive the data transmitted from the user device 106A and/or the API 106B and can process the data to evaluate whether the common V&V product of interest (e.g., regulatory standard 110E, medical standard 110G, medical certification regulation 110H, manufacturing standard 110I, manufacturing certification regulation 110J, etc.) is satisfied by the user's digital prototype. For example, this can involve communicating with the repository of common V&V products 110 (via the API/SDK 116) to retrieve the relevant common V&V product of interest and processing the regulatory and/or certification data associated with the common V&V product to identify one or more requirements for the UAV prototype; the drug, chemical compound, or biologic prototype; the manufacturing process prototype; etc. In some implementations, the repository of common V&V products 110 can be hosted by a regulatory and/or certification authority (or another third party), and retrieving the regulatory and/or certification data can involve using the API/SDK 116 to interface with one or more data resources maintained by the regulatory and/or certification authority (or another third party). In some implementations, the regulatory and/or certification data can be provided directly by the user 104 via the user device 106A and/or the API 106B (e.g., along with the prototype data).

Evaluating whether the common V&V product of interest (e.g., regulatory standard 110E, medical standard 110G, medical certification regulation 110H, manufacturing standard 110I, manufacturing certification regulation 110J, etc.) is satisfied by the user's digital prototype can also involve processing the prototype data received from the user device 106A or the API 106B to determine if the one or more identified requirements are actually satisfied. In some implementations, the computing system 108 can include one or more plugins, local applications, etc. to process the prototype data directly at the computing system 108. In some implementations, the computing system can simply pre-process the received prototype data (e.g., to derive inputs for the digital engineering tools 102) and can then transmit instructions and/or input data to a subset of the digital engineering tools 102 via the API/SDK 114 for further processing.

Not all digital engineering tools 102 are necessarily required for the satisfaction of particular regulatory and/or certification standards. Therefore, in the UAV example provided in FIG. 1, the computing system 108 may determine that only a data analysis tool 102A and a finite element analysis tool 102B are required to satisfy the regulatory standard 110E for failure conditions. In the drug, chemical compound, or biologic example provided in FIG. 1, the computing system 108 may determine that only drug M&S tools 102D-102E are required to satisfy the medical standard 110G and medical certification regulation 110H. In the manufacturing process example provided in FIG. 1, the computing system 108 may determine that only manufacturing M&S tools 102F-102G are required to satisfy the manufacturing standard 110I and manufacturing certification regulation 110J. In other implementations, the user 104 may themselves identify the particular subset of the digital engineering tools 102B that should be used to satisfy the common V&V product of interest, provided the user 104 is a qualified subject matter expert. In other implementations, the user 104 may input to the computing system 108 some suggested digital engineering tools 102 to satisfy a common V&V product of interest, and the computing system 108 can recommend to the user 104 a modified subset of the digital engineering tools 102 for final approval by the user 104, provided the user 104 is a qualified subject matter expert. After a subset of the digital engineering tools 102 has been identified, the computing system 108 can then transmit instructions and/or input data to the identified subset of the digital engineering tools 102 to run one or more digital engineering models, tests, and/or simulations. The results (or "engineering-related data outputs") of executing these models, tests, and/or simulations can be transmitted back and received at the computing system 108.

In some implementations, the user 104 may input a required digital engineering tool (e.g., digital engineering tool 102F) for meeting a common V&V product 110I, and the computing system 108 can determine that another digital engineering tool (e.g., digital engineering tool 102G) is also required to satisfy the common V&V product 110I. The computing system can then transmit instructions and/or input data to both digital engineering tools (e.g., digital engineering tools 102F and 102G), and the outputs of these digital engineering tools can be transmitted and received at the computing system 108. In some cases, the input data submitted to one of the digital engineering tools (e.g., digital engineering tool 102G) can be derived (e.g., by the computing system 108) from the output of another of the digital engineering tools (e.g., digital engineering tool 102F).

After receiving engineering-related data outputs from the digital engineering tools 102, the computing system 108 can then process the received engineering-related data outputs to evaluate whether the requirements identified in the common V&V product of interest (e.g., regulatory standard 110E, medical standard 110G, medical certification regulation 110H, manufacturing standard 110I, manufacturing certification regulation 110J, etc.) are satisfied. In some implementations, the computing system 108 can generate a report summarizing the results of the evaluation and can transmit the report to the user device 106A or the API 106B for review by the user 104. If all of the requirements are satisfied, then the prototype can be certified, resulting in the digitally certified product 112 (e.g., the digitally certified drug, chemical compound, or biologic 112A; the digitally certified UAV 112B; the digitally certified manufacturing process 112C, etc.). However, if some of the regulatory requirements are not satisfied, additional steps may need to be taken by the user 104 to certify the prototype of the product. In some cases, when some of the regulatory requirements are not satisfied, the prototype may be partially certified. In some implementations, the report that is transmitted to the user can include recommendations for these additional steps (e.g., suggesting one or more design changes, suggesting the replacement of one or more components with a previously designed solution, suggesting one or more adjustments to the inputs of the models, tests, and/or simulations, etc.). If the requirements of a common V&V product are partially met, or are beyond the collective capabilities of the distributed engineering tools 102, the computing systems 108 may provide the user 104 with a report recommending partial certification, compliance, or fulfillment of a subset of the common V&V products (e.g., digital certification of a subsystem or a sub-process of the prototype). The process of generating recommendations for the user 104 is described in further detail below.

In response to reviewing the report, the user 104 can make design changes to the digital prototype locally and/or can send one or more instructions to the computing system 108 via the user device 106A or the API 106B. These instructions can include, for example, instructions for the computing system 108 to re-evaluate an updated prototype design, use one or more different digital engineering tools 102 for the evaluation process, and/or modify the inputs to the digital engineering tools 102. The computing system 108 can, in turn, receive the user instructions, perform one or more additional data manipulations in accordance with these instructions, and provide the user 104 with an updated report. Through this iterative process, the user 104 can utilize the interconnected digital engineering and certification ecosystem 100 to design and ultimately certify (e.g., by providing certification compliance information) the prototype (e.g., the UAV prototype, drug prototype, manufacturing process prototype, etc.) with respect to the common V&V product of interest. Importantly, since all of these steps occur in the digital world (e.g., with digital prototypes, digital models/tests/simulations, and digital certification), significant time, cost, and materials can be saved in comparison to a process that involves the physical prototyping, evaluation, and/or certification of a similar UAV, drug, manufacturing process, etc. If the requirements associated with a common V&V product are partially met, or are beyond the collective capabilities of the digital engineering tools 102, the computing system 108 may provide the user 104 with a report recommending partial certification, compliance, or fulfillment of a subset of the common V&V products (e.g., digital certification of a subsystem or a sub-process of the prototype).

While the examples described above focus on the use of the interconnected digital engineering and certification ecosystem 100 by a single user, additional advantages of the ecosystem 100 can be realized through the repeated use of the ecosystem 100 by multiple users. As mentioned above, the central positioning of the computing system 108 within the architecture of the ecosystem 100 enables the computing system 108 to monitor and store the various data flows through the ecosystem 100. Thus, as an increasing number of users utilize the ecosystem 100 for digital product development, data associated with each use of the ecosystem 100 can be stored (e.g., in the storage 118) and analyzed to yield various insights, which can be used to further automate the digital product development process and to make the digital product development process easier to navigate for non-subject matter experts.

In some implementations, user credentials for the user 104 can be indicative of the skill level of the user 104, and can control the amount of automated assistance the user is provided. For example, non-subject matter experts may only be allowed to utilize the ecosystem 100 to browse pre-made designs and/or solutions, to use the digital engineering tools 102 with certain default parameters, and/or to follow a predetermined workflow with automated assistance directing the user 104 through the product development process. Meanwhile, users that are more skilled may still be provided with automated assistance, but may be provided with more opportunities to override default or suggested workflows and settings.

In some implementations, the computing system 108 can host applications and services 122 that automate or partially automate components of common V&V products; expected or common data transmissions, including components of data transmissions, from the user 104; expected or common interfaces and/or data exchanges, including components of interfaces, between various digital engineering tools 102; expected or common interfaces and/or data exchanges, including components of interfaces, with machine learning models implemented on the computing system 108 (e.g., models trained and/or implemented by the machine learning engine 120); and expected or common interfaces and/or data exchanges between the applications and services themselves (e.g., within the applications and services layer 122).

In some implementations, the data from multiple uses of the ecosystem 100 (or a portion of said data) can be aggregated to develop a training dataset. This training dataset can then be used to train machine learning models (e.g., using the machine learning engine 120) to perform a variety of tasks including the identification of which of the digital engineering tools 102 to use to satisfy a particular common V&V product; the identification of specific models, tests, and/or simulations (including inputs to them) that should be performed using the digital engineering tools 102; the identification of the common V&V products that need to be considered for a product of a particular type; the identification of one or more recommended actions for the user 104 to take in response to a failed regulatory requirement; the estimation of model/test/simulation sensitivity to particular inputs; etc. The outputs of the trained machine learning models can be used to implement various features of the interconnected digital engineering and certification ecosystem 100 including automatically suggesting inputs (e.g., inputs to the digital engineering tools 102) based on previously entered inputs, forecasting time and cost requirements for developing a product, predictively estimating the results of sensitivity analyses, and even suggesting design changes, original designs, or design alternatives (e.g. via assistive or generative AI) to a user's prototype to overcome one or more requirements (e.g., regulatory and/or certification requirements) associated with a common V&V product. In some implementations, with enough training data, the machine-learning engine 120 may generate new designs, models, simulations, tests, and/or common V&V products on its own based on data collected from multiple uses of the ecosystem 100.

In addition to storing usage data to enable the development of machine learning models, previous prototype designs and/or solutions (e.g., previously designed components, systems, models, simulations and/or other engineering representations thereof) can be stored within the ecosystem 100 (e.g., in storage 118) to enable users to search for and build upon the work of others. For example, previously designed components, systems, models, simulations and/or other engineering representations thereof can be searched for by the user 104 and/or suggested to the user 104 by the computing system 108 in order to satisfy one or more requirements associated with a common V&V product. The previously designed components, systems, models, simulations, and/or other engineering representations thereof can be utilized by the user 104 as is, or can be utilized as a starting point for additional modifications. This store, or repository, of previously designed components, systems, models, simulations, and/or other engineering representations thereof (whether they were ultimately certified) can be monetized to create a marketplace of digital products, which can be utilized to save time during the digital product development process, inspire users with alternative design ideas, avoid duplicative efforts, and more. In some implementations, data corresponding to previous designs and/or solutions may only be stored if the user who developed the design and/or solution opts to share the data. In some implementations, the repository of previous designs and/or solutions can be containerized for private usage within a single company, team, organizational entity, or technical field for private usage (e.g., to avoid the unwanted disclosure of confidential information). In some implementations, user credentials associated with the user 104 can be checked by the computing system 108 to determine which designs and/or solutions stored in the repository can be accessed by the user 104. In some implementations, usage of the previously designed components, systems, models, simulations, and/or other engineering representations thereof may be available only to other users who pay a fee for a usage.

Figure 2:
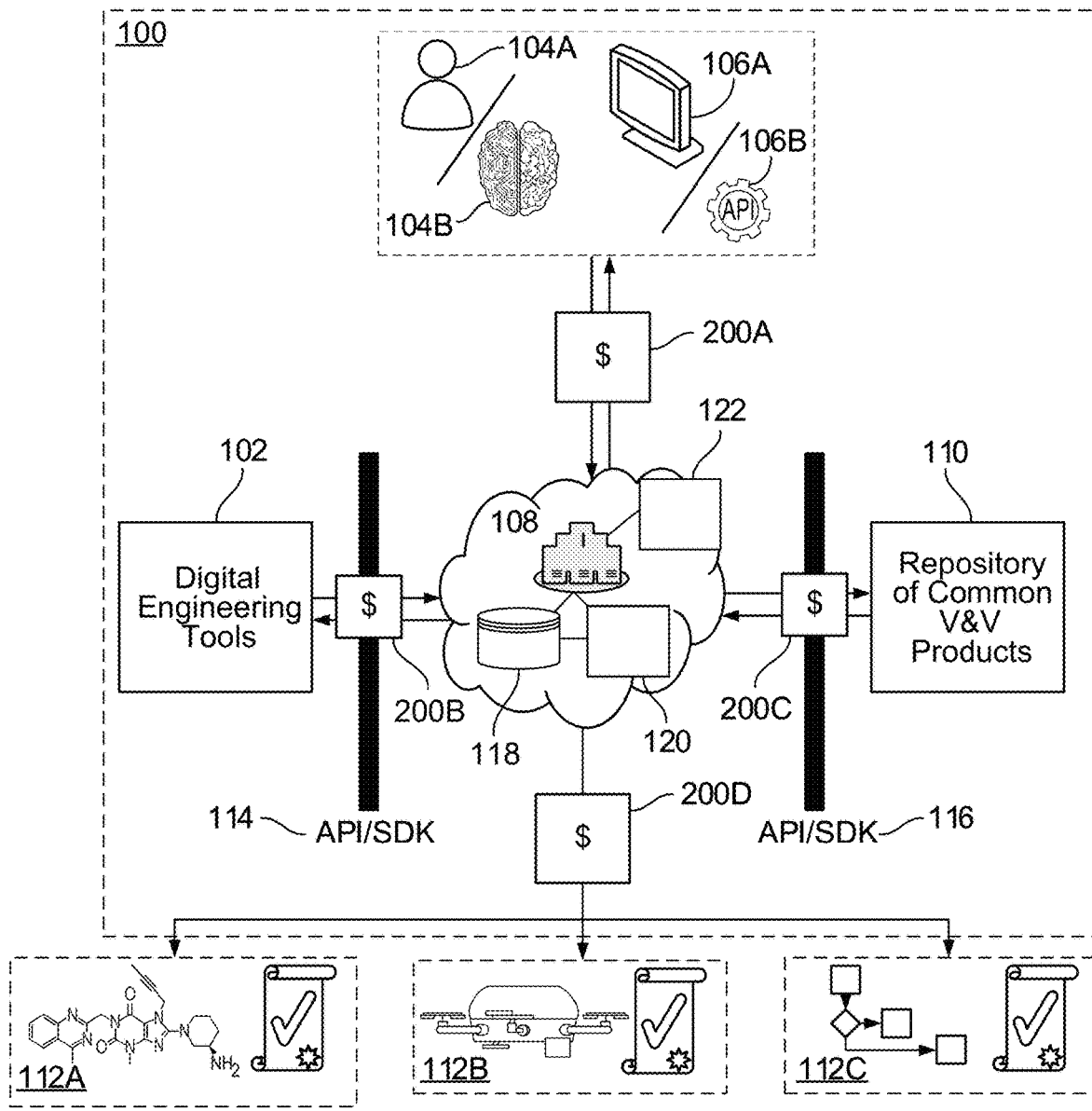
FIG. 2 is a diagram showing how an interconnected digital engineering and certification ecosystem can be monetized.

In FIG. 2, the interconnected digital engineering and certification ecosystem 100 presents various different opportunities for monetization (shown as blocks 200A-200D). In some implementations, interactions between the user 104 and the computing system 108 can include an opportunity for monetization 200A. For example, the user 104 can be charged to send instructions to the computing system 108 and/or the user 104 can be charged to download data from the computing system 106 (e.g., certification reports). Charges can be subscription-based (e.g., charging a monthly or annual fee to use the computing system 108), usage-based (e.g., charging the user 104 based on a number of interactions with the computing system 108, an amount of time spent interacting with the computing system 108, etc.), or mixed (e.g., using a freemium model).

In some implementations, interactions between the computing system 108 and the digital engineering tools 102 can include an opportunity for monetization 200B. For example, the user 104 can be charged for sending data between the computing system 108 and/or the digital engineering tools 102. In some implementations, the charges paid by the user 104 can be split between third party providers of the digital engineering tools 102 and a party that operates the computing system 108. In some implementations, the third-party providers of the digital engineering tools 102 may themselves pay a fee to the operator of the computing system 108 to have their digital engineering tools be included in the ecosystem 100. Charges to the user 104 can be subscription-based (e.g., charging a monthly or annual fee to gain access to particular digital engineering tools 102), usage-based (e.g., charging the user 104 based on an amount of data transferred between the digital engineering tools 102 and the computing system 108, an amount of processing time required by the digital engineering tools 102, etc.), or mixed (e.g., using a freemium model).

In some implementations, interactions between the computing system 108 and the repository of common V&V products 110 can include an opportunity for monetization 200C. For example, the user 104 can be charged for sending data between the computing system 108 and/or the repository of common V&V products 110. In some implementations, the charges paid by the user 104 can be split between the authorities operating the repository of common V&V products 110 and a party that operates the computing system 108. Charges to the user 104 can be subscription-based (e.g., charging a monthly or annual fee to gain access to the repository of common V&V products 110), usage-based (e.g., charging the user 104 based on an amount of data transferred between the repository of common V&V products 110 and the computing system 108, a number of common V&V products requested, etc.), or mixed (e.g., using a freemium model).

In some implementations, the ultimate certification of the digitally certified products 112 by the computing system 108 can also include an opportunity for monetization 200D. For example, the user 104 can be charged a fee to perform a formal certification of the user's product. In addition, or alternatively, the user 104 can be charged a fee to download a proof of certification.

In some implementations, the digital engineering and certification ecosystem 100 can utilize different security aspects to have a direct impact on the usage impact on the computing system 108 to address the specific digital engineering task implied by the user request. In some examples, in the computing system 108, there are multiple avenues where user requests can directly impact usage activity on the computing system 108 and indirectly cause additional computation and analysis to address the specific digital engineering task implied by the user request. Across each of these multiple avenues, the computing system 108 can utilize idempotency tokens that are split as fungible idempotent tokens and nonfungible idempotent tokens to preserve data sovereignty while tracking usage consistently for monetization. In each of the avenues, the jobs service layer can generate, store, and validate both the fungible and non-fungible idempotent tokens. In some examples, the digital engineering platform, e.g., the control plane, can create and issue the fungible tokens. In some examples, the customer environment, e.g., the data plane, can issue the non-fungible tokens. As illustrated in FIG. 2, the monetization 200A, 200B, 200C, and 200D include the use of idempotency tokens to track the activity within the digital engineering platform in a zero-trust fashion. The idempotency tokens are used, for example, to avoid duplication of tasks and ensure reliable means for monetization and subsequent cost optimization.

Figure 3:
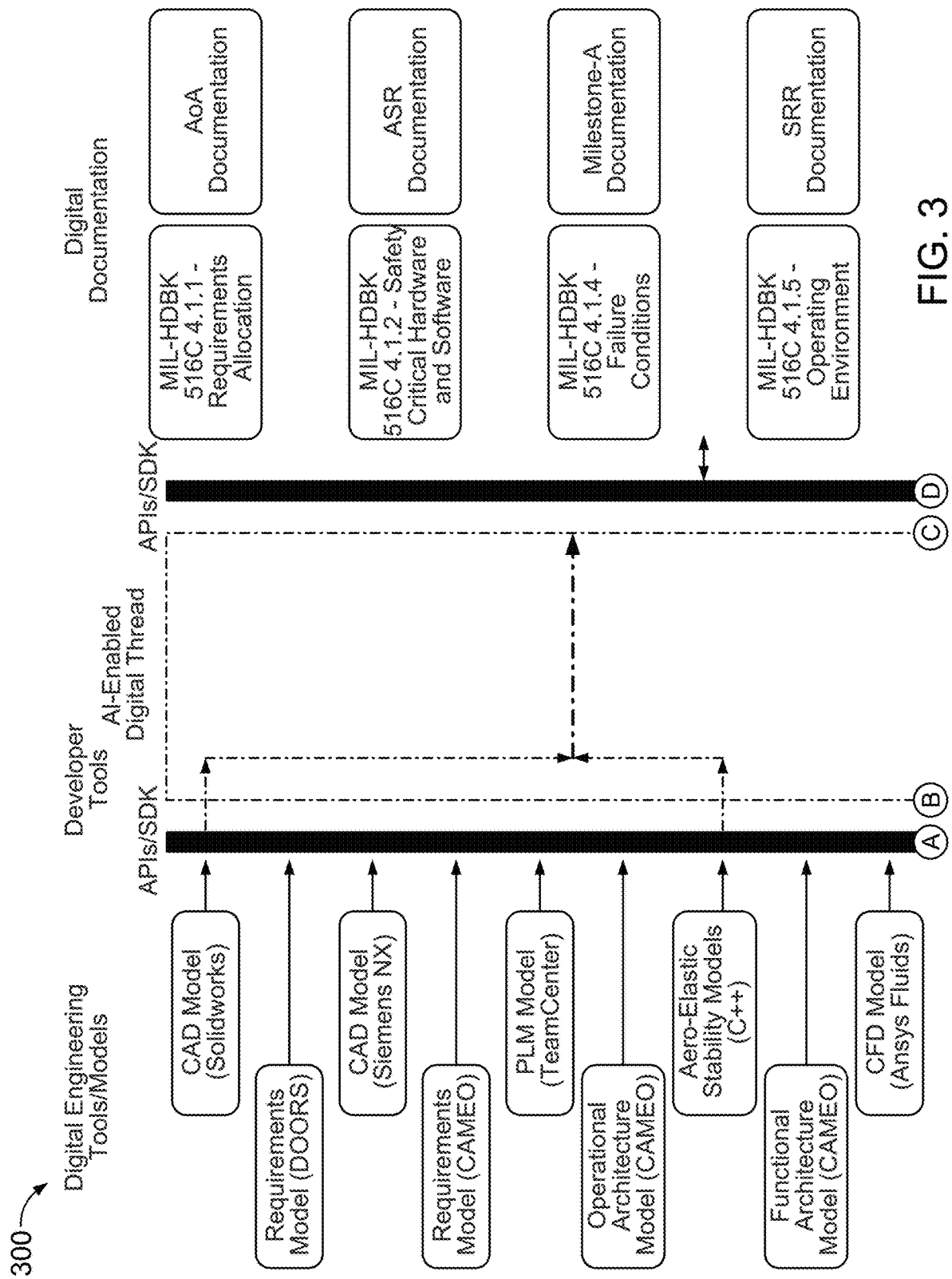
FIG. 3 illustrates a diagram of digital engineering (DE) splices and documents splices used in an interconnected digital ecosystem or a platform.
Figure 3:
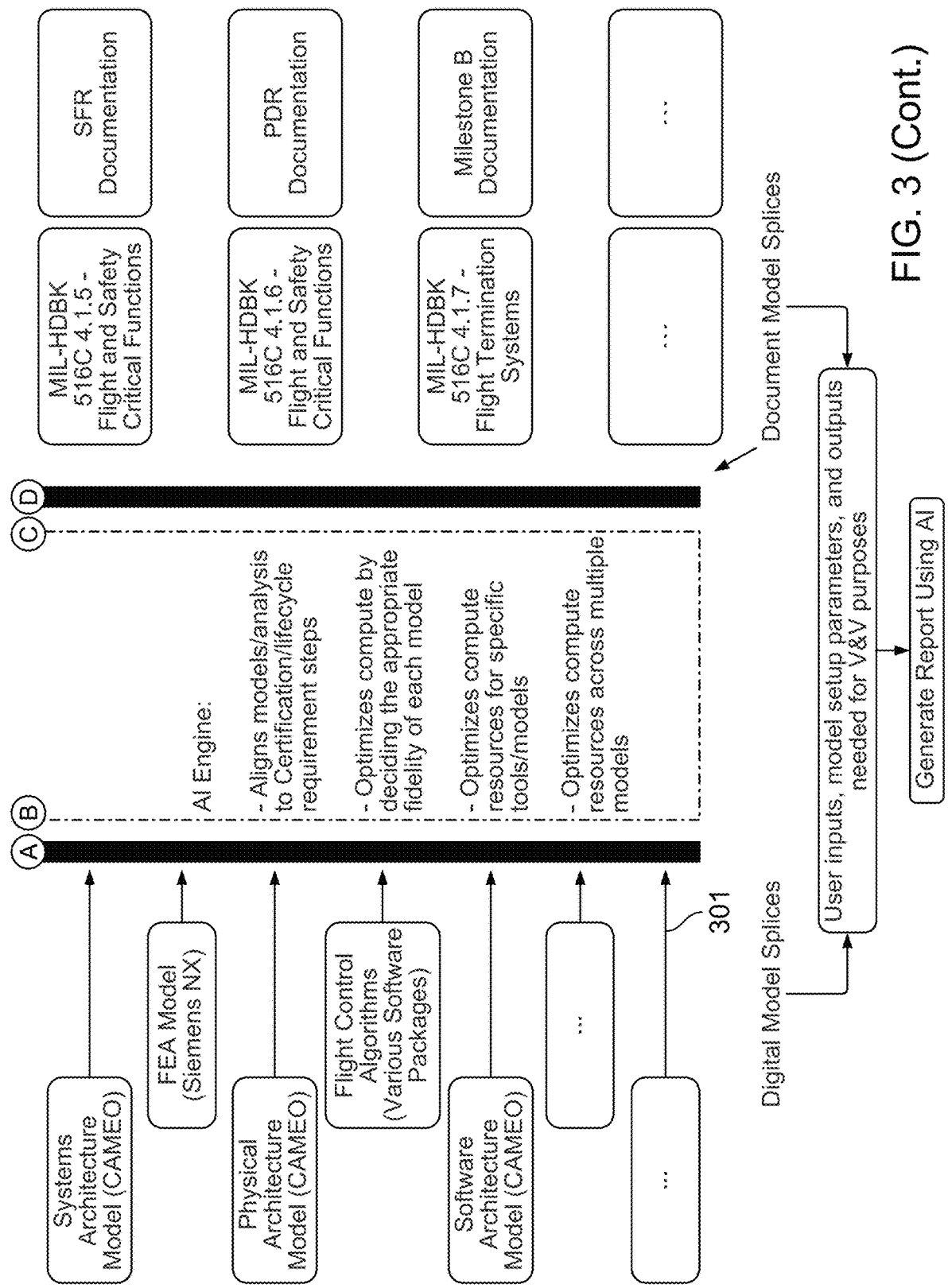

FIG. 3 shows exemplary model splicers in an interconnected DE ecosystem or digital platform, according to some embodiments of the present invention. Both are described in detail in U.S. provisional patent application Nos. 63/462,988, filed on Apr. 29, 2023, titled "Model Splicer and Microservice Architecture for Digital Engineering" and 63/470,870, filed on Jun. 3, 2023, titled "Digital Twin and Physical Twin Management with Integrated External Feedback within a Digital Engineering Platform", PCT Application Number PCT/US2024/018278 filed on Mar. 3, 2024 (published as PCT Publication Number WO2024186709A1, published on Sep. 12, 2024) and titled "Secure and Scalable Model Splicing of Digital Engineering Models for Software-Code-Defined Digital Threads") and PCT Application Number PCT/US24/27898 filed on May 4, 2024, titled "Digital Twin Enhancement using External Feedback within Integrated Digital Model Platform," incorporated by reference in their entireties herein.

In short, the interconnected or integrated DE and certification ecosystem as disclosed herein is a computer-based, integrated digital system that links models and simulation tools with their relevant digital documentations in order to meet verification, validation, and certification purposes. The ecosystem connects and bridges large numbers of disparate DE tools, models from multitudes of engineering domains and fields, and documentations that are used to manage the overall DE lifecycle. This robust, scalable, and efficient engineering model collaboration platform uses novel model splicing technology to standardize and generalize spliced DE model data, documentations, and API interfaces and functions for fast evolving DE tools and model types, and ever-more-complex systems. The capability to connect and orchestrate live DE model and document splices via APIs provides a unified software infrastructure for complex system design and certification.

Model splicing is also described in detail in U.S. provisional patent application No. 63/451,545, filed Mar. 10, 2023, titled "Digital Threads in Digital Engineering Systems, and Supporting AI-Assisted Digital Thread Generation," PCT Application Number PCT/US2024/019297, filed on Mar. 10, 2024 (published as PCT Publication No.: WO2024191882, published on Sep. 19, 2024), and titled "Software-Code-Defined Digital Threads in Digital Engineering Systems with Artificial Intelligence (AI) Assistance," U.S. provisional patent application No. 63/451,577, filed Mar. 11, 2023, titled "Model Splicer and Microservice Architecture for Digital Engineering," PCT Application Number PCT/US2024/018278 filed Mar. 10, 2024, (published as PCT Publication No.: WO2024186709, published on Sep. 12, 2024) and titled "Secure and Scalable Model Splicing of Digital Engineering Models for Software-Code-Defined Digital Threads," U.S. provisional patent application No. 63/516,624, filed Jul. 31, 2023, titled "Document and Model Splicing for Digital Engineering," and PCT Application Number PCT/US24/27912, filed on May 5, 2024 (published with PCT Application Publication No.: WO/2024/163759, published on Aug. 8, 2024), titled "Artificial Intelligence (AI) Assisted Digital Documentation for Digital Engineering," incorporated by reference in their entireties herein.

A DE model type-specific model splicer stores model data extracted from a DE model file in a model type-specific data structure. A DE model splicer 301 further generates Application Programming Interface (API) function scripts that can be applied to the DE model data. A DE "model splice" or "wrapper" for a given user application can be generated by wrapping DE model data and API function scripts that are specific to the user application, thus allowing only access to and enabling modifications of limited portions of the original engineering model file for collaboration and sharing with stakeholders of the given user application.

Similarly, a document splicer is a document-specific model splicer, where the input model is a human-readable document. A "document" refers to a piece of text or graphics that is directly readable by a human without the need of additional machine compilation, rendering, visualization, or interpretation. A "document splice", "document model splice" or "document wrapper" for a given user application can be generated by wrapping document data and API function scripts that are specific to the user application, thus revealing text at the component (e.g., paragraph) level via API endpoints, and allowing access to and enabling modifications of portions of an original document or document template for collaboration and sharing with stakeholders of the given user application, while minimizing manual referencing and human errors.

In this disclosure, the term "model splicer" refers to a software module or collection of templates that can be used to generate DE model or document model splices/wrappers. "Model splicer generation" refers to the process of setting up a model splicer, or establishing an all-encompassing framework or template, from which individual model splices can be deduced. Furthermore, the terms "model splice," "model wrapper," "splice node," "splicer node," and "wrapper node" may be used interchangeably to represent a DE model or document model splicing result.

A model splice or wrapper makes available a subset of a model file through a set of API endpoints. "API endpoints" generated via splicing provide access for inputs and/or outputs to one or more API scripts encapsulated in the model splice. Corresponding API endpoints can be linked between different DE model splices and document splices, wherein output from a preceding model splice may be provided as inputs to a subsequent model splice, allowing for information flow, thus creating a digital thread to propagate requirement and/or design changes throughout a complex engineering system, and to enable seamless collaboration and sharing among individuals performing digital engineering tasks.

Figure 4A:
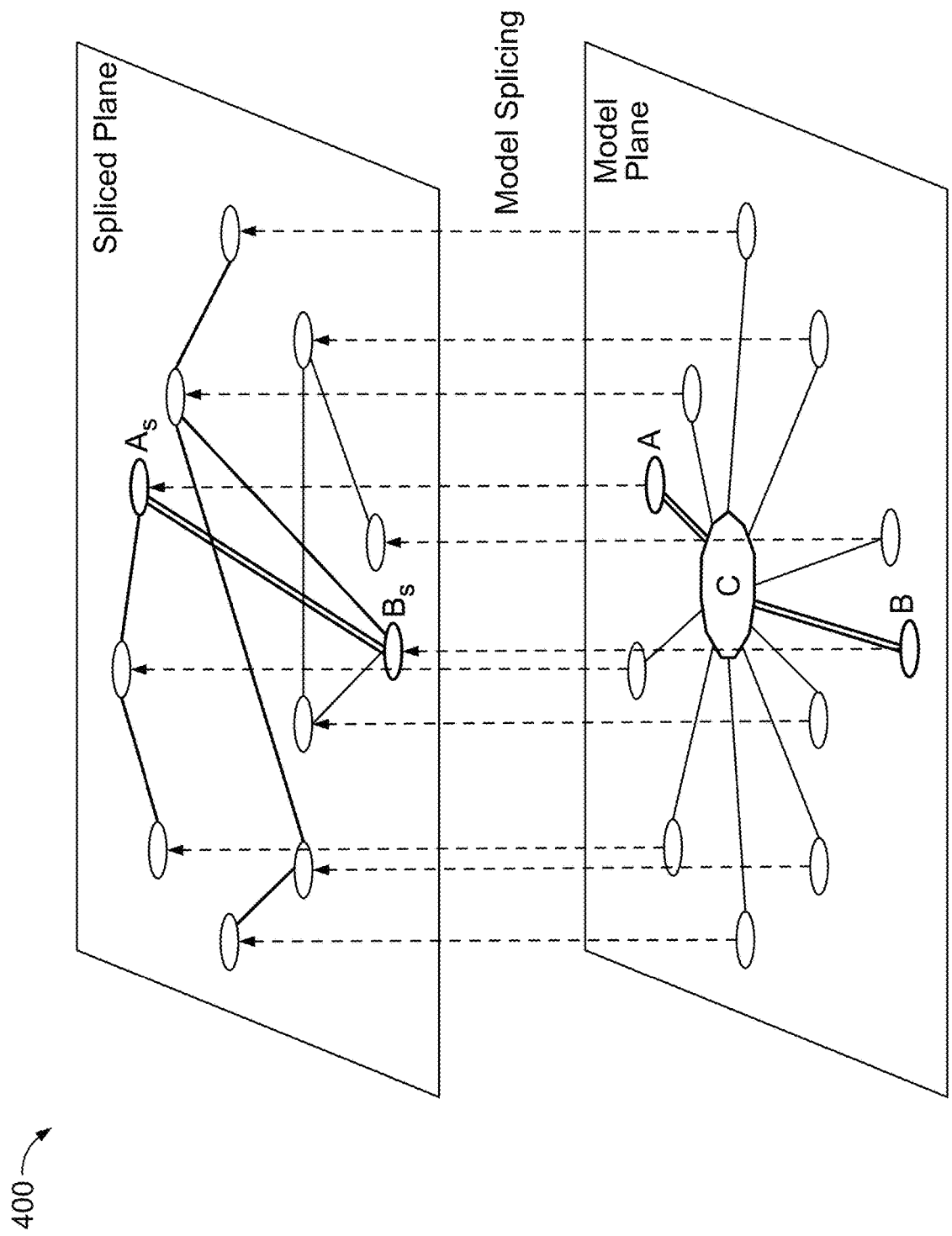
FIG. 4A illustrates a schematic diagram comparing digital threading with and without model splicing.

FIG. 4A is a schematic diagram 400 comparing digital threading with and without model splicing, in accordance with the examples disclosed herein. The bottom "Model Plane" demonstrates current digital threading practices, where each small oval represents a digital model, and the linking between any two digital models, such as A and B, requires respective connections to a central platform C, and potential linkages from every model to every other model. The central platform C comprises program code that is able to interpret and manipulate original digital models of distinct model types. For example, platform C under the control of a subject matter expert may prepare data from digital model A into formats that can be accessed by digital model B via digital model B's native APIs, thus allowing modifications of digital model A to be propagated to digital model B. Any feedback from digital model B to digital model A would require similar processing via platform C so that data from digital model B are converted into formats that can be accessed by digital model A via digital model A's native APIs. This hub-and-spoke architecture is not scalable to complex digital threads with multiple links involving many different types of digital models as it requires not only pairwise data conversion, which scales as $n^2$ complexity for a set of n different digital models, but also proprietary access to native platforms/APIs associated with each individual digital model type. That is, this hub-and-spoke architecture is not scalable to the sheer number (e.g., hundreds or thousands) of digital models involved within typical large-scale digital engineering projects, as model updates and feedback are only possible through the central platform C.

In contrast, once the digital models are spliced according to embodiments of the present invention as described herein, each original model is represented by a model splice comprising relevant model data, unified and standardized API endpoints for data input/output, and encapsulated API functions, as shown in the upper "Spliced Plane." Hence, model splicing allows model splices such as model splice $A_s$ from digital model A and model splice $B_s$ from digital model B to access each other's data purposefully and directly, thus enabling the creation of a model-based "digital mesh" via platform scripts and even autonomous linking without input from subject matter experts.

An added advantage of moving from the Model Plane to the Spliced Plane is that the digital engineering and certification platform enables the creation of multiple splices per native model (e.g., FIG. 9), each with different subsets of model data and API endpoints tailored to the splice's targeted use. For example, model splices connected into a spliced plane may be used to generate a digital twin that maps a physical product or object into the virtual space. Two-way data exchanges between a physical object and its digital object twin enable the testing, optimization, verification, and validation of the physical object in the virtual world, by choosing optimal digital model configuration and/or architecture combinations from parallel digital twins/spliced planes, each reacting potentially differently to the same feedback from the physical object.

Thus, within the integrated digital engineering and certification ecosystem, model splicers can connect digital engineering models and tools individually and provide the core capability for the system, improve scalability and versatility of model usage, and lower the need for expert skills when managing multiple models. Furthermore, model splicers unbundle monolithic access to digital model-type files as whole files and instead provide specific access to a subset of functions or that allow limited, purposeful, and auditable interactions with subsets of the model-type files built from component parts or atomic units that assemble to parts.

Figure 4B:
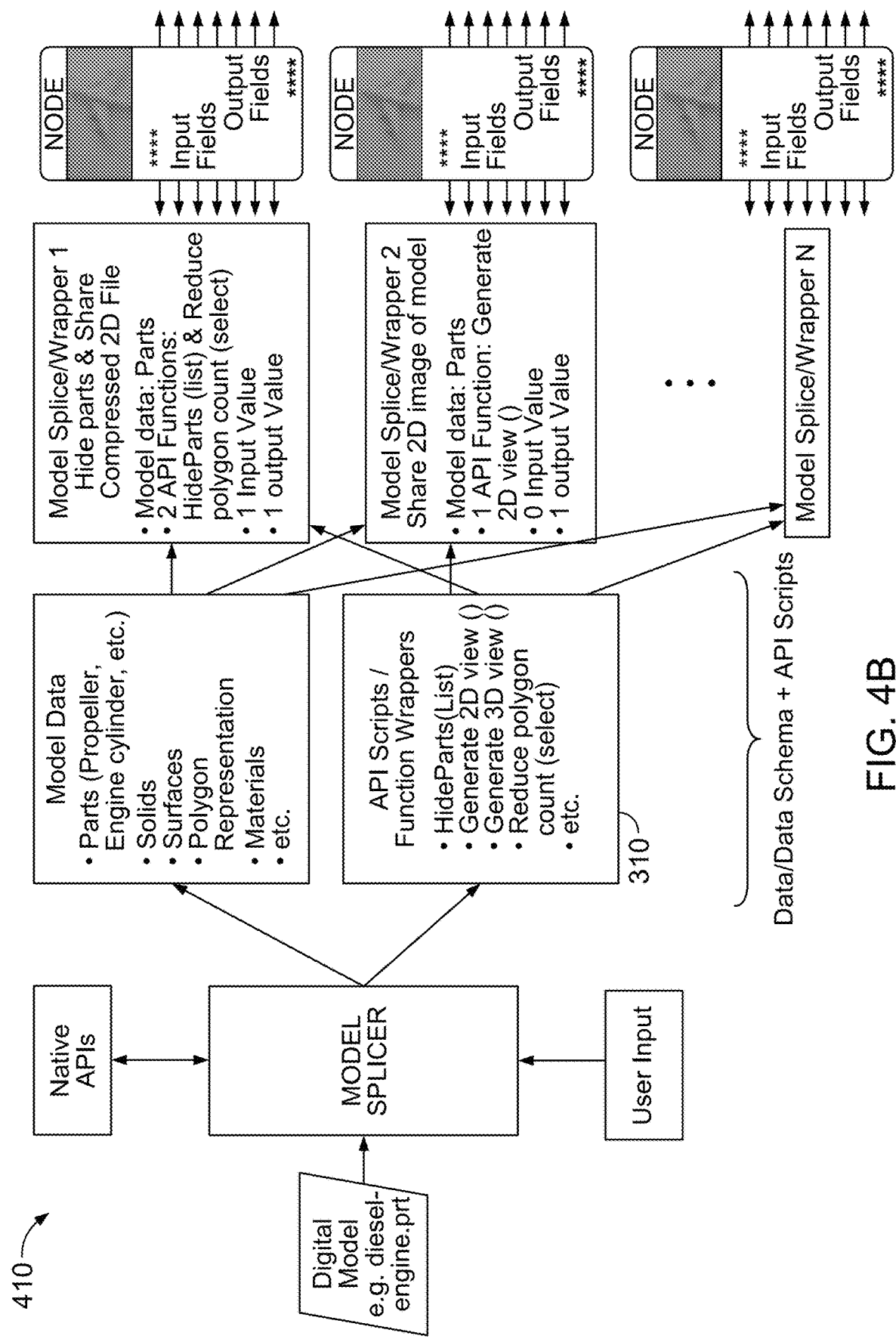
FIG. 4B illustrates a schematic diagram showing an exemplary model splicing setup.

FIG. 4B is a schematic showing an exemplary model splicing setup, with an embedded CAD model splicing example, in accordance with the examples disclosed herein. Although the embedded CAD model splicing example is illustrated in FIG. 4B, this setup can apply to the model splicing of any type of input digital model.

In this illustrative example 410, a CAD digital model file diesel-engine.prt is processed by a model splicer, which crawls through the input file and extracts model data, including but not limited to, parts (e.g., propeller, engine cylinder, engine cap, engine radiator, etc.), solids, surfaces, polygon representation, materials, etc. The model splicer further generates API scripts/function wrappers from native APIs associated with the CAD model, which may be proprietary or open source. For example, the model splicer may generate API scripts that call upon native APIs to perform functions such as: HideParts(parts_list), Generate2DView( ), Generate3DView( ), ReducePolygonCount(Select), etc.

In this disclosure, the terms "native" and "primal" are used to refer to digital engineering model files, functions, and API libraries that are associated with proprietary digital engineering tools/platforms. On the other hand, open-source resources are considered non-proprietary. The HideParts (parts_list) API function takes as input a list of model parts. It hides the selected parts from a model file. The ReducePolygonCount API function takes as input a reduction level (e.g., high, medium, low, lowest). The ReducePolygonCount API function decreases the fidelity of a model by reducing the number of polygons in its polygon representation according to the input.

Next, based on user input or desired user application, one or more model splices/wrappers may be generated, wrapping a subset or all of the model data needed for the user application with API functions that can be applied to the model data to perform the desired operations. For example, a "Hide parts & Share Compressed 2D file" wrapper may be generated to wrap physical parts of the propeller engine and two API functions: HideParts(parts_list) and ReducePolygonCount (Select). This model wrapper takes an input value for API function input and can produce as an output a reduced 3D version of the original input diesel-engine.prt file. Similarly, a "Share 2D Image" model wrapper may be created by the model splicer, including model data and the API function Generate2DView( ). Any number of model splices/wrappers may be generated by the model splicer by combining a selection of the model data and the API scripts. Each model wrapper can be viewed as a node, which includes input and outputs as API handles/endpoints that can be used to execute the model wrapper and establish links with other model wrappers without relying on native APIs.

More generally, a "model splicer" can splice an engineering model file of a particular model type. For the given digital engineering model type, the model splicer generates a model-type specific data structure to store model data that are extracted from the engineering model file and represent a subset (or the complete set) of the engineering model file. The model splicer further generates API function scripts that can be applied to the model data. A "model splice" or "wrapper" for a given user application can be generated by wrapping model data and API function scripts that are specific to the user application, thus allowing only access to and enabling modifications of limited portions of the original engineering model file for collaboration and sharing with stakeholders of the given user application. In this disclosure, the term "model splicer" may refer to the software engine that generates model splices or model wrappers for different types of model types. The term "model splicer" may also refer to individual model type-specific software modules that splices input files of a particular model type. A model splice may also be called a splice node or a wrapper node, as shown in FIG. 4B. The input and output fields to a splice node are API endpoints, which may be input and output fields to the API functions contained in the model splice. That is, an API endpoint is an access point for a specific function, and may indicate its address and point to specific variables that are parsed through to the function at that endpoint. API endpoints are generated via splicing, and can be used to link to multiple model splices by feeding the output from a splice of a first model to the input of a splice of a second model.

A model splice/wrapper makes available a subset of a model file through its API endpoints. In some embodiments, these API endpoints may point to the location of the whole model. In some embodiments, the model splicer may be used to share a sub-model. In other embodiments, even if the splicer only provides limited API endpoints, the pointer to the whole model may be available for context (e.g., a model splice/wrapper that shares a CAD model with hidden sub-assemblies may still internally connect with the whole model in order to know the assembly structure).

Figure 5:
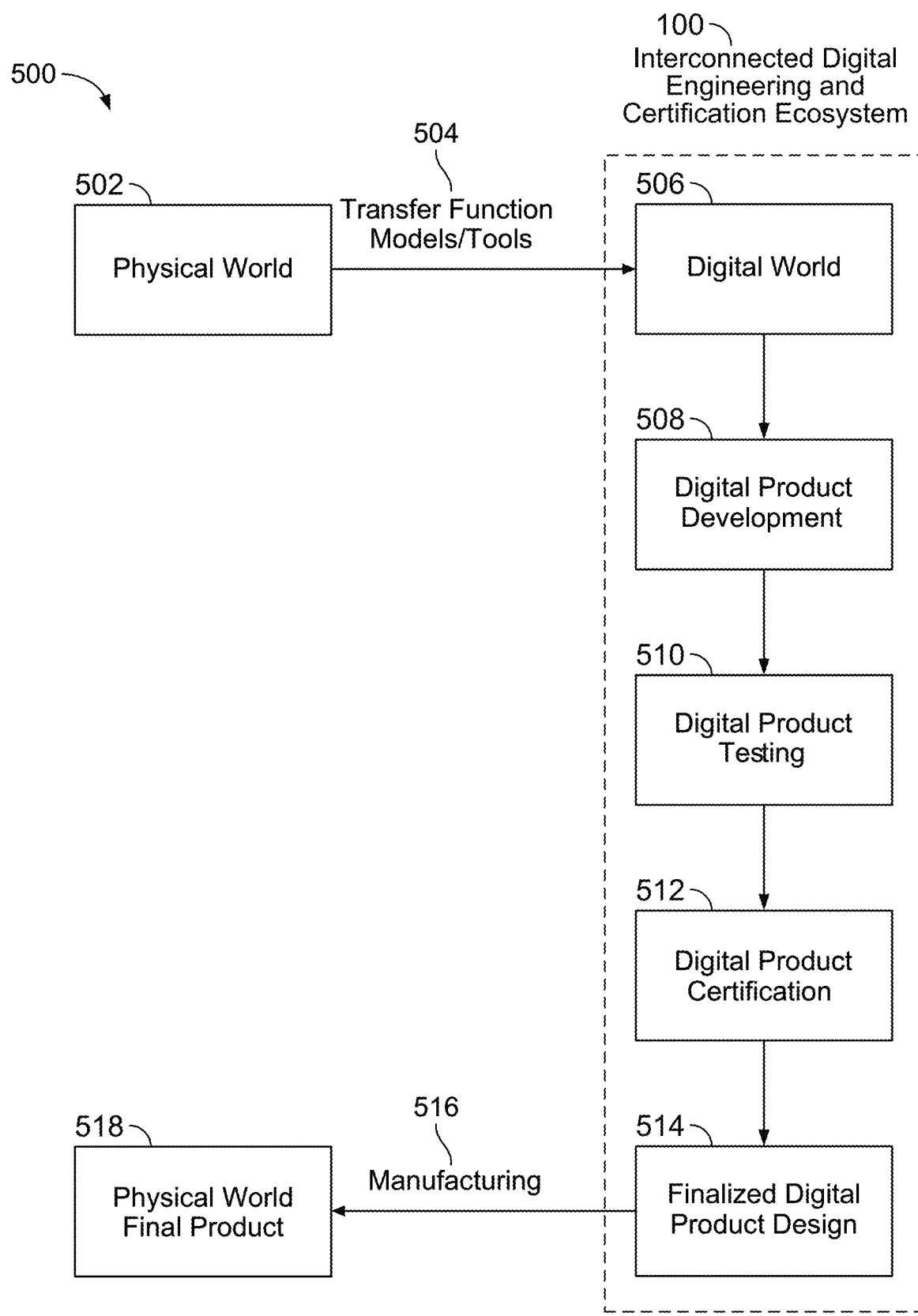
FIG. 5 is a flow chart showing an example product design process using an interconnected digital engineering and certification ecosystem.

In FIG. 5, a flow chart 500 is depicted, illustrating an example product design process using the interconnected digital engineering and certification ecosystem 100. By translating elements and characteristics such as laws of physics from the physical world 502 to a digital world 506, via transfer function models and tools 504, product development and certification can be enabled entirely (or nearly entirely or partially) within the ecosystem 100. It is noted that the entire physical world need not be perfectly replicated all at once, but in some cases, very specific subsets of the physical world can be described digitally by any number of models or simulations (e.g., a model describing turbulent flow of air between 200 and 600 knots, complemented by another model describing turbulent flow of air between 500 and 800 knots), which all together add up to a sufficient representation of the physical world so as to allow for certification of specific systems or products. An interconnected digital engineering and certification ecosystem (e.g., the ecosystem 100) can allow for each of these pieces to be added individually by many different people and many different entities without the need for coordination and with aligned incentives (e.g., enabled by protection of intellectual property, monetization of models or valuable digital representations of the physical world, etc.), to allow the digital representation of the physical world to be built in a modular and complementary manner, enabling each of the models or simulations to connect to one another and build off of one another. For example, digital product development 508, digital product testing 510, and digital product certification 512 can all occur within the ecosystem 100, taking place entirely within a digital realm or "metaverse" to produce a finalized digital product design 514. Following this product design process, the finalized digital product design need only be translated into the physical world (e.g., via manufacturing 516) to produce a physical world final product 518 at the very end of the product design process. This is in stark contrast to current product development and certification workflows, which may utilize digital engineering tools, but oftentimes still require the physical manufacturing, testing, and certification of prototypes throughout the iterative product development, product testing, and product certification process. Compared to such workflows, the product design process enabled by the interconnected digital engineering and certification ecosystem 100, can therefore yield significant savings of time, cost, materials, and environmental impact.

Figure 6:
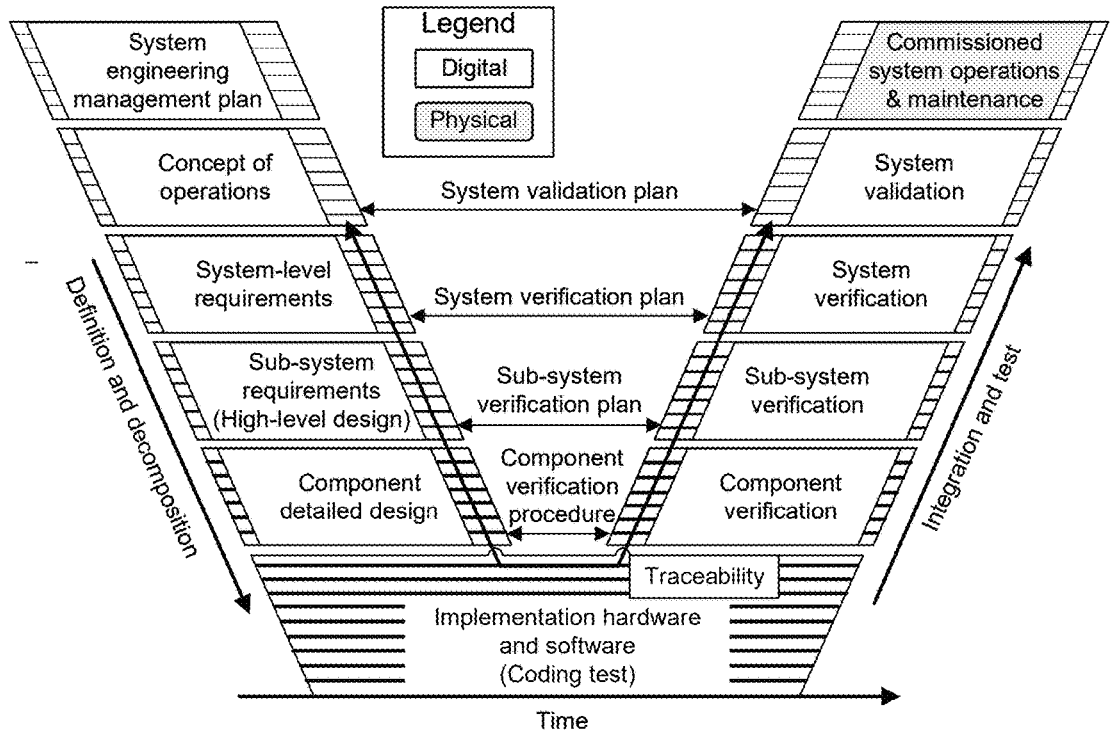
FIG. 6 illustrates a diagram of digital engineering tasks in a workflow that employ artificial intelligence techniques to assist the workflow.
Figure 6:
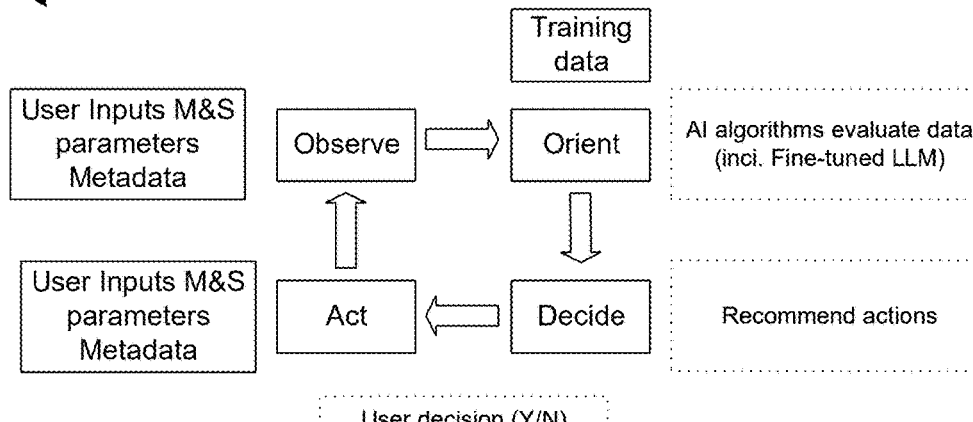

FIG. 6 illustrates a diagram of an integrated environment for a digital engineering platform to execute end-to-end systems engineering workflows that include digital engineering tasks. The digital engineering platform can employ artificial intelligence techniques illustrated in schematic 650 to complete tasks in the workflow 600, e.g., tasks that can be performed in the design, development, verification, and validation of a system. The workflow 600 can include generating plans for testing, verifying, and validating the system at different levels, from at a component level to a subsystem level to the system level. Although the workflow 600 illustrates an integrated and systematic approach to the design, development, operation, and maintenance of systems, some examples of the workflow 600 can include subsets of engineering tasks to be performed. Examples of digital engineering tasks to be performed include requirements analysis, concept development, system design, implementation, verification and validation, operation and maintenance, and retirement.

The digital engineering platform provides multi-domain modeling across different types of subsystems for a system that includes these digital engineering tasks. Digital engineering tasks in requirements analysis can include identifying and defining the requirements of the system, e.g., based on different stakeholder needs, technical constraints, and mission objectives for the system. Digital engineering tasks can also include concept development tasks, which further include generation and evaluation of different concepts to determine a solution meets system requirements, e.g., determine likelihoods of different solutions meeting system requirements and selecting a solution with the highest likelihood. As another example, digital engineering tasks can include determining specifications and parameters for components and subsystems for the selected system design (e.g., a solution that meets requirements) that meets the requirements. Digital engineering tasks can include implementation tasks for generating, compiling, and testing different system components and subsystems of the selected system design. The digital engineering platform also performs tasks in verifying and validating the selected system design by testing the system and evaluating different requirements to determine if the multiple models of the digital engineering environment meet requirements as designed. Beyond system design, the digital engineering platform also performs tasks in operating and maintaining the system to continually meet system requirements. In some implementations, the digital engineering platform determines a time instance to retire the system design, e.g., a life cycle of the design based on system requirements.

As depicted in FIG. 6, schematic 650 illustrates the integration of artificial intelligence (AI) techniques applied by the digital engineering platform to improve digital engineering task performance, e.g., improving accuracy of model output results. The AI techniques can further provide the digital engineering platform to improve accuracy of models and simulations, thereby reducing the utilization or demand for physical prototypes to perform design tasks. The artificial intelligence techniques depicted in schematic 650 show that AI models (e.g., large language models) and algorithms can evaluate training data to recommend actions in the workflow 600. The artificial intelligence techniques perform processes for training models (e.g., to improve accuracy relative to physical prototypes). The processes can include orienting the model by pre-processing data (e.g., formatting, filtering) to ensure that the model accurately reads values of the training data. The processes can also include generating decisions based on the values of the training data, the generated decisions, and observing the results. The AI techniques can perform processes iteratively to improve correlation between model input and output, thereby improving the accuracy and likelihood of meeting physical prototype performance. In some cases, the AI techniques include providing modeling and simulation metadata (e.g., by a user, by a tool that scrapes data) that are included in the training process.

Figure 7A:
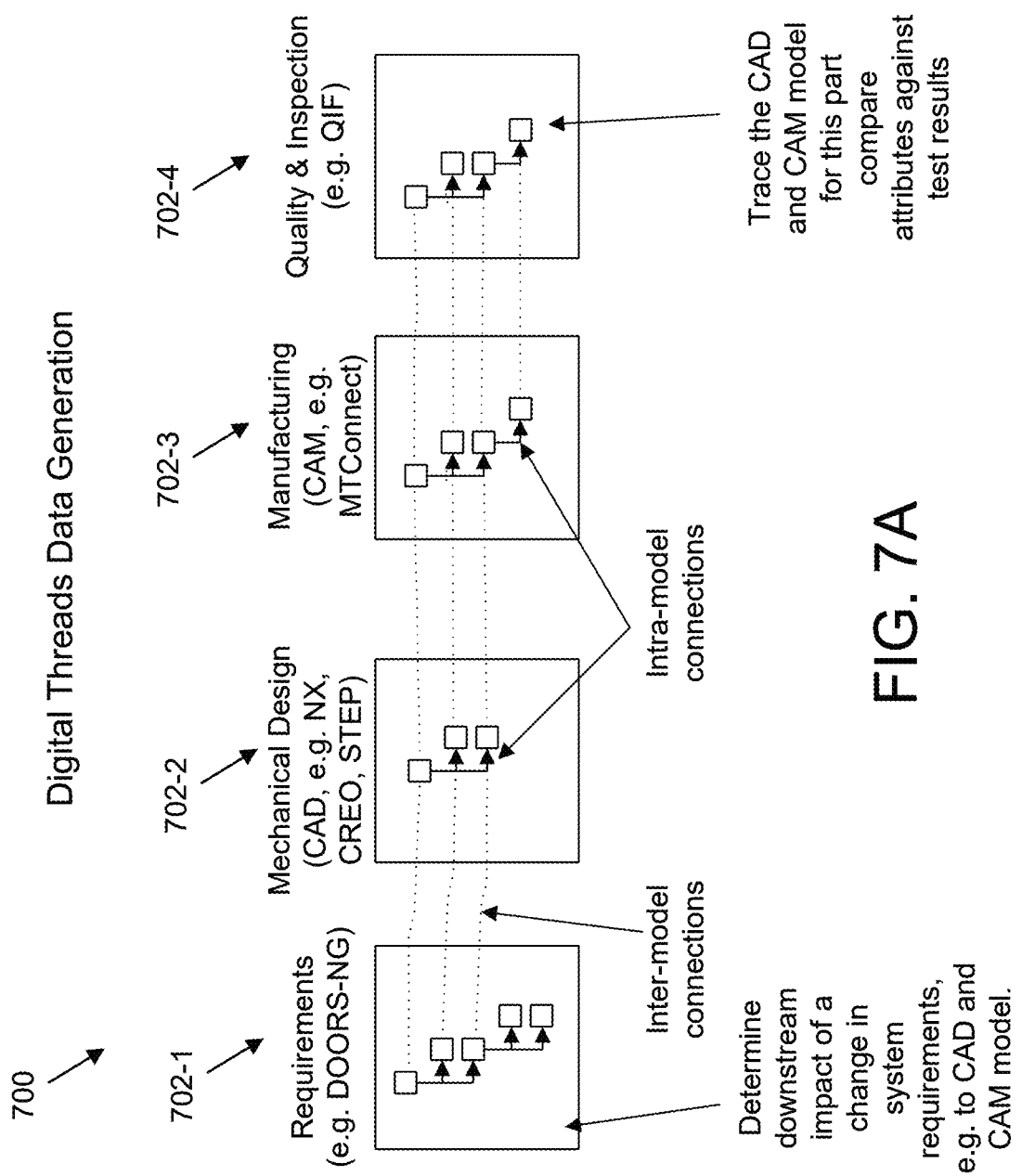
FIG. 7A is a schematic illustrating data generation and linkage in a digital thread.

FIG. 7A is a schematic illustrating data generation and linkage in a digital thread 700 created by the digital engineering platform. The digital thread 700 includes modules 702-1-702-4 (collectively referred to as "modules 702"), although any number of modules can be linked to form a digital thread. Each module can include software, models, tools, scripts, or some combination thereof. Each module can include a number of connected sub-modules for the module to perform a type of digital engineering task, e.g., requirements, computer-aided design/manufacturing, quality and inspection. Each sub-module of the module can include a number of software tools, models, scripts that can be configured to perform the digital engineering tasks for the module.

The digital thread 700 is depicted in FIG. 7A as including a module 702-1 for requirements, e.g., Dynamic Object-Oriented Requirements System (DOORS), DOORS Next Generation, which can be utilized to perform digital engineering tasks described above in reference to FIG. 6, e.g., system-level requirements. The digital thread 700 also includes a module 702-2 for mechanical design, also referred to as a mechanical design module, e.g., Computer-Aided Design software and models. The digital thread 700 includes a module 702-3 for manufacturing, e.g., Computer Aided Manufacturing software and models, as well as a module 702-4 for quality and inspection, e.g., quality information framework (QIF) files and tools.

The digital thread 700 includes a number of connections between the modules 702 to form inter-module connections. A connection between two different models between two different modules of the digital thread can be referred to as an inter-model connection, while connections between models of the same module can be referred to as an intra-module connection. The digital engineering platform provides that effects from updating parameters in a module can be tracked across different modules of the digital engineering thread, e.g., by inter-module connections/links. In some implementations, the digital engineering platform tracks effects of intra-module updates in the respective module, e.g., by intra-module connections/links. Resulting impacts of module and/or sub-module updates can be traced and monitored throughout the digital thread 700 by the digital engineering platform. For example, updates to system requirements in module 702-1 can be simulated or modeled by the digital engineering platform in modules 702-2-702-4 to determine downstream effects that can impact the respective software, models, tools, scripts, etc. for the interconnected modules.

FIG. 7B is a table 720 showing examples of model types and file extensions of data generated by a digital thread. The table 720 illustrates different stages of a workflow, e.g., the system engineering verification and validation workflow depicted in FIG. 6, including corresponding document types and file formats for the different stages of the workflow. For example, digital engineering tasks performed in a systems requirements analysis can include systems modeling language documents (e.g., .xml files) as an input (e.g., for models, tools, software) for different modules of the digital engineering platform.

Figure 7C:
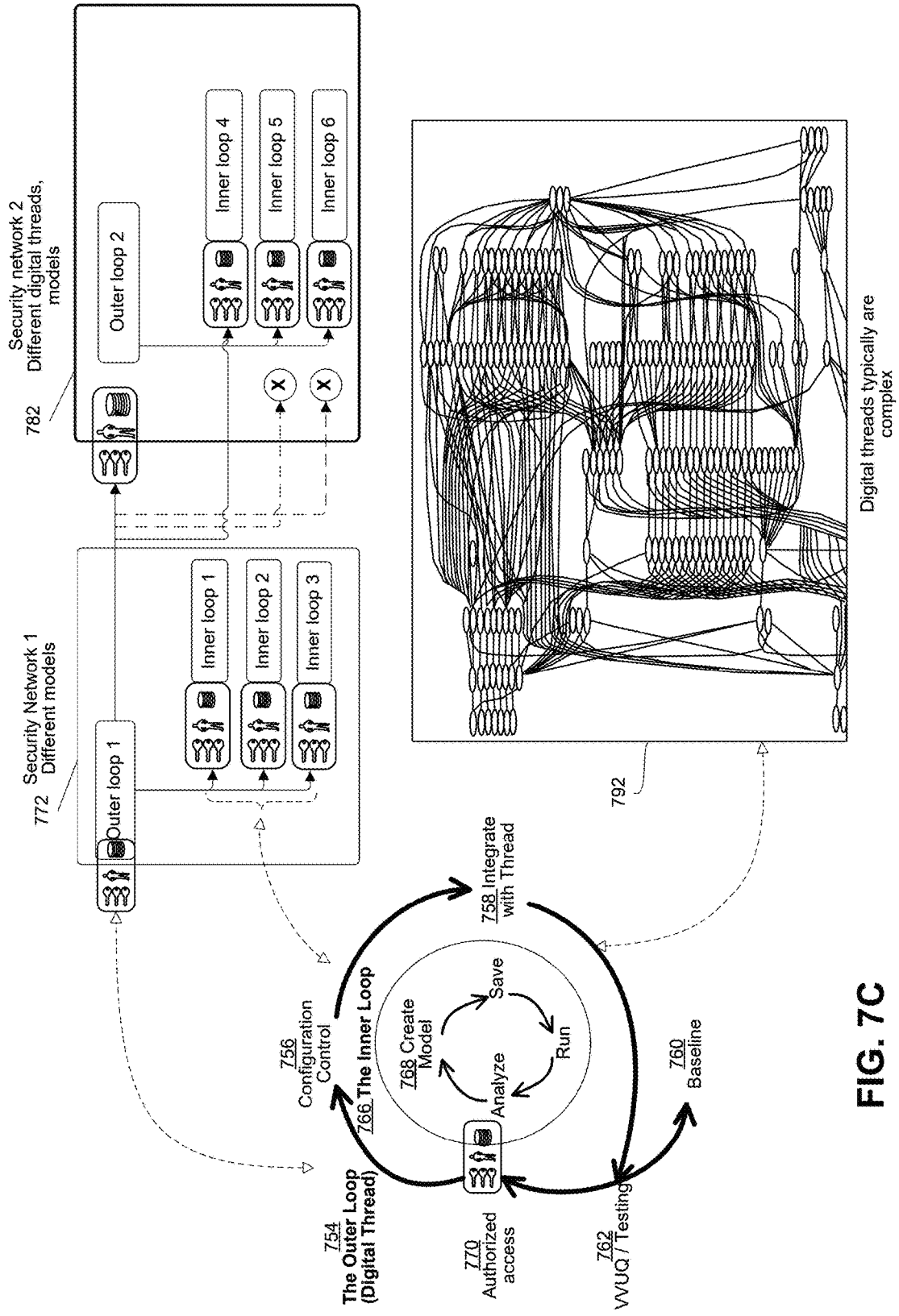
FIG. 7C is an exemplary schematic illustrating the interplay between a digital thread and the individual digital models and digital artifacts.

FIG. 7C is an exemplary schematic 750 illustrating the interplay between a digital thread and the individual digital models or digital artifacts it uses, thus defining outer and inner loop processes, in accordance with some embodiments of the present invention. For example, FIG. 7C illustrates inner loop and outer loop architecture for digital threads in cyber-physical systems.

In various embodiments of the digital platform, the architecture for managing digital threads and their associated digital models in cyber-physical systems involves an interaction between an Outer Loop (representing the digital thread) and an Inner Loop (representing individual models or artifacts). This structure enables secure, permission-based collaboration across multiple models, ensuring traceability, controlled data flow, and efficient interaction within the digital workflow. Based on software engineering principles, this inner/outer loop design is modular: the Outer Loop manages high-level coordination and communication, while the Inner Loop handles the detailed, iterative operations of each model or system. While the Outer Loop and Inner Loop interactions commonly seen in software packages may involve access to all of the software packages within the same Integrated Development Environment (IDE), the Outer Loop/Inner Loop interactions for cyber-physical systems can manage to link interoperably with different digital models and tools, while also ensuring zero trust security. Various embodiments of the digital platform are well suited to manage such digital threads for cyber-physical systems as the platform is able to interoperably link with various digital models and tools (in different Inner Loops) through the model splicer architecture (see FIGS. 4A and 4B). Additionally, the digital platform uses zero trust and zero knowledge security, ensuring that every interaction, whether within the same security network or across different networks, is strictly authorized, while keeping sensitive data private (e.g., through tokenization).

In the embodiment shown in 750, an Outer Loop 754 manages the sequence of tasks in a digital workflow, where user actions are authorized for access through a process 770 in an Inner Loop 766. Outer Loop 754 can issue instructions to Inner Loop 766 to:

Create models by defining structure, behavior, and parameters.

Fetch data artifacts from a model.

Update artifacts with controlled, traceable changes.

Figure 14A:
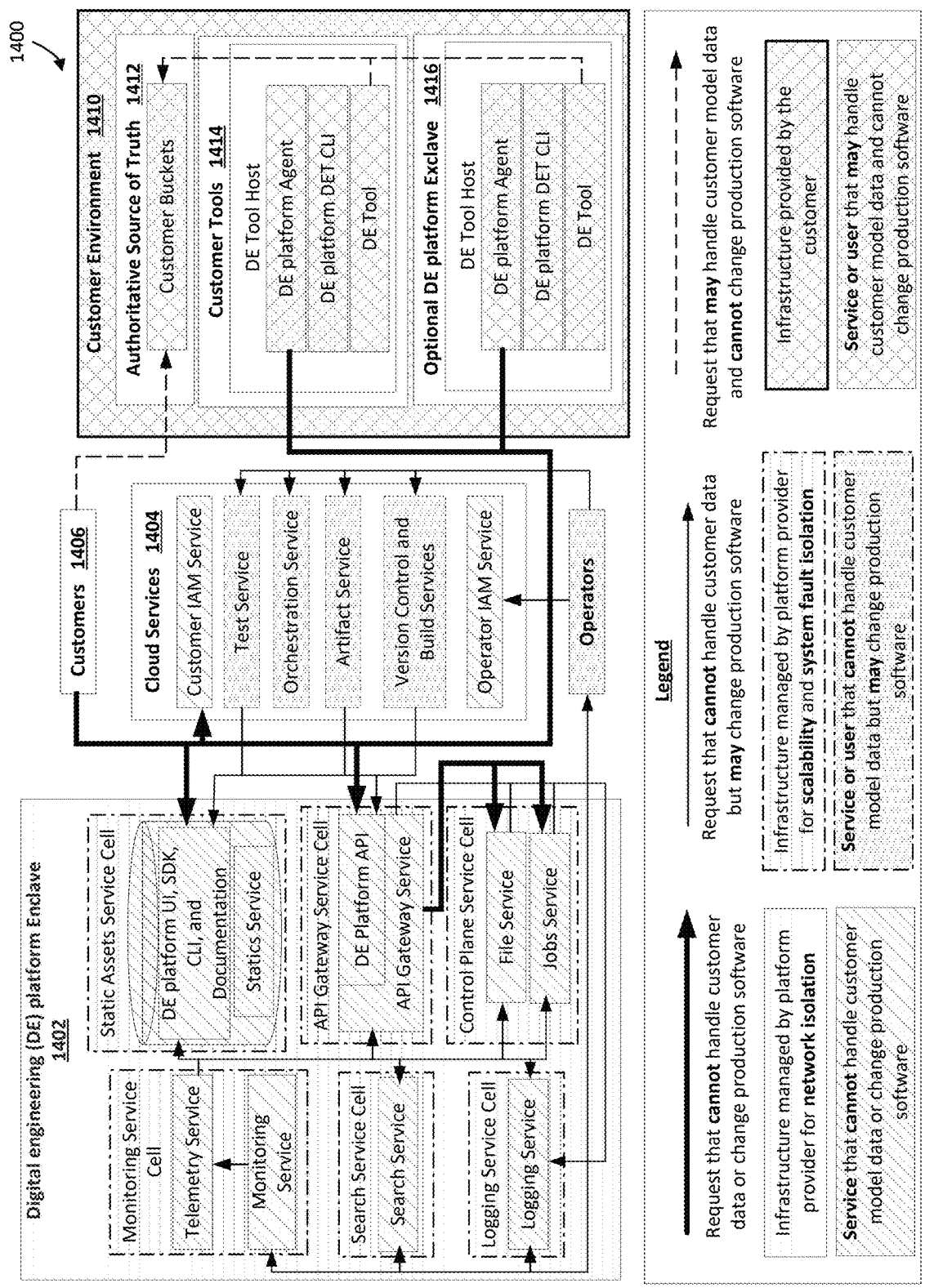
FIG. 14A is a diagram showing an example architecture for an interconnected digital engineering and certification ecosystem.

For example, when Outer Loop 754 commands a data artifact retrieval, the digital platform may manage it using zero trust principles, as described in FIG. 14A. Each user request in Outer Loop 754 is authorized through an enclave 1402 and its Control Plane service cell, coordinated with platform exclave 1416. Different Inner Loops exist within Customer Tools 1414, each operating in specific Customer Environments 1410 where each request is authorized for access to the necessary data operations.

After retrieving data artifacts from Inner Loop 766, Outer Loop 754 handles configuration control 756, versioning, and integrates the artifacts into the broader digital thread 758 for testing or validation at a process step 762.

Inner Loop 766, by contrast, is responsible for localized operations related to individual digital models, including:

Model creation, e.g., create model 768, where digital models are initialized or updated.

Model execution, through automation, simulations or data analysis.

Saving results, preserving outcomes from model runs.

Analyzing data, providing insights and validation for digital workflow improvements.

Outer Loop 754 interacts with any step in Inner Loop 766 to access or update data artifacts. Outer loop computations often compare the current workflow to a baseline 760.

Outer and Inner Loops 754 and 766 work together in an iterative process, integrating localized model adjustments with system-wide digital workflow coordination and validation. The Outer Loop manages tasks like configuration control, system integration, and VVUQ (Verification, Validation, and Uncertainty Quantification), while the Inner Loop handles model-based operations. FIG. 7C shows the Outer Loop performing authorized access 770, configuration control 756, digital thread integration 758, and VVUQ/testing 762. In various implementations of digital threads in the digital platform, these steps can vary in sequence or iterate as needed. Ultimately, the outer and inner loop architecture enables continuous integration and development (CI/CD) of digital workflows and digital threads across the digital platform.

The digital platform enables decentralized management of digital threads across different models, security networks, and user permissions under a zero trust security principle, e.g., decentralized digital threads in the digital platform. This architecture enforces strict access controls and permission-based interactions between models, ensuring security across diverse environments. In some embodiments, a zero knowledge approach further secures sensitive data during orchestration, ensuring no unauthorized access (e.g., by using tokenization).

In FIG. 7C, two exemplary setups 772 and 782 illustrate the digital platform embodiments with decentralized digital threads across different security networks. In 772, Outer Loop 1 operates within Security Network 1, connecting to multiple Inner Loops (e.g., Inner Loop 1, Inner Loop 2, and Inner Loop 3). These Inner Loops manage data operations within the same security framework, allowing collaboration while maintaining security.

In 782, Outer Loop 2 operates in a separate Security Network 2, linking to additional Inner Loops (e.g., Inner Loop 4, Inner Loop 5, and Inner Loop 6). For links from Outer Loop 1, dotted lines and "X" symbols represent isolated models or components, indicating access restrictions enforced by the zero trust framework. Only authenticated users can access authorized models and artifacts.

In various implementations, 772 and 782 can be regarded as different instances of the Customer environment 1410 shown in FIG. 14A.

In the digital platform, digital threads handle both simple and complex model connections. FIG. 7A shows simple threads with sequential model links, while a more complex thread is shown in FIG. 7C as an illustrative element 792. Simple threads propagate changes in a linear fashion, while complex threads manage branching dependencies, where changes in one model affect multiple downstream models. In complex threads implemented by the digital platform, the Outer Loop coordinates interactions across multiple Outer loops and Inner loops, ensuring secure, scalable execution of the entire digital workflow with appropriate permission controls.

The digital platform links different types of digital model files in a decentralized fashion with zero-trust security, e.g., for converting digital workflows into digital threads with data relationships. When a user requests a data operation on a digital model file using a specific digital tool, the digital platform executes the request via digital tool-specific and platform agents within the customer's environment. These agents extract data artifacts and, when changes to a digital artifact occur, a newer version of the digital model file is made. During the versioning step, platform agents ensure sensitive data is protected through tokenized version control.

Extracted data artifacts are securely stored in the customer's cloud data storage (e.g., an S3 bucket). If changes are made to the digital model, the agents save the updated version of the model or data artifact, extract the relevant data artifacts, and store it securely.

Using the digital platform, users are able to link data artifacts into a magic doc for documentation and commentary, which can include AI-assistance in various embodiments. A digital thread accompanying the magic doc lists data artifacts in sequence, creating a digital workflow. The digital platform further tracks data relationships between data artifacts (e.g., derivation, grouping, or data flow). This digital workflow of user actions and data relationships is stored in a non-proprietary format within the customer's environment.

Emergent digital workflows and sequence of tasks captured by data relationships of various types:

1. Generational—(Between version 1 and version 2 of a model)
2. Parent/Child—(The Model and Derived information from a model)
3. Sibling—(Different bits of derived data from the same model (e.g., an image view of a CAD model and an associated parameter)
4. Generational (derived)—The same piece of data extracted from version 1 or version 2 of a model
5. Data Context (Connected by how they are used for a mission or business purpose in a Magic Doc)
6. Data Flow (Connected via digital threads—data from one model into another)

Such data relationships can vary from one user to another even for the same overall digital workflow task.

Figure 8A:
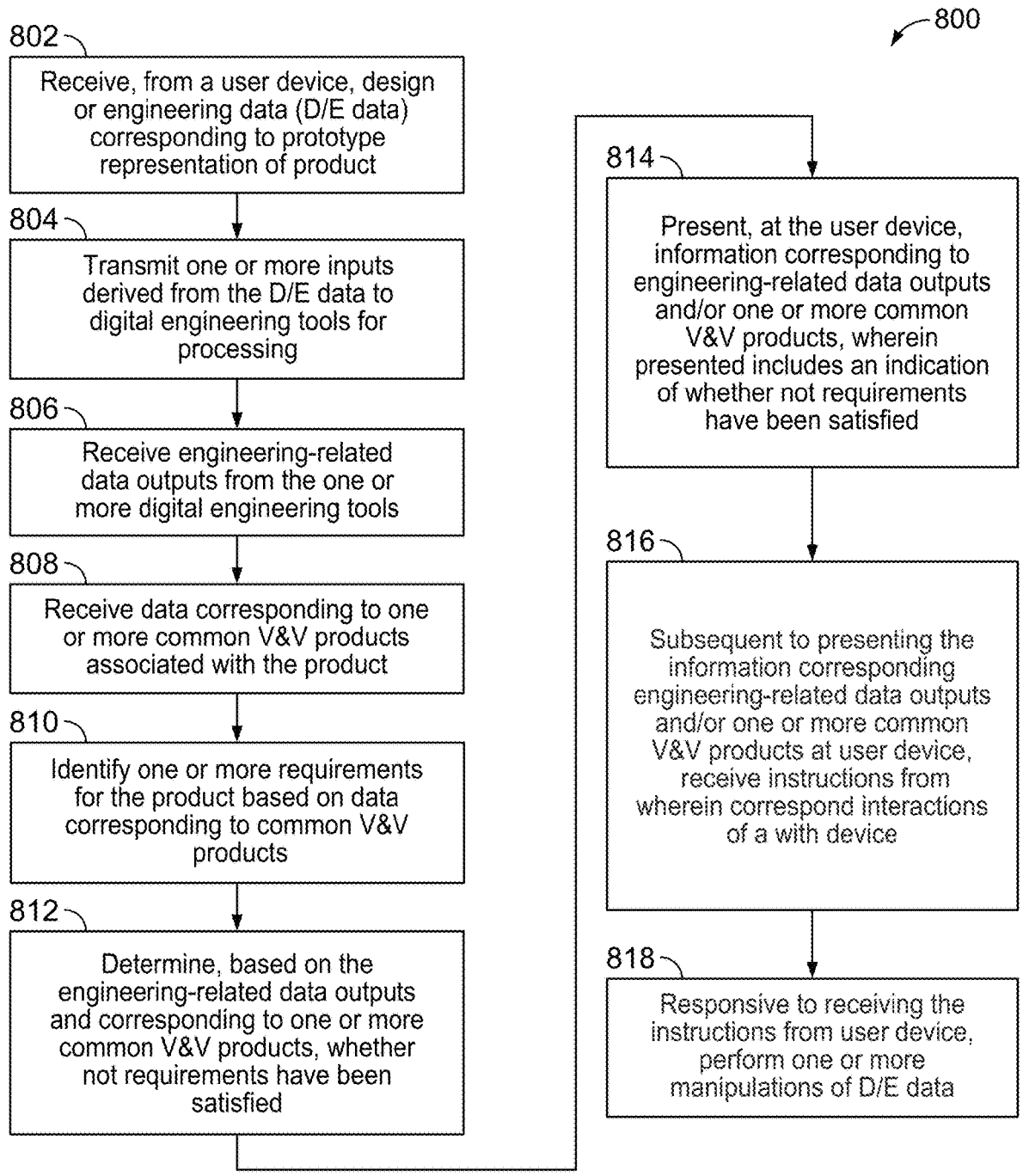
FIG. 8A is a flow chart showing a process for product development performed by a computing system of an interconnected digital engineering and certification ecosystem.

FIG. 8A illustrates an example process 800 for product development. In some implementations, the process 800 can be executed by a computing system (e.g., computing system 108) of an interconnected digital engineering and certification ecosystem (e.g., the ecosystem 100).

Operations of the process 800 include receiving, from a user device, design and/or engineering data (D/E data) corresponding to a prototype representation of a product (802). For example, the user device can correspond to the user device 106A or the API 106B, and the D/E data can correspond to a MBSE file, a CAD file, and/or other digital files or information associated with a digital prototype, as described above. In some implementations, the product can be a UAV or another type of aircraft; car; boat; underwater vehicle; industrial robotic; spacecraft; satellite; structure; tool; physical device; mobile device; drug, chemical product or biologic; manufacturing process; or any other complex system (either physical or non-physical) that may be assessed against a common V&V product.

Operations of the process 800 also include transmitting one or more inputs derived from the D/E data to one or more digital engineering tools for processing (804). For example, one or more digital engineering tools can correspond to the digital engineering tools 102 described above. In some implementations, at least a subset of the one or more digital engineering tools can include model-based systems engineering (MBSE) tools, augmented reality (AR) tools, computer aided design (CAD) tools, robotics simulation and programming tools, data analytics tools, modeling and simulation (M&S) tools, geographic Information System (GIS) tools for spatial analysis, product lifecycle management (PLM) tools, Internet of Things (IoT) platforms, virtual and augmented reality design tools, human-machine interface (HMI) design tools, and simulation engines. The digital engineering models can include requirements models, electronics models, test-plan models, cost-models, schedule models, software modeling, supply-chain models, manufacturing models, cyber security models, multi-attribute tradespace tools, finite element analysis models, computational fluid dynamics models, computational electromagnetics models, Noise, Vibration, and Harshness (NVH) simulation models, control system design and simulation models, structural analysis and optimization models, power system analysis and simulation models, thermal analysis and simulation models, failure analysis and prediction models, digital twin models, artificial intelligence and machine learning models, environmental impact models, mission effects models, or other similar digital engineering tools that may be recognized as engineering design tools by a person of ordinary skill in the relevant field.

For each D/E data received from the user device, the job service layer of the computing system can create a fungible idempotent token on the control plane and one or more non-fungible idempotent tokens on the data plane. The process of creating the fungible idempotent tokens and the one or more corresponding non-fungible idempotent tokens will be further described below.

Operations of the process 800 also include receiving engineering-related data outputs from the one or more digital engineering tools (806). For example, the engineering-related data outputs can correspond to the results of models, tests, and/or simulations performed by the data engineering tools 102, as described above.

Operations of the process 800 also include receiving data corresponding to one or more common V&V products associated with the product (808). For example, the one or more common V&V products can be digitized regulatory and/or certification standards and can correspond to the common V&V products 110A-110J stored in the repository of common V&V products 110 described above. In some implementations, the data corresponding to the one or more common V&V products can be received from the user device (e.g., via a user upload). In some implementations, the data corresponding to the one or more common V&V products can be received from a regulatory and/or certification authority (e.g., via a repository of common V&V products hosted or maintained by the regulatory and/or certification authority).

Operations of the process 800 also include identifying one or more requirements for the product based on the data corresponding to the one or more common V&V products (810). For example, the one or more requirements can correspond to requirements for certification of a product in accordance with a particular common V&V product.

Operations of the process 800 also include determining, based on the engineering-related data outputs and the data corresponding to the one or more common V&V products, whether the one or more requirements have been satisfied (812). In some implementations, rather than making a binary determination, the operations of the process 800 can include determining whether or not the one or more requirements are likely to be satisfied by the prototype representation of the product (e.g., based on an estimated probability). In some implementations, determining whether the one or more requirements have been satisfied (or are likely to be satisfied) based on the engineering-related data outputs can include determining, with or without human input, whether the one or more requirements have been satisfied.

Operations of the process 800 also include presenting, at the user device, information corresponding to the engineering-related data outputs and/or the data corresponding to the one or more common V&V products, wherein the presented information includes an indication of whether the one or more requirements have been satisfied (814). In some implementations, the presented information can include an indication of a probability of whether the one or more requirements would be satisfied by the prototype representation of the product. For example, the information can be presented at the user device in the form of a report. In some implementations, the presented information can further include a recommended action the user of the user device can take to satisfy the one or more requirements. In such implementations, the recommended action can include a suggestion to use a particular digital engineering tool of the one or more digital engineering tools, a suggestion to modify the one or more inputs transmitted to the one or more digital engineering tools, a suggestion to modify one or more components of the prototype representation of the product, a suggestion to replace one or more components of the prototype representation of the product with a previously designed solution, and/or a suggestion of a wholly or partially new design generated by the system (e.g., using the machine learning engine 120).

Operations of the process also include, subsequent to presenting the information corresponding to the engineering-related data outputs and/or the data corresponding to the one or more common V&V products at the user device, receiving instructions from the user device, wherein the instructions correspond to one or more interactions of a user with the user device (816).

Operations of the process also include being responsive to receiving the instructions from the user device, performing one or more manipulations of the D/E data (818). In some implementations, performing the one or more manipulations of the D/E data can include modifying the D/E data and/or deriving modified inputs from the D/E data for transmission to the one or more digital engineering tools.

Additional operations of the process 800 can include the following. In some implementations, the process 800 can include storing, on a storage device, usage data representing the received data corresponding to the one or more common V&V products, the received D/E data, the engineering-related data outputs from the one or more digital engineering tools, the indication of whether the one or more requirements have been satisfied (or are likely to be satisfied), the one or more interactions of the user with the user device, and/or the one or more manipulations of the D/E data. The process 800 can also include incorporating applications and services (e.g., the applications and services 122) that automate or partially automate determinations of whether the one or more requirements have been satisfied or partially satisfied. The process 800 can also include incorporating at least a portion of the usage data in a training dataset, and training a machine-learning model based on the training dataset. In some implementations, the machine learning model can be configured to receive, as input, information relating to another product being designed by another user, and output a suggestion for the another user to use a particular digital engineering tool of the one or more digital engineering tools, a suggestion to modify one or more inputs transmitted to the one or more digital engineering tools by the another user, a suggestion to modify one or more components of another prototype representation associated with the another user, and/or a suggestion to replace one or more components of the another prototype representation with a previously designed solution. In some implementations, the process 800 can also include using the stored usage data for one or more sensitivity analyses. In some implementations, the process 800 can also include using the stored usage data to improve the performance of applications and services (e.g., the applications and services 122).

In some implementations, additional operations of the process 800 can include checking one or more credentials of the user prior to performing the one or more manipulations of the D/E data, and determining, based on the one or more credentials, that the user is qualified or authorized to perform the one or more manipulations of the D/E data.

The interconnected digital engineering and certification ecosystem can be implemented with methods and approaches that take a zero-trust approach with the users interacting with the system. Moreover, the interconnected digital engineering and certification ecosystem can apply a zero-trust approach with the computer networks through which the users interact and extend the zero-trust approach methodology to the access and computation of the data related to the individual digital models, tools, or MBSE files used by the users as part of the V&V product purposes.

In some examples, the policies of the security architecture can include model storage policy, model access policy, attribute-based access control, handling of read vs. write queries, traceability and auditability, and a model trust policy, etc. The implementation details are outlined in examples described throughout the specification. For instance, this can include restricting model access to specific API functions, authenticating users and models at endpoints, allowing customers (e.g., model owners or model developers) to set additional access control policies, implementing data restrictions and encryptions, recording endpoint transactions in a secure database, and incorporating digital watermarks for traceability and auditability, etc. The goal of implementing the security architecture is to ensure the right authenticated user has access to the right authenticated model and to assess model truth and user credibility.

Figure 8B:
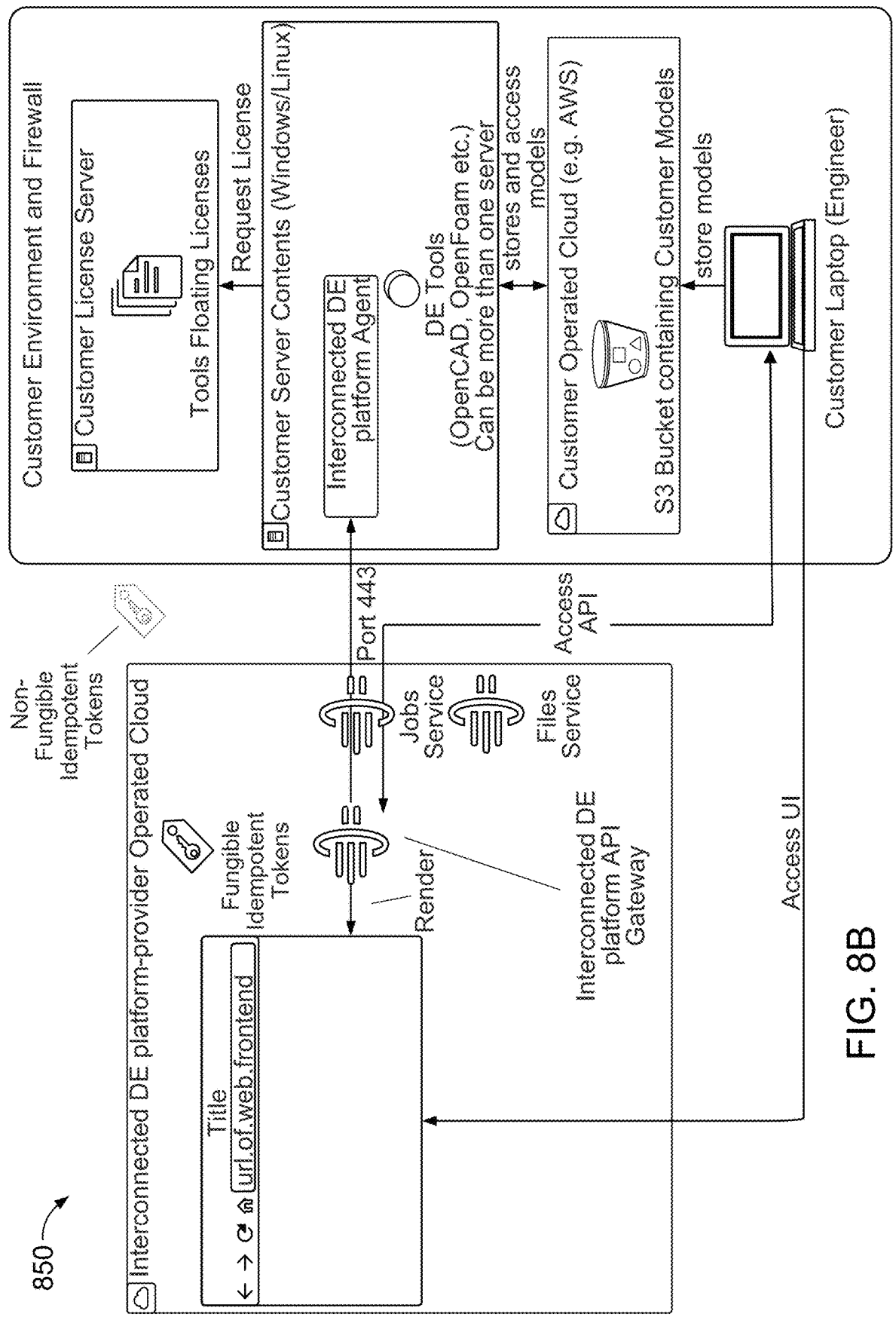
FIG. 8B is a diagram which depicts a high level overview of a hybrid security cell-based infrastructure.

FIG. 8B elucidates the secure file upload process 850 to the hybrid security cell-based infrastructure. In particular, FIG. 8B demonstrates the delineation between cloud-operated gateway components and customer-operated components so as to assure that sensitive models never leave the customer's security perimeter. Specifically, this process commences with user authentication via the CIAM platform and subsequent issuance of a cryptographic token.

The user then initiates the frontend web application and requests an upload URL for the file through the API Gateway. The request for an upload URL is authenticated using the token which the CIAM platform generates for the user. The API Manager logs the received request from the frontend application and forwards the received request to the appropriate backend cell, in this example the Share Control Cell. The Share Control Cell can leverage an associated database to manage stateful interactions and validate user permissions based on the contents of a request received from the API manager. The Share Control cell can make fine-grained authorization decisions by leveraging the cell database for the storage of state at the cellular level. For example, in response to the Share Control Cell performing an authorization decision, the Share Control Cell emits a request for a restricted-use object upload URL from the object storage interface. The object storage interface provides the URL to the Share Control Cell in response to the Share Control Cells' request. In response, the Share Control Cell can return the URL to the frontend application, which initiated the upload request process. The frontend application can utilize the received URL to upload a file directly from the user's device to their enterprise storage environment, bypassing the hybrid product's cloud components, thereby ensuring data privacy. At every step in this process where there are intercellular communications, such as between the API manager and Share Control Cell, the security of these intercellular communications is fortified through measures such as the use of a WAF to ensure compliance and authentication for internal communications.

In some implementations, a crucial component for orchestrating workflows in the digital engineering platform with the digital engineering tools is confronted with challenges typical of distributed systems operating at scale. These include, for example, creating reliability from unreliable components, processing complex workloads, and managing retransmission due to network issues. These challenges result in duplicate task executions, necessitating unique request identification. Ensuring distinct identification for each request in the digital engineering platform to avert the repetition of task execution and addressing cost management for computational resources are also significant issues. Additionally, devising solutions for scalability in API calls mandates the establishment of a zero-trust security paradigm while concurrently upholding data sovereignty for customer data.

By solving this workflow orchestration problem, multiple sub-problems can be addressed. In some examples, the issue of retransmission mitigation involves addressing high retransmission rates caused by network congestion and connectivity issues, incorporating congestion control and optimized communication protocols. In some examples, the issue of unique request identification involves developing robust mechanisms to generate and assign unique identifiers to prevent task duplication during simultaneous requests. The issue of scalability and cost management involves devising strategies for scalable API calls with optimal resource allocation to manage computational costs. Similarly, management data sovereignty and security involve establishing measures for data segregation, encryption, and access control to ensure data sovereignty and protect.

The issue of zero-trust security for digital engineering models requires various criteria. For example, zero-trust security requires integrating strong authentication, authorization, and encryption mechanisms based on the zero-trust security for the digital engineering platform. Similarly, zero-trust security requires implementing granular access controls to prevent unauthorized access to sensitive API functionalities and data. In some examples, resilience and fault tolerance is another sub-problem to be addressed. Resilience and fault tolerance requires designing a resilient architecture with redundancy and failover mechanisms to ensure system availability and developing effective error-handling mechanisms and comprehensive logging to facilitate troubleshooting, incident response, and forensic analysis. Similarly, profiling and optimizing API performance to enhance responsiveness and resource utilization for managing resilience and fault tolerance. Similarly, auditing and compliance requires implementing auditing capabilities and comprehensive logging to comply with regulations and monitoring API activities.

In some implementations, the digital engineering platform can utilize idempotency tokens to address the above-mentioned sub-problems, among others. The idempotency tokens offer a comprehensive means to ensure reliable task execution, efficient resource utilization, and enhanced scalability. For example, the idempotency tokens can include one or more fungible and one or more non-fungible idempotent tokens for tracking of usage while preserving data sovereignty. A function is designated as idempotent if the function can execute multiple times without side effects. These functions are state-invariant. For example, pressing the "close doors" button on an elevator can be deemed to be idempotent operation because pressing the button multiple times causes the desired action to occur only once.

Executing functions in digital engineering tools on the digital engineering platform can be expensive. For example, the cost of executing such functions can incur large processing time, increased utilization of computation and network bandwidth resources for a respective digital engineering tool, increased tool licensing costs of digital engineering tools in workflows involving multiple stakeholders, and other used resources. The digital engineering system can rely on the idempotency tokens to ensure that a particular function only executes once-even if the API, SDK, CLI, UI, or any other interface receives the same request multiple times. Moreover, network enclave boundaries can be flaky, resulting in exponential backoff and retry transmissions of REST API requests. In these examples, users can be impatient and select "go" multiple times on a user interface or accidentally run a CLI command twice. When these cases arise, the digital engineering platform can incur the cost of the function executing once and only once.

In some implementations, an idempotency token can include a fungible idempotent token (FIT). The FIT can present an externally visible representation of the requested work to the digital engineering platform. The FIT can encapsulate specific request elements that include, for example, the initiating tenant or requesting account, the requested function or wrapper, and the intended model for execution, to name a few examples. The requested function or wrapper, also referred to as splicer can include, for example, the model file, e.g., wing.sldprt, accessible input functions that the model owner has specified access to, and accessible output functions that the model owner has access to. The intended model for execution can represent the model for executing the requested function or wrapper. The FIT can omit the particular digital engineering tool designated for the requested task intentionally. This omission of the particular digital engineering tool renders the FITs fungible, allowing routing of tasks to the most cost-effective tool that can execute a requested function or wrapper.

In some implementations, the digital engineering platform can encrypt and synchronize each of the FITs. In particular, the digital engineering platform can construct each of the FITs using cryptographic techniques, such as, for example, 384-bit SHA-2 hash over a Base64 encoding of the ordered, concatenated tenant, wrapper, and model requested elements. For example, the API Gateway or the Jobs Service can uniquely generate the FITs, which ensure accurate task identification. In some cases, an FIT can be generated when the digital engineering platform receives a request.

Each FIT can be tracked and labeled for enumeration. For example, each FIT can be tracked through generation and storage for each request. Their uniqueness, determined by specific elements from the user request, permits straightforward counting by maintaining a record of generated FITs and detecting duplicates. In this manner, each time the digital engineering platform receives a request, the API Gateway or the Jobs Service can create a FIT for that request. The FIT can be constructed, for example, using a 384-bit SHA-2 encryption hash of a Base64 encoded concatenation of an identifier of the tenant, the wrapper identifier, and requested input elements for the particular model function or wrapper.

In some implementations, an idempotency token can include a non-fungible idempotent token (NFIT). The NFIT can be data that represents an internal construct used by operators. The NFIT can incorporate similar elements used by the FITs with an included selected DE tool constraint. For example, NFITs can include an initiating tenant or requesting account/user, a requested function or wrapper, a model designated for execution, a chosen digital engineering tool for execution and its license, and a timestamp of the request, which serves as entropy for security. The NFITs contain the selected DE tool constraint to ensure the model or function being called remains confidential while allowing logging and debugging of the user requests. Here, the NFITs are directed towards one or more digital engineering tools and can signify individual computer-performed tasks in the customer environment, e.g., the data plane.

In some implementations, each of the FITs and NFITs include respective characteristics. Each FIT and NFIT pair can share common metadata that are reflected as fungible tokens and aid in associating specific tasks on the data plane back to the user request on the control plane. In particular, the FIT is externally visible to the digital engineering platform, represents a user-initiated request, and includes various elements. The elements in the FIT include, for example, the tenant or account that transmits the request to the digital engineering platform, the requested function/wrapper being performed, and an identifier of the model to be accessed. The FIT does not indicate the digital engineering tool being modified and is used for cost-efficient routing. The digital engineering platform tracks the cost associated with the FIT. The API Gateway or the Job Service of the digitally engineering platform can generate the FIT and can perform one or more cryptographic techniques on the FIT. In some examples, the digital engineering platform can track the FIT on a per request basis. The digital engineering platform can track the creation of the FIT and count the number of requests sent by the user associated with the FIT.

In some implementations, the NFIT is internally visible to the one or more digital engineering tools, represents a user-initiated request, and includes various elements. The elements in the NFIT include, for example, the tenant or account that transmits the request to the digital engineering platform, the requested function/wrapper being performed, an identifier of the model to be accessed, and a specified digital engineering tool associated with the request. The NFIT can indicate the digital engineering tool being modified and is not involved with cost-efficient routing. The digital engineering platform may track a cost associated with the FIT. The job service control plane of the digitally engineering platform can generate the NFIT, associate with the FIT, and can perform one or cryptographic techniques on the NFIT. Generally, the control plane includes the APIs that customers interface with directly or through the API Gateway. In some examples, the digital engineering platform tracks the NFIT using a universally unique identifier (UUID). The digital engineering platform can track the creation of the NFIT in view of FIT and NFIT pairs created based on future requests sent by the user.

In some examples, the Job Service Layer can create the FIT and NFIT in pairs, consistent with a user request. The term job service layer is used interchangeably with jobs service layer in the examples described. The FIT can represent a request that can be fulfilled by various tools and the NFIT can represent a unit of work being completed by a certain tool. Fungible idempotent tokens are customer-facing units that symbolize requested work in a flexible manner, e.g., via the control plane. For instance, if a user or customer asks for parts from a specific model, these tokens can be used to fulfill the request using different tools.

As illustrated in FIG. 8B, the jobs service layer of the digital engineering platform creates the FIT used on the control plane and the one or more NFITs on the customer environment side, e.g., data plane. The jobs server layer interfaces with both the digital engineering platform and the customer environment. The jobs service layer can issue both types of tokens, e.g., the FIT on the control plane and the corresponding one or more NFITs on the data plane. The jobs service layer can store and validate these tokens as well.

In some implementations, the digital engineering platform's usage of idempotency tokens offers enhanced encryption and synchronization mechanisms. In some examples, the NFIT can ensure elevated security and precision through advanced cryptographic and synchronization methods. Differing from FITs, NFITs can include enhanced security due to their sensitive nature and inclusion of digital engineering tool specifics. NFIT generation involves, for example, calculating a FIT via SHA-2 over Base64 encoding of user request elements, associating a UUID with the FIT to establish a unique reference, and fusing the FIT, the UUID, and the comprehensive internal request elements into the NFIT. This meticulous approach can guarantee security and tamper resistance, while UUID integration amplifies uniqueness and NFIT-to-work request linkage.

In some implementations, the digital engineering platform can track and enumerate the idempotency tokens based on user requests. In some examples, effectively managing NFITs entails streamlined tracking and enumeration processes. The linkage of each NFIT with a UUID can ensure a direct association with originating work request details. The digital engineering platform can store the linked UUIDs and their corresponding internal request elements in a secure, centralized repository, forming a comprehensive ledger of NFITs. In this manner, operators can readily query the repository for specific NFITs based on criteria such as, for example, a tenant, e.g., user, or function, while enumeration involves straightforward counting of unique UUIDs. The systematic use of UUIDs within a centralized framework enhances the efficacy of NFIT monitoring, analysis, and management, facilitating traceability and accountability across work requests.

Accordingly, NFITs can aid in maintaining a zero-trust enclave posture by decoupling the work being requested from the work actually being performed. In this manner, the FIT can identify the work being requested and the NFIT can identify the work actually being performed at the digital engineering tool according to the user request. As such, the digital engineering platform can use the idempotency tokens to ensure a reliable task execution because the idempotency tokens enable tasks to be performed at one or more digital engineering tools without unintended side effects. In this case, even when the digital engineering platform receives multiple requests due to network issues, for example, these tasks execute only once, eliminating duplicative task executions and enhancing system reliability.

As will be illustrated below, the fungible tokens are issued on the control plane of the digital engineering platform, while non-fungible tokens are assigned on the data plane. The fungible idempotency token can represent the work that a user has requested of a service-oriented architecture. The non-fungible idempotency token can represent the derivative work that is being done by a specific digital engineering tool in response to the control plane request bearing a related fungible idempotency token. This separation between the control and the data plane can ensure secure task management while allowing synchronized token control for unique task identification.

In some implementations, idempotency tokens can be applied across both backend and frontend operations. Regardless of the task origin, the tokens can guarantee that tasks are executed solely once on the digital engineering platform. In some examples, frontend operations can mainly involve tasks associated with fungible idempotent tokens, while backend operations can involve both fungible idempotent tokens and non-fungible idempotent tokens.

In some implementations, idempotency tokens can extend beyond task execution control. The idempotency tokens can facilitate efficient resource usage and cost-effective computing routing. By the digital engineering platform employing the idempotency tokens, the system measures and directs computations to the most cost-efficient resources. In this manner, the digital engineering platform can minimize costs and maximizes resource utilization, enhancing system performance and savings.

In some implementations, the digital engineering platform can offer verifiable activity tracking. Increased deployment of digital engineering workflows with digital engineering tasks leads to an increasing amount of avoided physical prototyping. With verifiable activity tracking, the digital engineering platform has an ample set of inputs towards avoided cost estimation or avoided emissions estimation. Verifiable activity tracking can provide the digital engineering platform a consistent methodology for such savings estimation, whether the digital engineering platform is performing activity tracking for cost performance or avoiding carbon emissions inventory.

In some implementations, the use of idempotency tokens on the digital engineering platform can offer a variety of benefits. The benefits include, for, an increased reliability and efficiency, enhanced cost controls with zero-trust features, optimized resource utilization and cost-efficient routing, prevention of multiple task executions, and quantifiable carbon footprint reduction in digital engineering workflows. Other benefits are also possible by the utilization of idempotency tokens.

In some examples, the utilization of idempotency tokens ensures reliable task execution by enabling tasks to be performed without unintended side effects. The execution of functions associated with the idempotency tokens can only occur once, even when facing multiple requests with similar functions within a similar time frame due to network challenges or multiple requests sent by the user. By utilizing the idempotency tokens, the digital engineering platform can eradicate duplicate task executions, significantly enhancing the overall reliability and efficiency of the API Gateway.

In some examples, the utilization of idempotency tokens provides enhanced cost controls with zero-trust features. By utilizing both fungible and non-fungible idempotent tokens, the digital engineering platform can establish a secure framework for task management. For example, fungible tokens issued on the control plane and non-fungible tokens assigned on the data plane enable synchronized token control while maintaining robust security. This approach facilitates enhanced cost controls within a zero-trust architecture, ensuring secure and controlled task execution.

In some implementations, the utilization of idempotency tokens can provide optimized resource utilization and cost-efficient routing. The deployment of idempotency tokens can offer benefits beyond task execution control. These idempotency tokens enable efficient resource utilization and cost-effective computation routing. By utilizing idempotency tokens, the system can intelligently measure and guide computations toward the most cost-efficient resources available. This strategy can minimize computational costs, optimize resource utilization, and contribute to improved system performance and financial savings.

In some implementations, the utilization of idempotency tokens can aid in prevention of multiple task executions. In particular, the universal application of idempotency tokens across backend and frontend operations can ensure that tasks are executed only once on the digital engineering platform, regardless of their origin. This prevention of duplicated task executions minimizes computational costs and enhances operational efficiency. The elimination of redundant task executions contributes to streamlined workflows and accurate task outcomes.

In some implementations, the utilization of idempotency tokens on the digital engineering platform offers a quantifiable carbon footprint reduction in digital engineering workflows. In some examples, a noteworthy benefit emerges from the digital engineering platform's integration of activity tracking with idempotency tokens. By enabling increased deployment of digital engineering workflows with activity tracking using the idempotency tokens, the digital engineering platform can achieve a quantifiable reduction in carbon footprint. This environmentally conscious approach aligns with sustainability objectives, allowing for precise estimation and measurement of avoided costs and emissions. For example, a reduction in the number of processes performed by the digital engineering tools in the face of multiple requests can reduce overall processing performed by the digital engineering platform when idempotency tokens are utilized.

Figure 9:
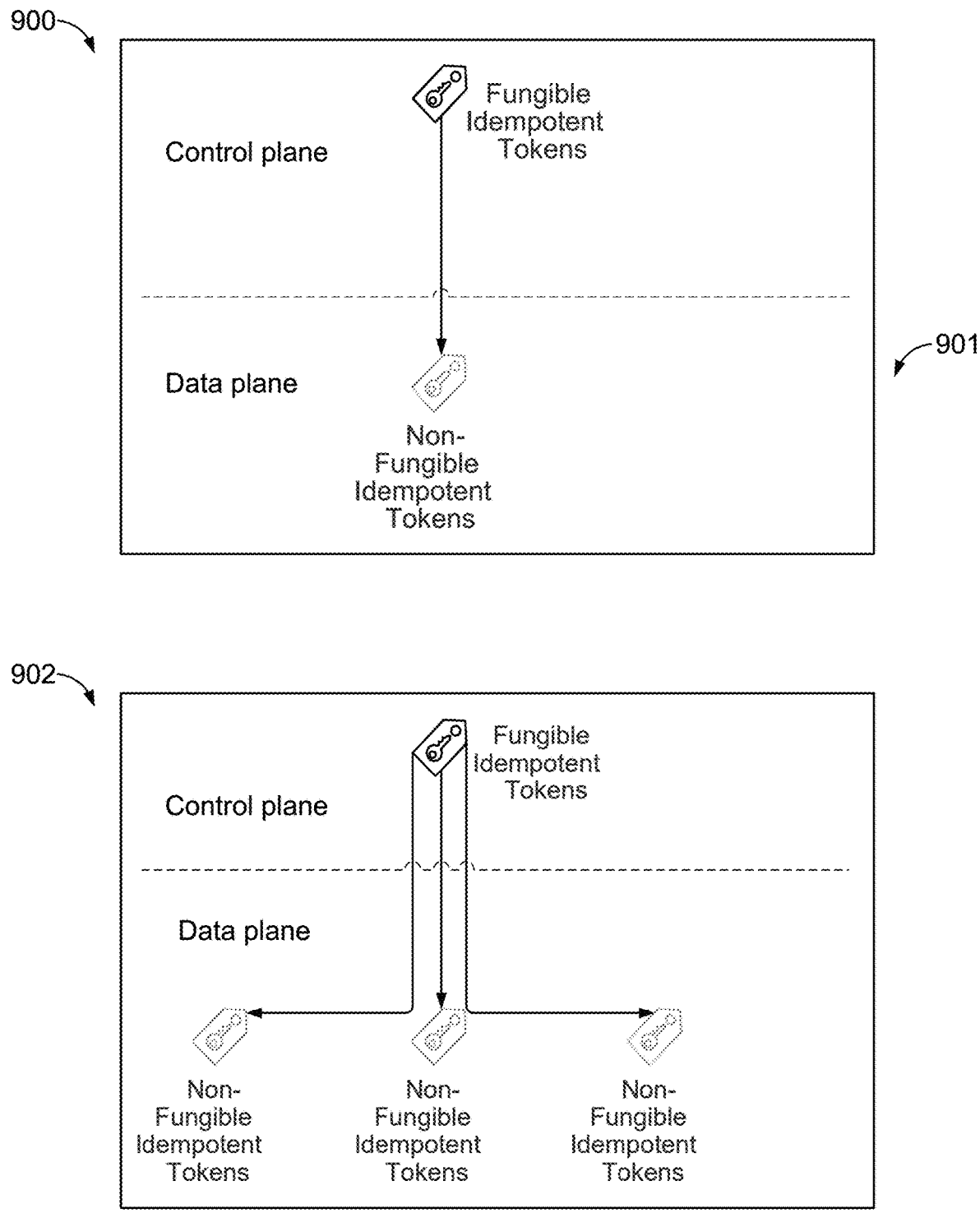
FIG. 9 is a diagram illustrating examples of fungible idempotent tokens paired with one or more non-fungible idempotent tokens.

FIG. 9 is a diagram illustrating examples of fungible idempotent tokens paired with one or more non-fungible idempotent tokens. In some implementations, in 901, the digital engineering platform can create an FIT in the control plane and a corresponding NFIT in the data plane. In some implementations, in 902, the digital engineering platform can create an FIT in the control plane and one or more NFITs in the data plane. Each time the digital engineering platform receives a request, the jobs service layer of the digital engineering platform can create an FIT, create one or more corresponding NFITs, store the FIT and the one or more NFITs in memory, and track the usage of the idempotent tokens. Here, API requests that wrap a single function can create FITs and NFITs in pairs, which have a one-to-one connection. However, API requests that result in more than one function running on a digital engineering tool can result in a single FIT and multiple NFITs, as shown in 902, with a one-to-many connection.

Figure 10A:
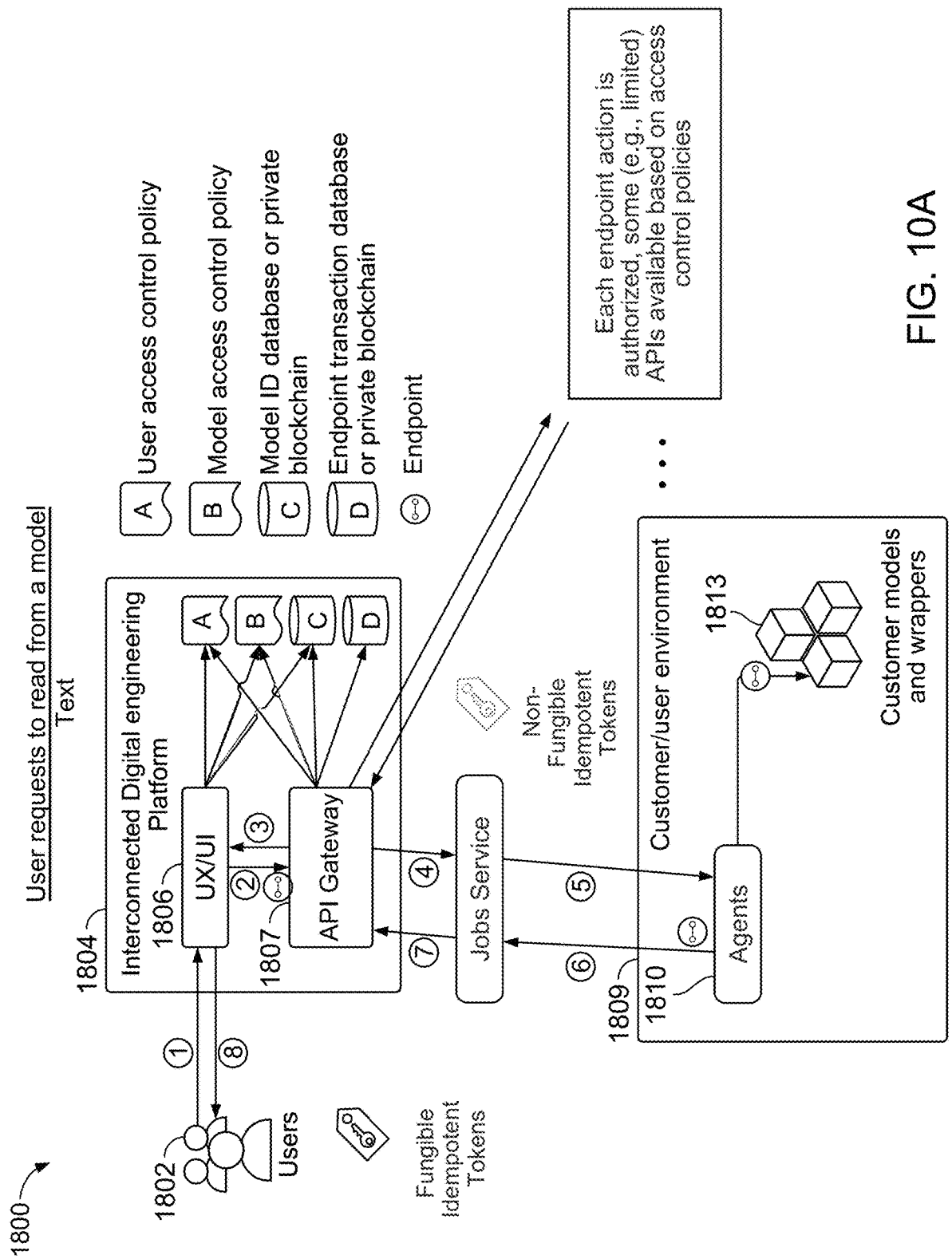
FIG. 10A is a diagram illustrating examples of security implementations where the user request corresponds to a read query or a write query.

In some implementations, as shown in FIG. 10A, the API Gateway 1807 is within the interconnected digital engineering platform 1804 acting as an interface while the model and function wrappers are within the customer environment 1809. In these implementations, the customer environment 1809 includes one or more cells and an API manager. Each cell is represented by each function block situated behind the API manager, which serves as a container for the microservices and associated APIs.

In some implementations, the WAF serves to scrutinize traffic for any potential threats, while the gateway isolates individual cells, only granting access to authorized users with the appropriate identity tokens. Once traffic has successfully traversed these security measures, then the traffic can be provided to and interact with the various functions. This architecture not only streamlines the processing of requests but also maintains stringent security protocols, thereby creating an optimal environment for both resource sharing and intellectual property protection.

In some implementations, the digital engineering and certification ecosystem 1800 of FIG. 10A illustrates a user 1802 interacting with an interconnected digital engineering platform 1804. The interconnected digital engineering platform 1804 can communicate with a customer's computing environment 1809. The communications between the interconnected digital engineering platform 1804 and the customer's computing environment 1809 may pass through a firewall and/or a jobs service layer. Particularly, companies may safeguard their networks and limit the information they share outside their network by way of a firewall. This particular feature of limiting access to a company network can be extended to include the feature of model sharing.

As illustrated in the digital engineering and certification ecosystem 1800, a user 1802 can send a request to the interconnected digital engineering platform 1804. The user experience (UX) or user interface (UI) component 1806 can receive the request and log the request. Specifically, the UX/UI component 1806 can log the request in an endpoint transaction database or a private blockchain. The endpoint transaction data or the private blockchain may be located within the interconnected digital engineering platform 1804 or external to the interconnected digital engineering platform 1804, such as in a cloud network.

In some implementations, the UX/UI component 1806 may be located outside of the interconnected digital engineering platform 1804. In this case, the UX/UI component 1806 may be incorporated in a client device, for example, utilized by the user 1802. The client device, with the incorporated UX/UI component 1806, may communicate with the components within the interconnected digital engineering platform. For example, if the UX/UI component 1806 remains outside the interconnected digital engineering platform 1804, the UX/UI component 1806 can continue to communicate with the API Gateway 1807, as well as the user access control policy, the model access control policy, the model ID database or private blockchain, and the endpoint transaction database or private blockchain. The UX/UI component 1806 may be located outside of the interconnected digital engineering platform in the other systems described throughout this specification.

In some implementations, such as that shown in FIG. 10A, the UX/UI component 1806 may be located within the interconnected digital engineering platform 1804. This implementation complies with Zero Trust security principles, ensuring that only authorized users can access the user interface and interact with the platform and its associated artifacts.

When a user requests to read from a model in FIG. 10A, the process follows these steps: The user 1802 connects to the interconnected digital engineering platform 1804 via their end device and submits a request to access a model, multiple models, or a specific slice of the model (1). The request is sent to the API manager, which enforces authentication and authorization mechanisms, through the Customer Identity Access Management System, to ensure that only authorized users can access the requested data and routes the data to the cell where it is intercepted by a WAF (2). The WAF inspects and filters the incoming traffic for potential threats and malicious activity. If the request is deemed safe, the WAF allows the traffic to the cell containing the microservice and associated APIs responsible for handling the read operation (3).

The microservice processes the request, retrieves the requested data from the digital model, and returns the output to the user 1802 through the API manager and interconnected digital engineering platform 1804. Throughout this process, security measures such as endpoint transaction database logging or private blockchain recording can be employed to maintain a record of access requests and ensure the integrity and security of the digital models and data.

Moreover, the interconnected digital engineering platform 1804 can fetch the model information (e.g., a model ID and other data) from the model ID database or private blockchain via the API Gateway 1807. Then the API Gateway 1807 can forward the access request to the job service (4). The job service can determine whether this is a new request or a repeated request. If the job service determines this request is a new request, then the jobs service can create an FIT and one or more NFITs for the request and send the request to the agents 1810 (5). However, if the jobs service determines this request is the same request previously sent with a threshold time period, then the jobs service can discard the request. The same request may be sent by the user 1802 when a network error occurs or when the user sends the same request within the threshold time period by rapidly interacting with a user interface on their client device. The agents 1810 can access the data stored in the model owner's environment or customer owner's environment 1809, to access one or more stored models 1812 in the customer owner's environment 1809. The customer owner's environment 1809 may be positioned behind one or more firewalls. The firewall can either accept or deny the access request provided by API Gateway 1807. If the firewall accepts the access request, the request is forward to the agent 1810 of the customer owner's environment 1809.

The agent 1810 can verify the access request permissions with the user access policy server and the model access control policy, and retrieve data from the requested model 1812. In response, the agent 1810 can return the requested model or data indicative of the requested model through the firewall to the jobs service (6). If applicable, the firewall may either accept or deny the agent 1810's access to provide the requested model to the jobs service. If accepted, the firewall can provide the requested model or data indicative of the requested model to the jobs service. The job service can determine, from the returned results, that the task associated with the request has been completed in the customer environment 1809, and can discard the corresponding FIT and the NFIT for that completed task, such that user 1802 can send subsequent similar requests without preclusion of execution. Then, the job service can transmit the requested model, data indicative of the requested model, or results of an action performed on the requested model to the API Gateway 1807 (7). The API Gateway 1807 can display the returned data from the job service to a client device of the users 1802 (2).

In the context of digital engineering and certification ecosystem 1800 as illustrated in FIG. 10A, the relationships depicted in FIG. 10A among the components can be interpreted as follows: 'A' represents a User Access Database, commonly known as Customer Identity and Access Management (CIAM). The CIAM serves as a centralized identity management solution, integrating with the API manager to allow or deny system interactions based on user permissions. 'B' and 'C' portray Model Access Control Policy and Model ID Database, respectively. These components interact with the API manager to manage and verify identities and to enforce established access controls. 'D' indicates the endpoint transaction, which is recorded at the API Gateway. This Gateway interacts with the cell, hosting the microservices for the model and function wrappers, enabling the smooth exchange of information and facilitating the application's overall functionality.

Figure 10B:
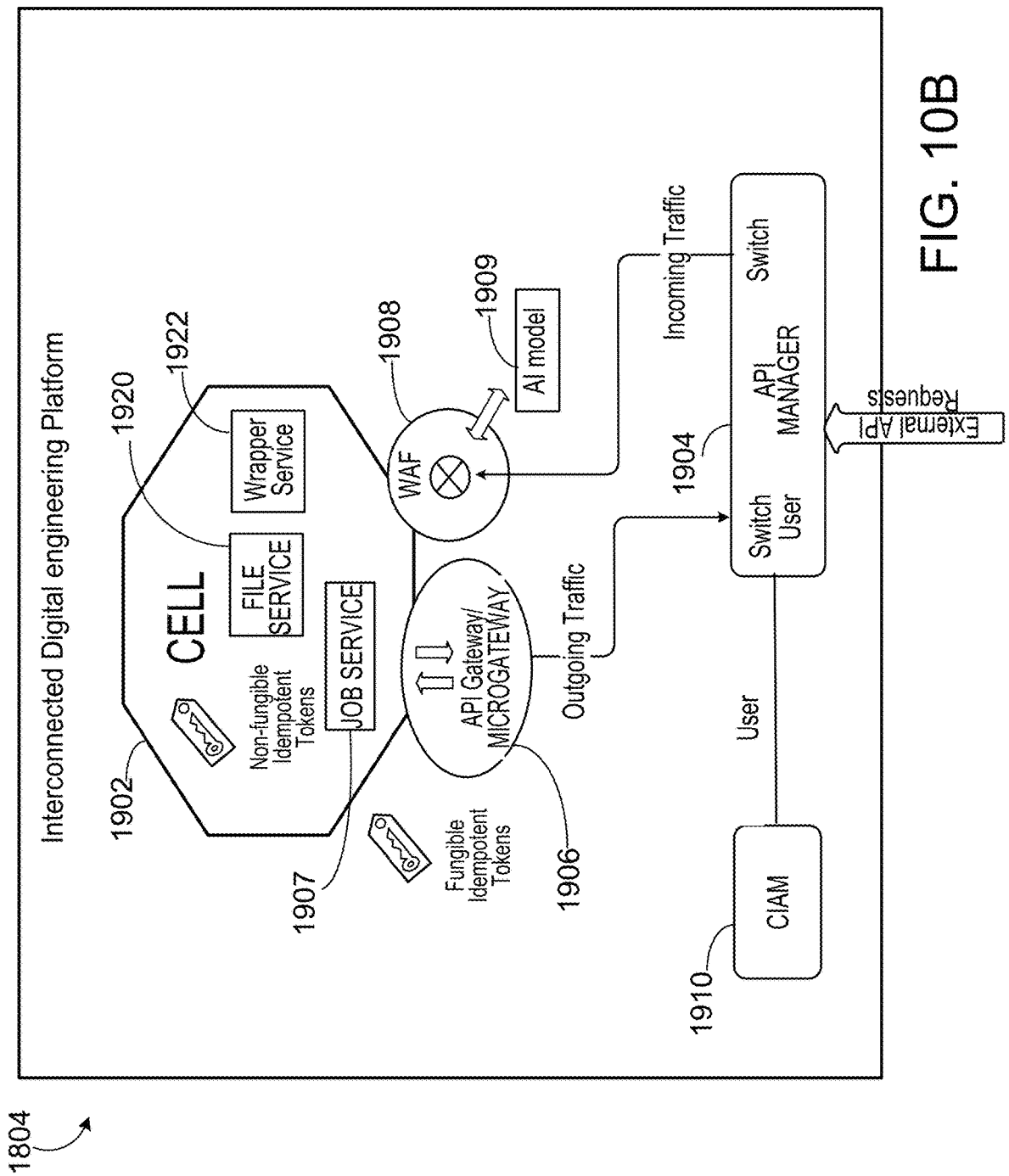
FIG. 10B is a diagram that shows high-level components of the cell-based security architecture, illustrating the security tenets that drive each one of the components.

FIG. 10B illustrates an interconnected digital engineering platform 1804. The interconnected digital engineering platform 1804 includes one or more cells 1902, an API manager 1904, linking to one or more API gateways 1906, one or more web application firewalls (WAFs) 1908, a customer identity and access manager (CIAM) 1910 and a user 1802. The one or more cells 1902 in the interconnected digital engineering platform contain API gateways 1906, which serve as entry points for managing and processing API requests. In some implementations, an API gateway 1906 serves only a single cell and can be referred to as a micro gateway. Each cell is securely protected by a WAF 1908. The API manager 1904 can communicate with each cell 1902 through a corresponding WAF 1908 and an API gateway 1906 that securely protects the cell. Further, a job service layer 1907 is located after the API gateway 1906 and issues the fungible idempotent tokens on the user side and non-fungible idempotent tokens on the processing side inside the cell 1902. In some examples, additionally a File Service layer 1920 or a Wrapper Service 1922 may also be present and assist further in processing the work inside the cell.

Each cell is located within the interconnected digital engineering platform 1804 and contains an API gateway 1906. The WAF 1908 is attached to the cell, providing an additional layer of security. The API manager 1904 is housed in the services virtual application and is responsible for managing the entire platform's APIs. The user 1802 can interact through the API manager 1904 with the interconnected digital engineering platform 1804. In some examples, the user interaction at the API manager 1904 can itself be the output of orchestration scripts, e.g. python, java, or other scripts, executed on the digital engineering platform that reflect specific actions to be taken in a digital thread, implemented by specific actions at digital models hosted as microservices within the cells. For example, the specific actions can include modifications or adjustments to multiple digital models. The orchestration scripts can thus reflect the broader user workflow.

The API Manager 1904 or the gateway 1906 may not directly communicate with the customer environment but communicates through a permissions layer, file layer, job scheduler, wrapper, and agent. In the schematic of the cell 1902, the job service layer 1907 vends the fungible tokens to the user side and non-fungible tokens to the processing side where the cell 1902 exists. On the user side, the fungible tokens represent the work being requested to be performed and on the processing side, the non-fungible tokens represent the work actually performed on the customer environment using specific customer DE models and customer data.

In an exemplary embodiment within a digital engineering ecosystem, the cell 1902 serves as a container for one or more microservices, which includes a select set of APIs implementing logic that link to the APIs for the digital models or other client applications. This model splicer/wrapper 808 within the cell connects various components within the ecosystem, allowing each cell to communicate and interact with each other securely and efficiently. The micro gateway 1906 stores the configuration and security settings for the micro service and the micro services associated APIs, ensuring that each cell operates securely and effectively. Examples of the cell's micro gateway can include managing access to microservices, processing API requests, providing a secure entry point for client applications, and facilitating secure communication between digital models and other components within the digital engineering ecosystem.

The micro gateway 1906 can include a lightweight, high-performance gateway that provides security and routing capabilities within the cell. The function of the micro gateway 1906 is to enhance the security and performance of a respective cell by offloading some of the processing tasks, such as authentication and input validation, for example. Examples of the micro gateway's use include validating incoming requests, enforcing access control policies, and providing a secure communication channel between the request and the backend services, to name some examples.

In an exemplary embodiment within a digital engineering ecosystem 1804, the WAF 1908 can inspect, and filter data traffic associated with various APIs within the ecosystem. This includes monitoring requests to microservices within a cell and the outputs returned from the microservices within a cell. By inspecting and filtering both incoming and outgoing traffic, the WAF 1908 can provide comprehensive protection against web-based attacks and can ensure the secure exchange of data between client applications, microservices, and digital models in the ecosystem. Examples of the WAF's use include signature-based detection of known attack patterns, anomaly detection, the implementation of custom security rules, and monitoring the communication between microservices and other components within the digital engineering ecosystem.

The WAF 1908, cell 1902, micro gateway 1906, and job service 1907 are essential components for providing a comprehensive security solution for the interconnected digital engineering platform 1804. Without these components, the system would be vulnerable to various web-based attacks, unauthorized access, and data breaches. Alternative methods to prevent these issues can include, for example, using other security solutions, such as intrusion detection systems (IDS) or intrusion prevention systems (IPS). However, the combination of a WAF 1908, cell 1902, micro gateway 1906, and job service layer 1907 provides a robust and efficient security solution.

In some implementations, an AI model 1909 is embedded into the WAF 1908 to assist with security. The AI model 1909 can assist in the operation of the WAF 1908 to provide robust security through data analytics and predictions for traceability, auditability, or malicious activity detection, to name a few examples. Each cell 1902 has an event log that can be accessed by a separate cell for collecting the training data for the AI model. The separate cell hosting the training data will send a request to the API gateway 1906 that then provides access to the event log. In some examples, the AI model 1909 can be trained to determine whether a request contains malicious activity. The AI model 1909 can be trained using past data, e.g., prior requests, which include malicious activity and those that do not include malicious activity. In this manner, the AI model 1909 can assist the WAF 1908 in determining whether a current request includes malicious activity, and ultimately, whether the current request should be allowed access to the cell or not.

The security advantages offered by using a cell 1902, WAF 1908, and micro gateway 1906 include enhanced protection against web-based attacks, secure access control, and efficient management of APIs. These components work together to provide a comprehensive security solution that safeguards the microservices within the cell, backend services, and customer data from potential threats and attacks. One key advantage is the implementation of zero-trust security for models, where both user access is authenticated at the gateway to microservices, and access is limited to a specific subset of data for a digital model, for which the user is authenticated. This approach ensures that only authorized users can access the relevant data within the digital engineering ecosystem, further enhancing the overall security posture of the system.

Other components that can be used instead of a WAF and a micro gateway can include, for example, intrusion detection systems (IDS), intrusion prevention systems (IPS), next-generation firewalls (NGFW), or security information and event management systems (SIEM). However, the combination of a WAF and a micro gateway provides a specialized and efficient security solution in the interconnected digital engineering platform.

In a secure digital engineering system as shown in FIG. 10B, data flow begins with a user providing a request to modify a model parameter. In some implementations, the user request to modify a model parameter can itself be the output of orchestration scripts, e.g. python, java, or other scripts, executed on the digital engineering platform that reflect specific actions to be taken in a digital thread, implemented by specific actions at models hosted as microservices within the cells. The orchestration scripts can thus reflect the broader user workflow. The user request is authenticated by the Customer Identity and Access Management (CIAM) 1910 system using techniques like multi-factor authentication or single sign-on, which then issues an identity token to the user's request. The API Manager 1904, adhering to the zero-trust principle, receives and verifies this token. The API Manager 1904 logs the user request and regulates the user request using API throttling and rate limiting. The API Manager 1904 provides the request to the API gateway 1906, which subsequently provides the request to the WAF 1908. The WAF 1908 scrutinizes the data packet from the API Manager 1904 for any potential threats before the data packet reaches the API Gateway 1906. The API Gateway 1906 checks the user request's authorization using the token and a source of the user request, e.g., authentication of the user that transmitted the user request. The API Gateway 1906 then provides the request subsequently to the job service layer 1907, which either issues the paired idempotent tokens or discards the request if a duplicate is detected.

The API Gateway 1906 can validate the data packet and once validated, the API Gateway 1906 can decrypt and permit the decrypted data packet into the job service layer 1907 in the cell's trusted zone, with traffic still being regulated under the zero-trust principle. Following the issuance of fungible idempotent tokens and non-fungible idempotent tokens at the job service layer 1907, the cell 1902 can perform an action associated with the user request. Upon completion of the work leaving the cell 1902, the fungible idempotent token is updated at the job service layer 1907 with the status of the work request and the job service layer 1907 further transmits the request to the API Gateway 1906. The API Gateway 1906 re-encrypts the data packet, carrying source and destination information and sends the re-encrypted packet to the API Manager 1904. In a multi-cell scenario, the API Manager 1904, assisted by rate limiters and API throttlers, and the API Gateway 1906 can manage the traffic from each cell through the job service layer 1907 to avoid congestion. Cells 1902 can communicate via the API Manager 1904, the API Gateway 1906, and the job service layer 1907 which keeps track of request sequences across cells. All actions are logged by both the API Manager 1904 and CIAM system, creating a comprehensive audit trail and ensuring a zero-trust environment.

In some implementations, the digital engineering ecosystem 1804 can include a tokenizer. A tokenizer can be utilized in the digital engineering ecosystem 1804 to expand the platform's security capabilities to include Zero Knowledge data orchestration. In some cases, the tokenizer can translate customer data into cryptographic fingerprints that can be exchanged with other systems or stored without divulging the original customer data. In some cases, the tokenizer can tokenize the customer data into cryptographically hashed tokens that can at a later time be exchanged back for access to the sensitive data. The tokenizer thus allows for performing the user request without having any access to the sensitive data but only uses tokens that represent the underlying data. The addition of the tokenizer enhances the cell security architecture to further satisfy Zero Knowledge security design constraints. Alternatively, the security architecture can also implement homomorphic cryptographic techniques for further Zero Knowledge implementations.

In some implementations, a service mesh can be used in place of the API Gateway 1906. In further detail, the service mesh can be used as a networking layer that allows cluster services, e.g., identity, permissions, file service, job service, etc., to communicate with each other dynamically and in a scalable manner. For example, a commercial service mesh such as Istio can be configured and used.

Service meshes allow the digital engineering platform 1804 to scale services without violating zero-trust constraints by ensuring only authorized network components are included in the communication mix. In some examples, zero trust security defines that the platform can dynamically configure the networks that connect its services to each other, ensuring secure, efficient, and scalable communication.

Within the digital engineering platform architecture, service meshes exist wholly within the enclave. The service meshes can facilitate communication between internal service APIs (file service API, job service API, etc.) and users of the main DE platform API. Essentially, the service meshes are the glue that holds the various services in the enclave together, enabling seamless interaction.

In some implementations, the service mesh also performs the functions that an API gateway would typically manage, ensuring that internal services can always communicate with users of our public-facing API. This dual role enhances both security and operational efficiency.

In some implementations, the service mesh can perform various functions that offer improved efficiency and provide options within low connectivity environments. The API gateway, initially part of the cell security architecture, provides a networked means to securely access data artifacts in the customer data store. In some implementations, the API gateway can be replaced with a service mesh (e.g., a commercially available one such as Istio) to efficiently apply permissions, identity services, and other security features. In low-connectivity environments for the DE platform, the service mesh, with its permissions layer, can manage peer-to-peer (P2P) transfer of data artifacts in a secure manner. The platform architecture coordinates data artifacts in a decentralized manner, but a P2P version of distributed enclaves may need to reference a single immutable source for model or data artifact continuity. Such immutable references could be a secure, centralized database of action logs or associated model/data artifact versions linked to an enclave. Alternatively, model continuity information could be tokenized on a blockchain. The P2P deployment of enclaves, combined with ledger-style attributes of provenance, versions, and access in low-latency/no-connection scenarios, extends the application of the digital engineering platform for a broad set of applications.

In computing systems without a service mesh, network connections between services can be provisioned and configured manually, including during scale-up and scale-down. This manual intervention would result in an enclave that may not scale appropriately without human operators. By leveraging the service mesh, for example, the digital engineering platform can eliminate this bottleneck, allowing the platform to scale automatically while maintaining high levels of security, efficiency, and scalability.

Figure 11A:
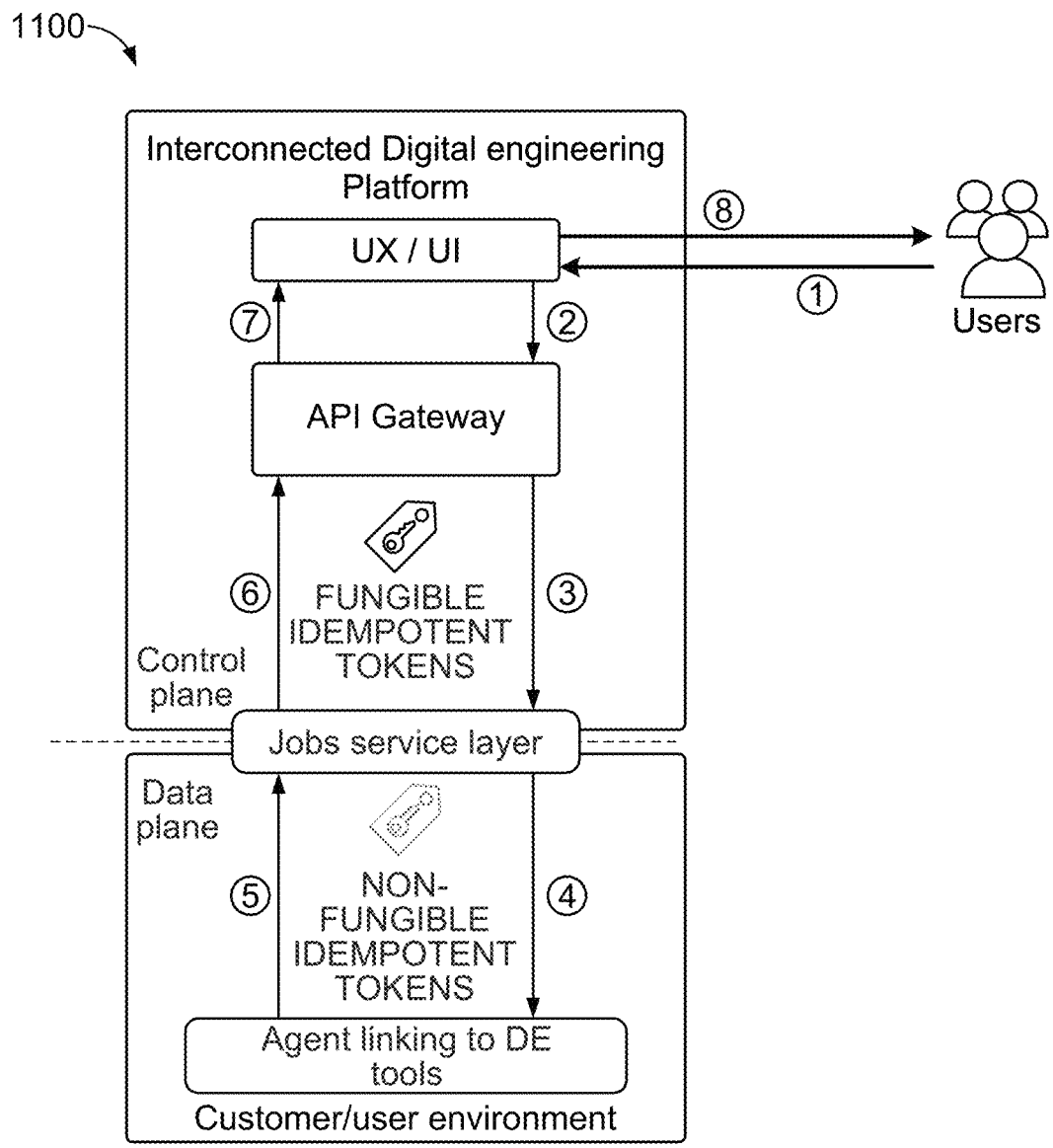
FIG. 11A is a data flow that presents a method for data packets of a user request to modify a model using idempotency tokens.

FIG. 11A is a data flow 1100 that presents a method for data packets of a user request to modify a model using idempotency tokens. The computer system 108 can perform the data flow 1100, for example.

In the data flow 1100, the user submits a request to the digital engineering platform through the user interface (1). The digital engineering platform can receive the request and convert the request into a signed request using the public-facing API that involves work done on a model they have previously shared (2). In this manner, this request can safely be repeated if network problems prevent the request from arriving at the API Gateway.

The API Gateway can receive the request and dispatch the request to the job service layer (3). The jobs service layer can assign a UUID to the long-running task, along with a Fungible idempotent token (FIT) and in response, transmit an HTTP 202 accepted response back to the user. The HTTP 202 accepted response also includes the UUID for the long-running task that needs to execute for the customer. In this manner, any repeat request sent by the user will be assigned the same FIT by the Jobs Service.

The job service layer creates a non-fungible idempotent token (NFIT) on the data plane for the task, with the specified digital engineering tool (4). In this manner, the NFIT allows the DE tool requests to be repeated without repeating the work itself being completed. In an example, the work request can perform a simulation of fluid flow for a particular aircraft wing to extract a performance envelope, where the DE tool executes the individual simulation runs, e.g., 100 to 10,000 runs, in response to receiving the work request. The FIT can represent the work request that can raise a number of NFITs with each of the corresponding DE tool requests. The FIT and NFIT share common metadata such as the requesting user and the action requested. However, the NFIT includes the specific digital engineering tool that is utilized for the user request. The Jobs Service layer can include a library of prior benchmarks or may communicate with a set of digital engineering tools to estimate the effort and associated costs to perform one or more tasks.

The output from the digital engineering tool task, along with the corresponding NFIT is transmitted back to the job service layer (5). The job service layer synthesizes the output and confirms completion of the task along with the associated FIT for the corresponding NFIT (6). The API Gateway conveys the task completion status to the UX/UI for the users (7). The message to the user specifies that the digital engineering task has been completed (8).

Figure 11B:
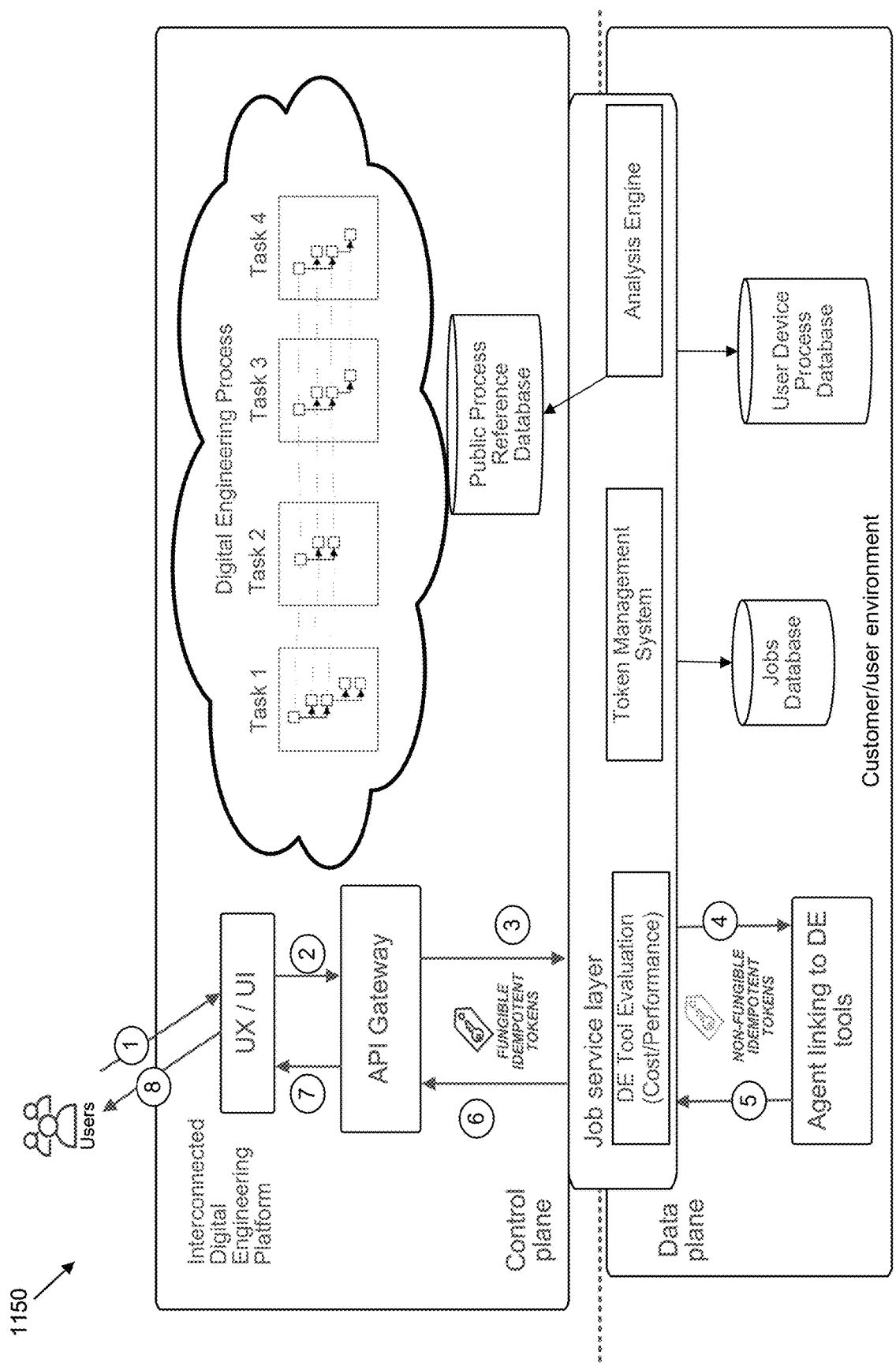
FIG. 11B is an example data flow that presents a method for data packets of a user request to track and estimate carbon emissions of an operation using idempotency tokens.

FIG. 11B is a data flow 1150 that presents a method for data packets of a user request to track and estimate carbon emissions of an operation using idempotency tokens. The computer system 108 can perform the data flow 1150, for example.

The digital engineering platform can be configured to perform operations, e.g., systems engineering tasks, through a sequence of computational processes that execute digital engineering models and tools. A user interface can be provided from the digital engineering platform to a client device, thereby providing an input to specify a type or sequence of tasks. In some implementations, the user interface displays a selection of model wrappers and tools from the digital engineering platform, for the client device to select. The digital engineering platform is configured to utilize idempotency tokens, e.g., Fungible Idempotent Tokens (FITs) and Non-Fungible Idempotent Tokens (NFITs), to uniquely identify and track tasks and tool requests, respectively.

Upon receiving a request from a client device, e.g., by a request entered through the user interface, the digital engineering platform is configured to generate a signed API request and direct the request towards an API gateway. The gateway is configured to activate a Jobs Service component, which generates a unique identifier for the task. The gateway is also configured to generate an FIT associated with the task. The Job Service dispatches NFITs to the data plane, targeting one or more digital engineering tools specified for the task. Each NFIT shares the metadata with the FIT. Examples of metadata can include an identification of data related to the request, such as the user (e.g., the client device), the model wrapper, and the model. In some implementations, the metadata can include data related to the task requested to be performed by the digital engineering platform. The NFITs facilitate task-related computations by digital engineering tools and prevent extraneous task duplication, e.g., processes resulting in the task being inadvertently repeated. The outputs from the NFITs are transmitted to the Jobs Service for task completion confirmation.

In some implementations, the digital engineering certification process includes an indication input corresponding to the client device. The indication input can include a sequence of digital engineering tasks, as well as associated model wrappers, digital engineering models, and tools for the sequence of tasks. For each task, the process 1150 can be performed by the digital engineering platform utilizing the idempotency tokens.

A user submits a request through the user interface (1). The user input request is converted into a signed request for the client-facing API, which can include an amount of work completed by the process on a model shared by the request through the client device (2). In some implementations, the client device is communicatively coupled through a network to the digital engineering platform to receive the request.

The API gateway of the digital engineering platform dispatches the Job Service layer, which can be configured to assign a unique identifier for a task, and a corresponding Fungible idempotent token (FIT) (3). In some implementations, the Job Service layer is configured to transmit an HTTP 202 Accepted Response to the client device to confirm receipt of the request, along with the UUID for the task. Further similar requests from the client device can be associated with the same FIT, e.g., a common FIT for multiple requests.

The Job service layer of the digital engineering platform generates non-fungible idempotent tokens (NFIT) on the data plane for the specified DE tools related to the request, e.g., related to the create FIT associated with the request (4). The NFIT can share common metadata with their associated FIT. The common metadata can include data identifying the requesting user, the requested model wrapper and requested model, and can include additional information specific to the user request.

In some implementations, tool requests can be monitored by the digital engineering platform to prevent extraneous repetitions. For example, NFITs can share common metadata with their associated FIT such as requesting user, requested model wrapper and requested model, and include additional information specific to the user request. As another example, the digital engineering platform may receive another request to perform a similar task or function related to the request received in (1). The Job service layer of the digital engineering platform may be in the process of performing the task(s) or function(s) from the request received in (1) when the new request is received. In response to receiving the new request, the digital engineering platform may perform functions described in (1), (2), (3), and (4), which includes generating a new FIT for the new request and new NFITs for the new FIT. The Job service layer can transmit an HTTP 202 Accepted Response to the client device to confirm receipt of the new request. In some cases, the digital engineering platform can determine that the new request is similar to a previous request that is currently active, e.g., the NFITs for the earlier request indicate its tools are still performing their requested function or remain active. In this manner, the Job Service layer can transmit the HTTP 202 Accepted Response to the client device with the same information from the previously generated FIT.

In some implementations, the Job service layer can determine whether the newly created NFITs match to any currently active NFITs. In further detail, the Job service layer can determine whether the tool requests from prior NFIT(s) of the previous request have completed their tasks. The Job service layer can compare the common metadata of the newly created NFITs to common metadata of any currently active NFITs that are still processing their corresponding tasks. For example, the Job service layer can compare the (i) requesting user, (ii) the requested model wrapper, (iii) the requested model, and (iv) additional information specific of the newly created NFITs to the common metadata in any NFITs that are still processing their corresponding tasks. If the Job service layer determines that a match exists between the new and previously created and active NFITs, then the Job service layer can return a status message to the API Gateway indicating that the NFITs are still active. Said another way, the Job service layer can return a state message to the API Gateway indicating that the previous task the client device requested is still active and the new request cannot yet be processed. As a result, the API Gateway can notify the user that the functions associated with the newly provided request will not be processed as the functions are duplicative of an already on-going task. The API Gateway can discard the new request and the newly created NFITs and corresponding FIT. For example, this process may occur if a user, an automated system, or another end device accidentally or intentionally transmits multiple requests of the same kind to the digital engineering platform. In this manner, duplicative requests are prevented from being executed at the same time or substantially the same time. Once the tasks associated with the active NFITs are complete, then the Job service layer can notify the API Gateway of their completion, and the user is ultimately notified and can submit a similar or different request.

The output from the NFIT at task completion can be transmitted to the job service layer (5). The job service layer can be configured to confirm completion of associated FIT (6). The API Gateway of the digital engineering platform can be configured to monitor and provide the status of the task (7). A message can be transmitted to the client device associated with the user, indicating task completion (8).

The digital engineering platform is configured to utilize an atomic unit, e.g., a relatively small, repeatable unit, for user activity on the platform. For example, the atomic unit can measure computation on using client device data, and interactions with client devices on the platform are tracked through fungible idempotency tokens. Tasks performed on the platform are tracked through a corresponding FIT.

For example, FITs can include task-related metadata, such as, timestamps of token initiation and completion, reference and actual costs for task completion, attributed value, and performance requirements verification indicators. The digital engineering platform can be configured to utilize metadata for analysis, e.g., to compute computational time savings, cost effectiveness, and carbon emissions reductions from utilizing the platform. The Jobs Service layer of the digital engineering platform can include an analytics engine configured to perform analytics using this token data.

The digital engineering platform includes an analytics engine configured to quantify time savings from performing the task on the platform. The analytics engine can determine the time savings at the Jobs service layer. The analytics engine is configured to utilize Fungible Idempotent Tokens (FITs) to mark the initiation and completion timestamps of each task.

For example, an analytics engine in the Job service layer can compute the time for the successful completion of a task defined with an FIT, by summing total computation time by different NFITs that perform sub-tasks associated with the task.

The analytics engine can be configured to interface with a jobs database that stores reference completion times for related tasks. In some implementations, the analytics engine is configured to integrate with other databases, e.g., within the client device environment or other databases. The analytics engine can be configured to retrieve throughput metrics, performance metrics and baseline times for tasks. The digital engineering platform can utilize the retrieved data to compute a differential time-saving score, e.g., by comparing the digital process completion time against related benchmarks for the task.

As an example, the analytics engine compares the completion time for certification process with physical prototyping (e.g., a benchmark reference) to the completion time of a similar digital certification process within the DE platform to estimate savings, e.g., computational load, time savings, cost savings, carbon footprint.

For example, the digital engineering platform can initiate and record the start and end timestamps of each task using FITs. The digital engineering platform can capture and aggregate the computation time contributed by various sub-tasks through the corresponding NFITs for the FITs. The digital engineering platform is configured to connect to an integrated jobs database to retrieve benchmark completion times for tasks of similar type, size, and complexity. In some implementations, the digital engineering platform can be configured to retrieve data from other databases, e.g., related to the client device, public databases, to collect additional throughput metrics or performance metrics or baseline times for the task.

The analytics engine of the digital engineering platform can be configured to account for task completion and cost estimation associated with the executed task. For example, the analytics engine can be configured to connect with a reference database to determine a baseline cost benchmark for different tasks. For security and efficiency reasons, these benchmarks are maintained separately for each account in the system. The most efficient tool for one customer's workload may not be the most efficient for another customer's workload. Similarly, efficiency benchmarks can be a source of side-channel information for attackers to learn unauthorized attributes of other customers' workloads. These conditions support its integration with the customer's own systems to extract estimates of value attribution for specific tasks, allowing for a more tailored cost-benefit analysis. The analytics engine can be configured to integrate with the client device to estimates of value attribution for specific tasks, allowing for a more tailored cost-benefit analysis. For example, some tasks can be prioritized by user input to determine reduction in computational loads, carbon emissions, while maintaining priority specified by the client device. The digital engineering platform utilizes an idempotency token management system to maintain consistency, stability, and repeatability of costs for tasks. The digital engineering platform implements isomorphism determination to prevent the execution of redundant tasks, thereby maximizing computational resource efficiency.

For example, the digital engineering platform can fulfill large volumes of requests from multiple client devices. Value for task performance can be correlated (e.g., proportional) to the opportunity cost for the client device, such as computational cost for performing the task on the client device instead of the digital thread in the digital engineering platform, including risk mitigation for successful completion of a task.

The digital engineering platform architecture with idempotency token management allows the computational cost to operate the digital engineering platform to remain roughly stable, e.g., step-linear, regardless of request volume of tasks to a given agent. Such stable computational costs of operating the digital engineering platform until additional tool servers are scaled up, e.g., to provide further savings for digital engineering work performed on the platform.

In the digital engineering platform, computational loads can be minimized by routing work to the lowest-cost client devices, servers, and computers, continually caching FIT and NFIT-indexed results, and auto-scaling fast-lane workers where those work functions are requested.

The Job service layer can also be configured to link to a Jobs database to refer to any previously performed tasks for reuse, rather than duplicate task execution. The process of the digital engineering platform checking any given task if it is similar to any comparable previously performed task is referred to as isomorphism determination.

In some implementations, isomorphism determination of two or more tasks/functions, is performed by performing a routine scan of the library of tool functions in the digital engineering platform for tools that have the same input and output node vectors. For example, "HideParts( ) exists in OpenSCADand in OpenCascade," or "GetMesh( ) exists in OpenFOAM and in FreeFEM".

The digital engineering platform can execute a tool corresponding to a pair of idempotency tokens that includes an NFIT and an FIT, in which related tools/functions for the same tokens can be utilized in determining isomorphic outputs. For example, the digital engineering platform can be configured to determine isomorphic outputs and execute the related functions to determine a runtime comparison of the related functions. By doing so, the digital engineering platform determines a benchmark performance for executing the tool. Upon determination that two or more related functions provide the same output, e.g., same values and structures, the Jobs Service layer of the digital engineering platform can flag the functions as isomorphic to each other.

The digital engineering platform performs an isomorphism determination of model outputs, tool outputs, etc. and can provide numerous advantages. For example, the architecture of the digital engineering platform allows for fungibility of the functions/tools/models executed on the platform. The digital engineering functions/tools/models can be interchangeable and registered through the Jobs Service layer through fungible idempotent tokens. As another example, the digital engineering platform caches tool runtime requests, thereby preventing extraneous or redundant analysis keyed by the idempotency tokens. The digital engineering platform also dynamically dispatches a task, operation, or function to a tool from a set of tools with minimal cost to complete the dispatched task, operation, or function, e.g., computational loads, carbon emissions. The digital engineering platform also quantifies tasks performed and compares the computational cost for performing the task by a client device to the cost by performing the task on the digital engineering platform. The digital engineering platform also calibrates cost based on the quantification of the task or operation performed.

Briefly, the digital engineering platform employs idempotency tokens to manage work duplication of tasks; establishes a link to a reference database that provides cost benchmarks for a variety of tasks; integrate with the client devices and systems to access value attribution estimates for individual tasks; utilizes isomorphism determination algorithms to identify and avoid executing redundant tasks; computes the total cost using the formula, e.g., total cost of all tasks is the sum of computational and/or operation costs for performing analysis for each task; and assess the total value by applying a value attribution cost or opportunity cost from the client device/system to the task performed on the digital engineering platform.

In some implementations, the process performed by the digital engineering platform utilizes FIT metadata to flag tasks that are capable of avoiding the need for physical prototypes, e.g., identifying tasks for carbon emissions calculations. The digital engineering platform establishes a link to a database containing carbon footprint estimates corresponding to each task type, e.g., carbon footprint data related to the tasks. The digital engineering platform aggregates the carbon emissions avoided for all tasks flagged by FIT metadata and calculates the total carbon emissions savings. For example, the calculation of total carbon emissions savings can be as follows:

Total Carbon Savings=Sum(Emissions Per Task) times Number of Instances Avoided

In a digital certification process that is performed on a digital engineering platform, verification or certification tasks can be performed to evaluate whether the results of modeling or simulations meet corresponding performance criteria. In other words, the digital engineering platform identifies tasks with potential to avoid building and executing physical prototypes, e.g., at a component, sub-system or whole system level.

The digital engineering platform employs an idempotency token system with both fungible and non-fungible tokens to ensure that tasks are unique, avoiding duplication. The digital engineering platform reduces the risk of incurring excessive costs, e.g., computational loads of executing tasks, and over-estimation of the amount of avoided physical prototypes. Thus, the digital engineering platform enables a digital certification process that is computationally more efficient than the physical prototype.

The analytics engine in the Job Service layer uses FIT metadata to identify tasks with a corresponding likelihood to avoid building physical prototypes. An example task can be a systems engineering task that involves verification or certification. Upon recognizing such tasks, the analytics engine activates a carbon emissions calculation module that taps into a specialized database that can include carbon footprint data. The database contains carbon footprint estimates specific to different types of tasks, in which the analytics engine uses to quantify the carbon emissions effectively avoided by digital certification of components, sub-systems or systems.

The idempotency token system and FIT metadata can prevent task duplication, and also provides standardization of task accounting on the digital engineering platform. This standardization extends to the calculation of avoided carbon emissions for tasks that replace physical prototypes. The approach is applicable across various digital engineering and certification applications, providing a reliable and environmentally-conscious metric for both internal and external evaluations of tasks.

Figure 12:
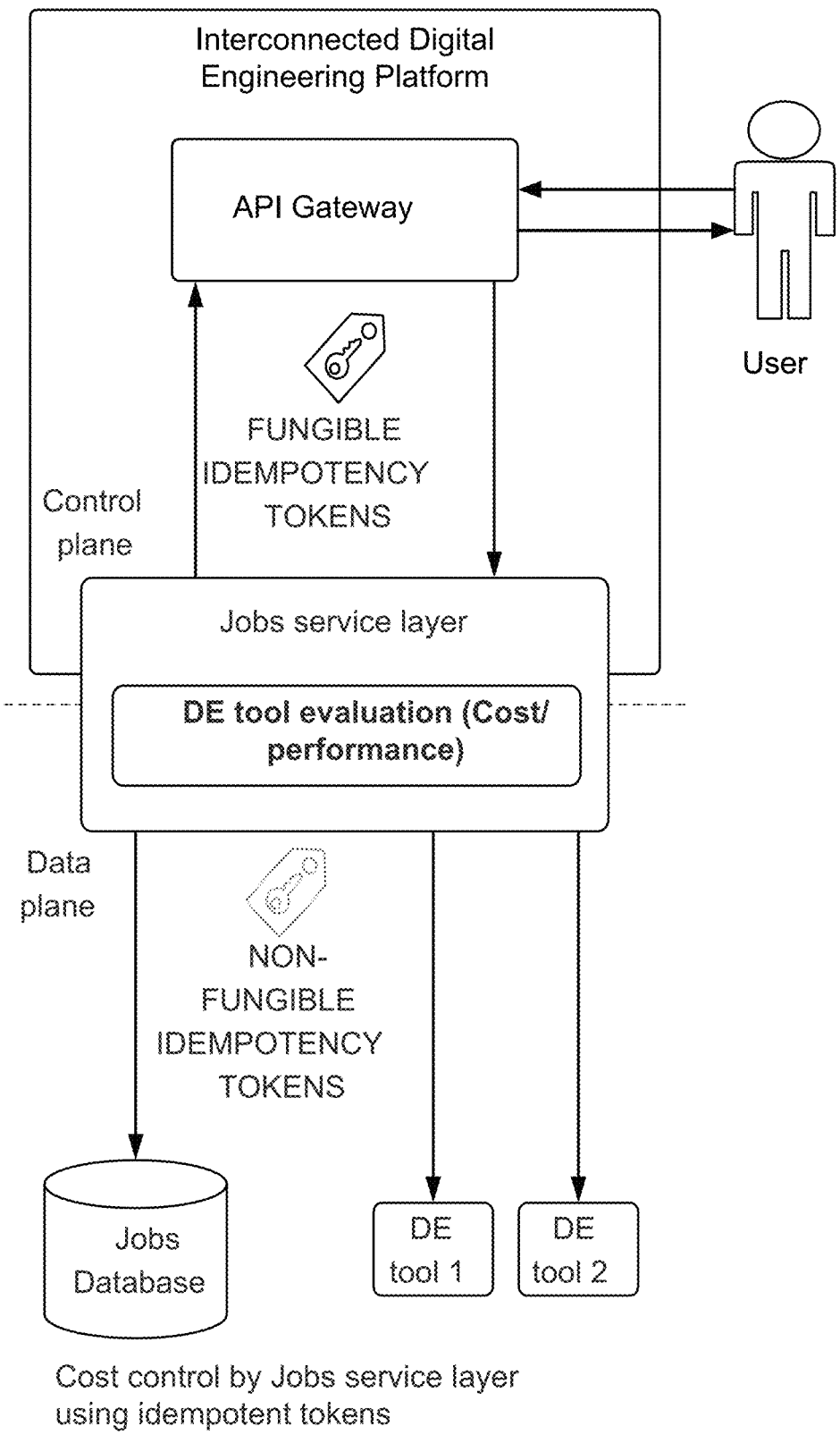
FIG. 12 is a data flow that presents a method for estimating a performance of a task at one or more tools using idempotency tokens.

FIG. 12 is a data flow 1200 that presents a method for estimating a performance of a task at one or more tools using idempotency tokens. The computer system 108 can perform the data flow 1200, for example. The data flow 1200 may be the process performed by the Jobs Service layer to estimate the cost or performance for a digital engineering tool to perform the user request.

In some implementations, the job service layer can include an analysis engine to estimate the cost of computation for the user request and route the request to the cheapest digital engineering tool that can fulfill the request. These cost estimations may utilize prior benchmarks and selectively query specific digital engineering tools on the customer environment. For example, a user request of "getParts" for a digital engineering request can be performed across two digital engineering tools, and performed as illustrated in data flow 1200.

The user issues an HTTP request to the API Gateway of the digital engineering platform (1). The HTTP request includes a request for a getParts wrapper on a model that the user previously uploaded to the digital engineering platform.

The API Gateway responds to the user with an HTTP code 202 and the FIT for the request. The request polls at an interval until the HTTP status request returns the HTTP Status code 200 OK, with the output of getParts (2). The HTTP Status code 200 OK is the mechanism through which the WAF or web server notifies as user agent that the request was fulfilled satisfactorily without errors or redirection.

The API Gateway requests getParts on the requested model from the job service layer (3). The job service layer queries the jobs database to determine which digital engineering tool of a set of digital engineering tools has performed getParts with the lowest compute cost. In response, the job service layer can select the digital engineering tool from the set to perform getParts that has the lowest compute cost, e.g., selects the digital engineering tool whose compute cost satisfies (meets or falls below) a threshold value. The job service layer can select the digital engineering tool whose prior compute costs meet this criterion to provide the request (4). The job database returns that digital engineering tool 1, for example, has the lowest cost for this wrapper (5). In some cases, the job service layer can select any digital engineering tool to perform an operation on a digital engineering tool, such as getParts, in the event the jobs database does not have a compute cost for a particular digital engineering tool. In some cases, the job service layer can obtain cost performances for each of the digital engineering tools from third parties and other external services.

The job service layer creates an NFIT for its request to digital engineering tool 1 to execute getParts on the requested model, saving the NFIT with this job in the jobs database (6). The digital engineering tool executes getParts and saves the output of getParts with the FIT to cache future lookups (7). On any subsequent request to the API Gateway to getParts on this wrapper, the FIT's request is now fulfilled and will be returned by the API Gateway to the user (8).

Figure 13:
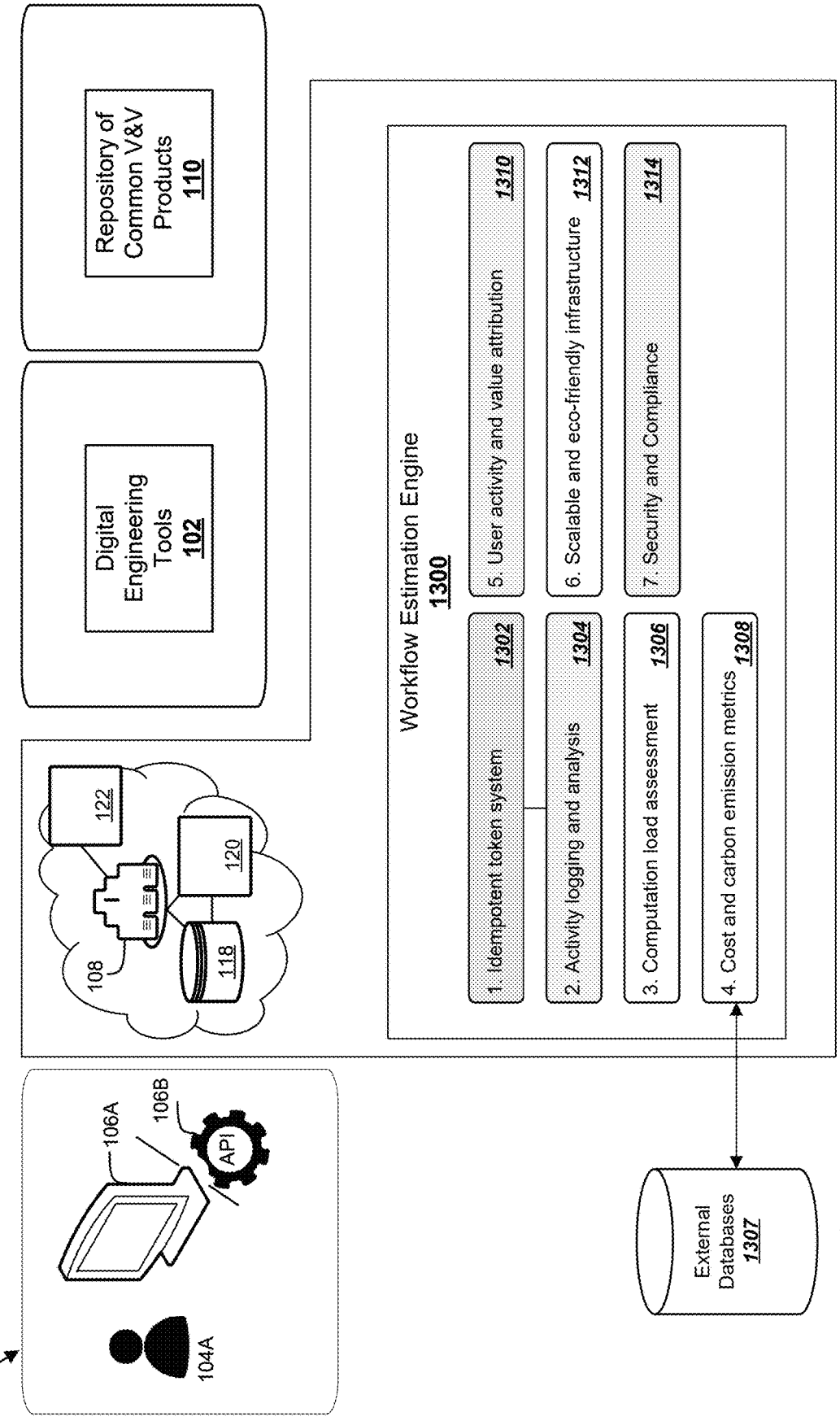
FIG. 13 is an example workflow estimation engine to determine cost emissions savings.

FIG. 13 depicts an example architecture of a workflow estimation engine 1300 implemented by the integrated digital engineering and certification ecosystem 100 (shown in FIG. 1). The digital engineering platform includes the workflow estimation engine 1300 to estimate and track time, cost, or carbon emissions of tasks performed in workflows. The workflow estimation engine 1300 includes subsystems and can be configured to perform operations to measure platform activity, analyze log data, track user activities for the digital engineering platform, and assess computational loads. The workflow estimation engine 1300 is configured to quantify carbon emissions and computational costs that are saved by completing the digital engineering tasks, e.g., in contrast to performing tasks through physical prototyping.

The workflow estimation engine 1300 includes an idempotency token system 1302, which can be configured to integrate fungible (FIT) and non-fungible (NFIT) idempotent tokens to measure platform activity accurately. Idempotency tokens, e.g., FIT or NFIT, can be generated to represent the requested work to be performed by the digital engineering platform. By representing workloads in the digital engineering platform, the idempotency tokens can track resource consumption as activities are performed on the digital engineering platform for workflows. The idempotency token system (also referred to as a "token management system") can be configured to track computational loads, time and carbon emissions as processes in the workflow are performed (e.g., repeatedly, iteratively, continually). Thus, the token management system provides deterministic quantification of the workflows that can be securely performed through the lifecycle of the token assigned for the process, e.g., from token issuance to token transfer to token redemption upon task completion. securely through a token lifecycle, from issuance to transfer and redemption, these tokens offer precise quantification and repeatability.

The workflow estimation engine 1300 includes an activity logging and analysis module 1304 configured to utilize tokens from the token management system to quantify computational resource consumption of activities performed by the digital engineering platform. For example, the activity logging and analysis module 1304 can be configured to log activities from users and analyze the activities to determine activity metrics. The activity logging and analysis module 1304 can utilize AI techniques such as those described in reference to schematic 650 in FIG. 6 above. The activity logging and analysis module 1304 can include a machine learning engine to analyze token data, thereby determining the security, computational load, computational cost, and carbon emission associated with the token. In some implementations, the AI techniques are trained on historical token data from tokens issued, transferred, retired, or some combination thereof, through the digital engineering platform. In some implementations, the activity logging and analysis module 1304 can be configured to generate a user interface to provide activity metrics derived from tokens for display, e.g., on a computing device.

The workflow estimation engine 1300 includes a computation load assessment module 1306 that is configured to determine and provide real-time resource monitoring of computational resources and loads for the digital engineering platform. In some implementations, the computation load assessment module 1306 is configured to analyze user activities logged from token data to generate predictions of computation loads for different types of tasks performed in a workflow. For example, the computation load assessment module 1306 includes tools to evaluate resources consumed for each operation and forecast future computation needs based on historical data. The computation load assessment module 1306 can be configured to apply algorithms to forecast computational loads for the digital engineering platform.

The workflow estimation engine 1300 includes a cost and carbon emissions module 1308 that can connect to external databases 1307, e.g., by wireless communication. For example, the cost and carbon emissions model can access benchmarks for carbon emissions emitted by different data centers, server farms, etc. The digital engineering platform can be configured to identify subsets of servers and data centers to minimize carbon emissions generated by performing tasks. In some implementations, the workflow estimation engine 1300 includes a module for tracking data center emissions and provides a reference value for the amount of carbon emitted when performing computations through the digital engineering platform.

The workflow estimation engine 1300 includes a user activity and value attribution module 1310, which can include an analytics engine configured to track user interactions on the digital engineering platform. The user activity and value attribution module 1310 can be configured to link digital threads of workflows to value maps, e.g., mapping values and priorities for stakeholders to workflows performed on the digital engineering platform. In some implementations, the user activity and value attribution module 1310 is configured to identify steps in a digital review process, in which generating a physical prototype can be prevented. Thus, the digital engineering platform can be configured to identify opportunities in which digital engineering tasks and workflows can be performed instead of generating and utilizing the physical prototype. The user activity and value attribution module 1310 can be configured to determine a prioritization of values for the stakeholders relying on outputs of the digital engineering platform to make decisions, e.g., selecting a digital environment for workflows that can be computationally advantageous compared to a physical prototype.

The workflow estimation engine 1300 includes an eco-friendly infrastructure module 1312 that is configured to utilize token management, e.g., from the idempotency token system, and perform additional computation load analysis. The eco-friendly infrastructure module 1312 assesses computational loads of the digital engineering platform and provides load data related to data centers. The load data can indicate estimated carbon emissions and computational load costs to provide jobs (e.g., from workflows or digital threads) from the digital engineering platform to some or all data centers. For example, a subset of data centers can be selected to support execution of digital tasks in the digital engineering platform, thereby improving reduction in energy consumption for executing workflows.

The workflow estimation engine 1300 includes a security and compliance module 1314 to maintain security in the illustrated architecture of FIGS. 1 and 13, e.g., providing zero-trust access to digital models of the digital engineering platform through deployment of idempotency tokens. The idempotency token system 1302 is managed between the job service in the enclave 1402 and the customer client 1406. The activity logging and analysis 1304 is done in the logging service cell in 1402. The load assessment 1306 is done based on individual tasks performed by agents on the exclave, reflected in NFITs and aggregated using FITs in the enclave 1402. The cost and carbon metrics assessment 1308 and user value attribution steps 1310 are computed using agents on the exclave and aggregated in the enclave. Security and compliance assessment 1314 is performed by the Control Plane service cell and the API gateway in 1402.

Referring now to FIG. 14A, an example architecture for a digital engineering (DE) platform 1400 (such as the interconnected digital engineering and certification ecosystem 100) is shown. The example architecture for the digital engineering platform 1400 is designed in accordance with zero trust security principles and is further designed to support scalability as well as robust and resilient operations.

In some implementations, the DE platform 1400 can utilize FITs and NFITs to enable secure, idempotent, and zero-knowledge data operations. In further detail, the DE platform 1400 can utilize these tokens, e.g., FITs and NFITs, to ensure sensitive data to be processed by enclaves in a zero-trust environment without exposing the actual data, adhering to the zero-knowledge principle.

In one embodiment, the architecture of the digital engineering platform 1400 includes multiple components: a digital engineering (DE) platform enclave 1402, cloud services 1404, and a customer environment 1410. The customer environment 1410 optionally includes a DE platform exclave 1416.

The DE platform enclave 1402 can serve as a starting point for the services rendered by the platform 1400. The enclave 1402 can be visualized as the central command hub responsible for the management and functioning of the operations. For example, the enclave 1402 can be implemented using the computer system 108 of the interconnected digital engineering and certification ecosystem 100 described above. The DE platform enclave 1402 serves as the centralized command and control hub responsible for orchestrating and managing all platform operations. It is designed to integrate both zero-trust security models and hyperscale capabilities, resulting in a secure and scalable processing environment tailored to individual customer needs. Zero-trust security features include, but are not limited to, strict access control, algorithmic impartiality, and data isolation. The enclave 1402 also supports a machine learning engine (e.g., the machine learning engine 120) for real-time analytics, auto-scaling features for workload adaptability, and API-based interoperability with third-party services. Security and resource optimization are enhanced through multi-tenancy support, role-based access control, and data encryption both at rest and in transit. The digital engineering platform enclave 1402 can also include one or more of the features described below.

First, the digital engineering platform enclave 1402 can be designed in accordance with zero-trust security principles. In particular, the DE platform enclave 1402 employs zero-trust principles to ensure that no implicit trust is assumed between any elements, such as digital models, platform agents or individual users (e.g., users 104A, 104B) or their actions, within the system. The model is further strengthened through strict access control mechanisms, limiting even the administrative team (e.g., a team of individuals associated with the platform provider) to predetermined, restricted access to enclave resources. To augment this robust security stance, data encryption is applied both at rest and in transit, effectively mitigating risks of unauthorized access and data breaches.

The DE platform enclave 1402 can also be designed to maintain isolation and independence. A key aspect of the enclave's architecture is its focus on impartiality and isolation. The enclave 1402 disallows cryptographic dependencies from external enclaves and enforces strong isolation policies. The enclave's design also allows for both single-tenant and multi-tenant configurations, further strengthening data and process isolation between customers 1406 (e.g., users 104A, 104B). Additionally, the enclave 1402 is designed with decoupled resource sets, minimizing interdependencies, and thereby promoting system efficiency and autonomy.

In some implementations, the customers 1406 or the agents of the DE platform enclave 1402 can generate the idempotent tokens. The idempotent tokens can be generated by clients when the client need processing of sensitive data securely. In some cases, the FITs are created when the request can be fulfilled by any agent or service or network. FITS include, for example, a cryptographic signature and timestamp for idempotency and can be processed by multiple agents, providing fungibility. An example of an FIT associated with a job request will be for "Uploading a file" such that the FIT can be handed off to an agent to upload appropriately within a customer data storage location assigned by the agent. In some cases, the NFITs are created when a request is tied to a specific agent or service or network. NFITS can include a timestamp for creation data but have processing constraints that ensure only the designated agent within a designated network can manage the request, enforcing non-fungibility.

In some implementations, after the DE platform enclave 1402 creates the idempotent tokens, the DE platform enclave 16 issues the idempotent tokens to the client. The client can provide the idempotent tokens in subsequent requests to the enclave or services. For example, FITs are used for tasks that can be distributed across multiple agents, while NFITs are restricted to specific agents.

When a client submits an idempotent token, the DE platform enclave 1402 orchestrates the processing of sensitive data using the token's metadata. The metadata can include the token ID, the timestamp, and other information. The enclave does not access the actual data but uses the metadata to determine how and where the request should be processed. For FITs, the enclave distributes the request to any available agent, or available network, allowing for flexible, distributed processing. For NFITs, the enclave ensures that the designated agent only processes the request, within a designated network, maintaining non-fungibility.

Before any request is processed, the DE platform enclave 1402 validates the token by performing various operations. For example, the DE platform enclave 1402 verifies the cryptographic signature and checks the timestamp to ensure the token is valid and has expired or been replayed. Moreover, the DE platform enclave 1402 can ensure idempotency by using the timestamp, metadata, and other information from the NFITs and/or FITs to prevent duplicate requests from being processed more than once, even if retransmitted.

In some implementations, each of the idempotent tokens can expire and require renewal. Tokens are time-bound and expire once the request is processed or after a defined period. The DE platform enclave 1402 can track expired or revoked tokens to prevent further usage. If needed, the clients are responsible for renewing long-lived tokens by generating a new one and submitting it with the updated request.

The DE platform enclave 1402 can further be designed for scalability and adaptability. The enclave 1402 is engineered to be both scalable and adaptable, aligning well with varying operational requirements. For example, the enclave 1402 can incorporate hyperscale-like properties in conjunction with zero-trust principles to enable scalable growth and manage high-performance workloads effectively.

The DE platform enclave 1402 can further be designed for workflow adaptability, accommodated through strict access control mechanisms. The DE platform enclave 1402 is designed to accommodate varying customer workflows and DE models through its strict access control mechanisms. This configurability allows for a modular approach to integrating different functionalities, ranging from data ingestion to algorithm execution, without compromising on the zero-trust security posture. The platform 1400's adaptability makes the platform 1400 highly versatile for a multitude of use-cases, while ensuring consistent performance and robust security.

The DE platform enclave 1402 can further be designed to enable analytics for robust platform operations. At the core of the enclave's operational efficiency is a machine learning engine (e.g., machine learning engine 120) capable of performing real-time analytics. This enhances decision-making and operational efficiency across the platform 1400. Autoscaling mechanisms can also be included to enable dynamic resource allocation based on workload demand, further adding to the platform's responsiveness and efficiency.

In an example implementation, the DE platform enclave 1402 can include several components as shown in FIG. 14A and as described in further detail herein.

In the embodiment of the DE platform enclave 1402 shown in FIG. 14A, the DE platform enclave 1402 includes a "Monitoring Service" and a "Telemetry Service" as part of a "Monitoring Service Cell." These components focus on maintaining, tracking, and analyzing the performance of the platform 1400 to ensure optimal service delivery, including advanced machine learning capabilities for real-time analytics.

In the embodiment of the DE platform enclave 1402 shown in FIG. 14A, the DE platform enclave 1402 also includes a "Static Assets Service Cell," which houses the user interface, SDKs, command line interface (CLI), and documentation for the platform 1400.

In the embodiment of the DE platform enclave 1402 shown in FIG. 14A, the DE platform enclave 1402 further includes an "API Gateway Service Cell," which includes the DE platform API(s) (e.g., APIs 114, 116) and acts as a mediator for requests between the client applications (e.g., the digital engineering tools 102, the repository of common V&V products 110, etc.) and the platform services.

In the embodiment of the DE platform enclave 1402 shown in FIG. 14A, the DE platform enclave 1402 further includes a "Search Service Cell." This component aids in the efficient retrieval of information from the DE platform 1400, adding to its overall functionality.

In the embodiment of the DE platform enclave 1402 shown in FIG. 14A, the DE platform enclave 1402 further includes a "Logging Service Cell" and a "Control Plane Service Cell." These components are instrumental in recording and managing operational events and information flow within the platform 1400. In various embodiments, the Control Plane Service Cell includes a Jobs Service and a File service component.

As shown in FIG. 14A, the architecture of the digital engineering platform 1400 also includes cloud services 1404 that include services that cannot interact with customer data but can modify the software for the orchestration of digital engineering platform operations. In example implementations, several cloud resources provide support and foundational services to the platform. For example, in the embodiment of the DE platform 1400 shown in FIG. 14A, the cloud services 1404 include a "Customer IAM Service," where "IAM" stands for "Identity and Access Management." The Identity and Access Management Service ensures secure and controlled access to the platform 1400.

In the embodiment of the DE platform 1400 shown in FIG. 14A, the cloud services 1404 also include a "Test Service," which involves testing tools to validate platform operations.

In the embodiment of the DE platform 1400 shown in FIG. 14A, the cloud services 1404 also include an "Orchestration Service," which controls and manages the lifecycle of containers on the platform 1400.

In the embodiment of the DE platform 1400 shown in FIG. 14A, the cloud services 1404 also include an "Artifact Service" and "Version Control and Build Services." These cloud services are crucial in maintaining the evolution of projects, codes, and instances in the system, while also managing artifacts produced during the product development process.

As shown in FIG. 14A, the architecture of the digital engineering platform 1400 also includes a customer environment 1410 with an "Authoritative Source of Truth" 1412, customer tools 1414, and an optional DE platform exclave 1416. The customer environment 1410 is the site where customer data resides and is processed in a zero-trust manner by the digital engineering platform 1400. As described previously, the DE platform enclave 1402, in focusing on both zero trust principles and hyperscale-like properties, provides a robust and scalable environment for the secure processing of significant workloads, according to the customer's unique needs. In some examples, a DE platform exclave 1416, is situated within the customer environment 1410 in order to assist the customer(s) 1406 with their digital engineering tasks and operations.

When a customer 1406 (e.g., user 104A, 104B) intends to perform a digital engineering task using the digital engineering platform 1400 (e.g., interconnected digital engineering and certification ecosystem 100), typical operations include secure data ingestion and controlled data retrieval. Derivative data generated through the digital engineering operations, such as updated digital model files or revisions to digital model parameters, are stored only within the customer environment 1410, and the digital engineering platform 1400 may provide tools to access the metadata of the derivative data. Example implementations may include secure data ingestion, which utilizes zero-trust principles to ensure customer data is securely uploaded to the customer environment 1410 through a pre-validated secure tunnel, such as Secure Socket Layer (SSL) tunnel. This can enable direct and secure file transfer to a designated cloud storage, such as an S3 bucket, within the customer environment 1410. Example implementations may also include controlled data retrieval, in which temporary, pre-authenticated URLs generated via secure token-based mechanisms are used for controlled data access, thereby minimizing the risk of unauthorized interactions. Example implementations may also include immutable derivative data, with transformed data generated through operations like data extraction being securely stored within the customer environment 1410 while adhering to zero-trust security protocols. Example implementations may also include tokenization utility, in which a specialized Digital Engineering (DE) platform tool referred to as a "tokenizer" is deployed within the customer environment 1410 for secure management of derivative metadata, conforming to zero-trust guidelines.

The customer environment 1410 interacts with other elements of the secure digital engineering (DE) platform 1400 and includes multiple features that manage data storage and secure interactions with the platform 1400. For example, one element of the customer environment 1410 is the "Authoritative Source of Truth" 1412, which is a principal repository for customer data, ensuring data integrity and accuracy. Nested within this are the "Customer Buckets" where data is securely stored with strict access controls, limiting data access to authorized users or processes through pre-authenticated URL links. This setup ensures uncompromising data security within the customer environment 1410 while providing smooth interaction with other elements of the DE platform 1400.

The customer environment 1410 also includes additional software tools (e.g., customer tools 1414) that can be utilized based on specific customer requirements. For example, the "DE Tool Host" is a component that manages the necessary data engineering applications for collaborating with customer data. It includes the DET CLI (Data Engineering Tools Command-Line Interface), enabling user-friendly command-line operation of DE tools (e.g., the digital engineering tools 102). The "DE platform Agent" ensures smooth communication and management between the customer environment 1410 and elements of the DE platform 1400. Furthermore, there can be another set of optional DE tools designed to assist customer-specific data engineering workflows.

In some cases, an optional feature known as a "DE Platform Exclave" 1416 can be employed within the customer environment 1410 for enhanced security. The DE Platform Exclave 1416 operates within the customer's network, supervising data processing, and rigorously adhering to zero trust principles while delivering hyperscale-like platform performance. The DE Platform Exclave 1416 contains a "DE Tool Host" that runs the DE tools and the agent necessary for operation.

In some implementations, a client, e.g., customer 1406, may desire a job to be sensitive so the enclave is not aware of the requested job. In such cases, the digital platform can tokenize the job itself by calculating a hash of the job data structure. This calculated hash is used as the file name, and the data structure is written to a data storage bucket that the enclave does not have read access. The enclave knows how to tell the agent where to get the job in the bucket, e.g., using an address pointer, without being able to see the contents of the bucket. The fungible token from the enclave in this case includes an address location for the agent to then access within the customer data storage, unencrypt the job description and then issue appropriate NFIT tokens to perform the various data operations as necessary for the job requested. Upon completion of the various steps, the agent may message back to the enclave on the status, e.g., a success or not, of the requested job without any additional information. This example is a stricter version of zero knowledge implementation that ensures that the enclave does not know any details about the job and relies on the agent to appropriately assign the work.

As an example, in a non-zero knowledge implementation, the digital platform, e.g., DE platform 1400 can be configured to aggregate metrics for a request to be performed by the digital through the FITs. The FITs can be configured to track bandwidth, usage, etc., of one or more computer processors to execute the request, using timestamps from logs of the computer processors to measure computational demand. The timestamp can correspond to different tasks and/or subtasks being performed, and the digital platform can determine a corresponding amount of carbon emissions associated with fulfilling the request, thereby providing a measure of avoided emissions. In a non-zero knowledge implementation, the FITs can have access to sensitive data and can be configured to generate metrics related to the work being requested for performance on the data platform, including an aggregate total amount of work.

As another example, in a zero knowledge implementation, a number of FITs can be configured to aggregate metrics related to a request for work to be performed by the digital platform, e.g., DE platform 1400. A number of NFITs (which need not be the same number as the number of FITs) can be configured to track computational demand (e.g., amount of computer memory, usage, or any other type of computing resource) to perform individual tasks and/or subtasks to fulfill the request without direct access to data for fulfilling the request. The request can be sent to the data plane, e.g., as described in reference to FIG. 9 above, where the digital platform can generate tasks or subtasks for performing the request and configure the NFITs to perform tracking of each individual task or subtask. Examples of metrics can include a number of API calls, an amount of time for processing in the data plane, etc. These metrics can be captured by the NFIT and transmitted to the FITs to report a status (e.g., success, failure, missing data) or submetric (e.g., amount of computing bandwidth, processing power) for a respective task or subtask. In a zero knowledge implementation, the FITs can be configured to track the amount of work requested on the digital platform, without access to sensitive data, while their corresponding NFITs can be configured to track the amount of work performed by the digital platform where they may access sensitive data, generate reporting information representative of the amount of work, and transmit the reporting information to the FIT.

Figure 14B:
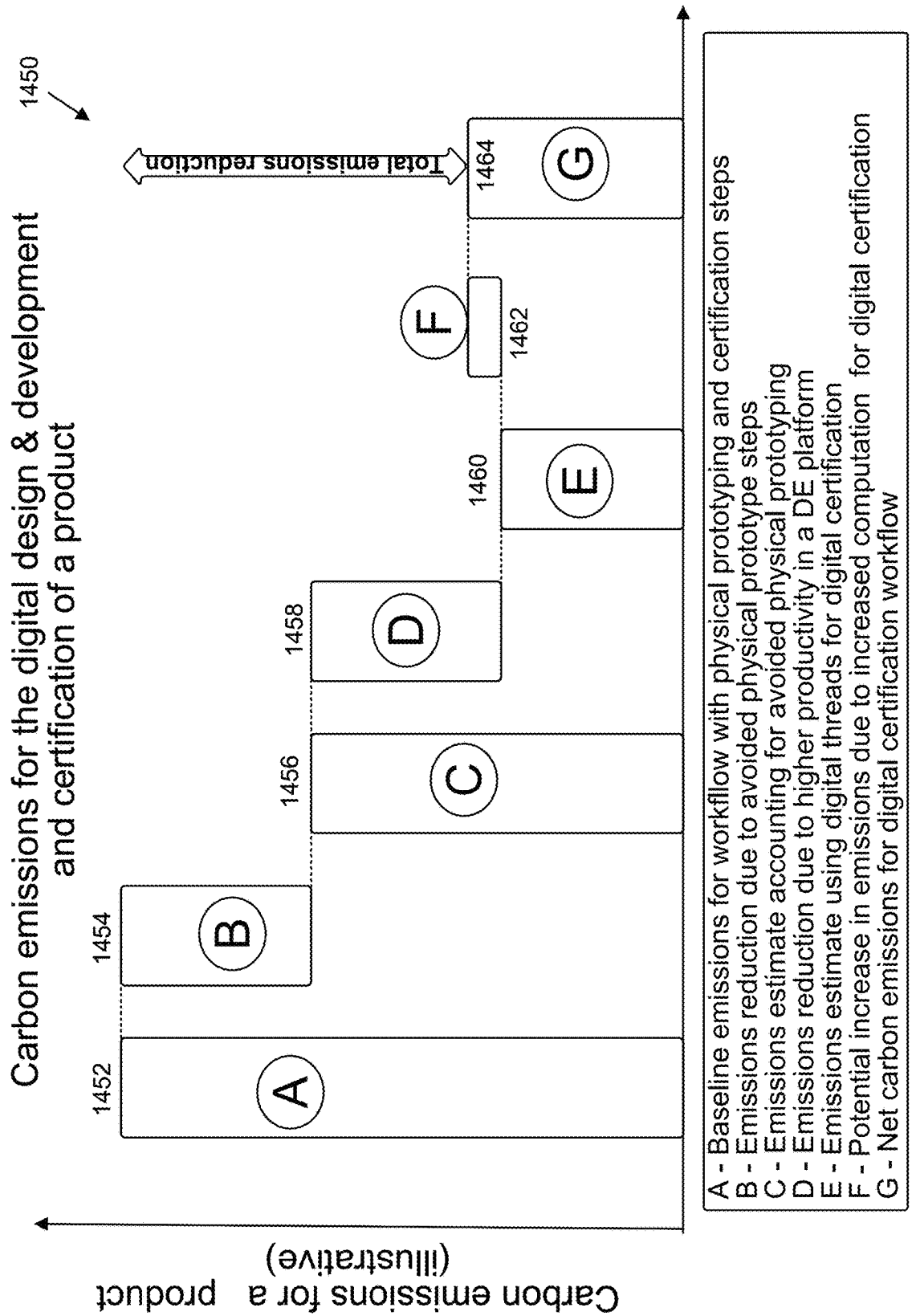
FIG. 14B is a waterfall diagram depicting an example of carbon emissions reduced through development and certification processes of the digital engineering platform.

FIG. 14B is a waterfall diagram 1450 depicting an example of carbon emissions reduced through development and certification processes of the digital engineering platform. Amounts of carbon emitted, reduced, etc. can be measured by any appropriate scale, e.g., metric tons of carbon dioxide equivalent (MTCO2e). In some cases, the amount of emissions can include a quantification of greenhouse gas emissions, e.g., other types of greenhouse gasses.

The waterfall diagram 1450 illustrates a number of columns indicating carbon emissions for developing and securely certifying a product, e.g., through physical prototypes and/or through the digital engineering platform. A baseline column 1452 (indicated by the letter "A" in FIG. 14B) illustrates an amount of carbon emissions for executing a workflow through a physical prototype, e.g., including certification steps. In some implementations, the amount of carbon emitted represented by the baseline column 1452 can be determined by performing a baseline assessment of the workflow using physical prototyping/certification. In some implementations, a baseline value for emitted carbon can be provided to the digital engineering platform by external data sources.

A graphical column 1454 (indicated by the letter "B" in FIG. 14B) illustrates an amount of carbon emissions reduced from avoiding the utilization of physical prototypes to develop and certify an engineering product by instead utilizing digital threads in the digital engineering platform. A graphical column 1456 (indicated by the letter "C" in FIG. 14B) illustrates an amount of carbon emissions generated by utilizing the digital engineering platform, e.g., the result of applying a reduction of carbon emissions from graphical column 1454 to the baseline column 1452. For example, the baseline column 1452 depicted in FIG. 14B can indicate 100 MTCO2e to perform workflows using physical prototyping. The digital engineering platform can efficiently perform the world flows in an integrated digital environment leveraging the token management system, among other systems and operations described in reference to FIG. 13 above. Thus, the same workflow that emits 100 MTCO2e illustrated by baseline column 1452 can be performed by the digital engineering platform and the amount of carbon reduced, e.g., 30 MTCO2e, can be illustrated by graphical column 1454. In this example, the resulting carbon footprint of the digital engineering platform is depicted by graphical column 1456, e.g., 70 MTCO2e resulting from 100 MTCO2e with 30 MTCO2e of savings provided by the digital engineering platform.

The improvements in computational efficiency and scheduling of tasks for workflows in the digital engineering platform can also reduce carbon emissions, depicted by graphical column 1458 (indicated by the letter "D" in FIG. 14B). For example, the digital engineering platform can schedule tasks in workflows to ensure computing equipment and digital processors do not idle and passively consume power. Thus, the net emissions from applying computational and scheduling efficiencies of workflow tasks in a digital environment can be illustrated by applying reductions from graphical column 1458 to the carbon emissions represented by graphical column 1458, resulting in graphical column 1460 (indicated by the letter "E" in FIG. 14B). Furthermore, improvements in utilizing digital threads for certification of a product in the digital environment can also reduce carbon emissions, depicted by graphical column 1460. For example, the digital engineering platform can schedule tasks in workflows to ensure computing equipment and digital processors do not idle and passively consume power. In some implementations, the application of AI-based techniques (as described in reference to FIG. 6) can improve workflow efficiencies, thereby further reducing carbon emissions from the digital engineering platform.

In some implementations, the digital engineering platform tracks and identifies an increase of carbon emissions from tasks performed in the integrated digital engineering platform environment. The graphical column 1462 (indicated by the letter "F" in FIG. 14B) illustrates a small increase in carbon emissions (e.g., relative to carbon reductions depicted by graphical columns 1454 and 1458), which could potentially occur from excess demand placed through additional analyses and iterations on the digital engineering platform. The graphical column 1464 (indicated by the letter "G" in FIG. 14B) illustrates the total emission reduction resulting from the digital engineering platform to perform development and certification of system products, e.g., compared to the baseline column 1452 that utilizes physical prototyping. Digital certification can be applied to certification tasks that are typically performed by physical prototyping to further reduce carbon emissions. The digital certification of a system product results in reduced carbon emissions by utilizing a digital engineering platform to perform the certification digitally. As an example, tokens issued by the token management system reduced computational loads by minimizing extraneous or duplicative tasks in the digital thread, therefore resulting in reduced carbon emissions.

In some implementations, reduced carbon emissions resulting from digitization of product development and certification through the digital engineering platform can be stored as carbon offset for future issuance, e.g., as a tradeable carbon credit. For example, the digital platform utilizes idempotency tokens to track the amount of carbon emissions from executing an operation, and/or an amount of carbon emissions reduced by performing the operation in the digital platform. The digital engineering platform utilizes data collected through the idempotency token, which can therefore provide verification and validation of carbon emissions in the digital platform, e.g., because the operational time is being accurately measured. The verified cost value of carbon emissions from the idempotency token can then be reported to one or more client devices communicatively coupled to the digital platform.

A standardized method for carbon emissions accounting in the interconnected digital engineering and certification ecosystem offers dual benefits: accuracy and regulatory compliance. By providing a uniform approach to measuring greenhouse gas (GHG) emissions, or carbon emissions, across different digital engineering processes, the DE platform's architecture for quantifying emission savings ensures consistency and accuracy. Global reporting standards for GHG emissions have emphasized Monitoring, Reporting and Verifying carbon emissions, the MRV regime. Recently, the transition to the Enhanced Transparency Framework (ETF) under the Paris Climate Agreement also increases the scope and depth of carbon reporting, making robust Monitoring, Reporting, and Verification (MRV) systems essential. The proposed standardized method for digital certification not only meets international standards but also enhances the credibility and transparency of a project's carbon data.

On the user end, standardization directly encourages energy-efficient and sustainable practices. Lifecycle carbon accounting during a digital engineering and certification process allows for clearer decision-making in the design stage. This enables the selection of materials and technologies with lower carbon footprints, thereby contributing to sustainability and global efforts to mitigate climate change.

Figure 15:
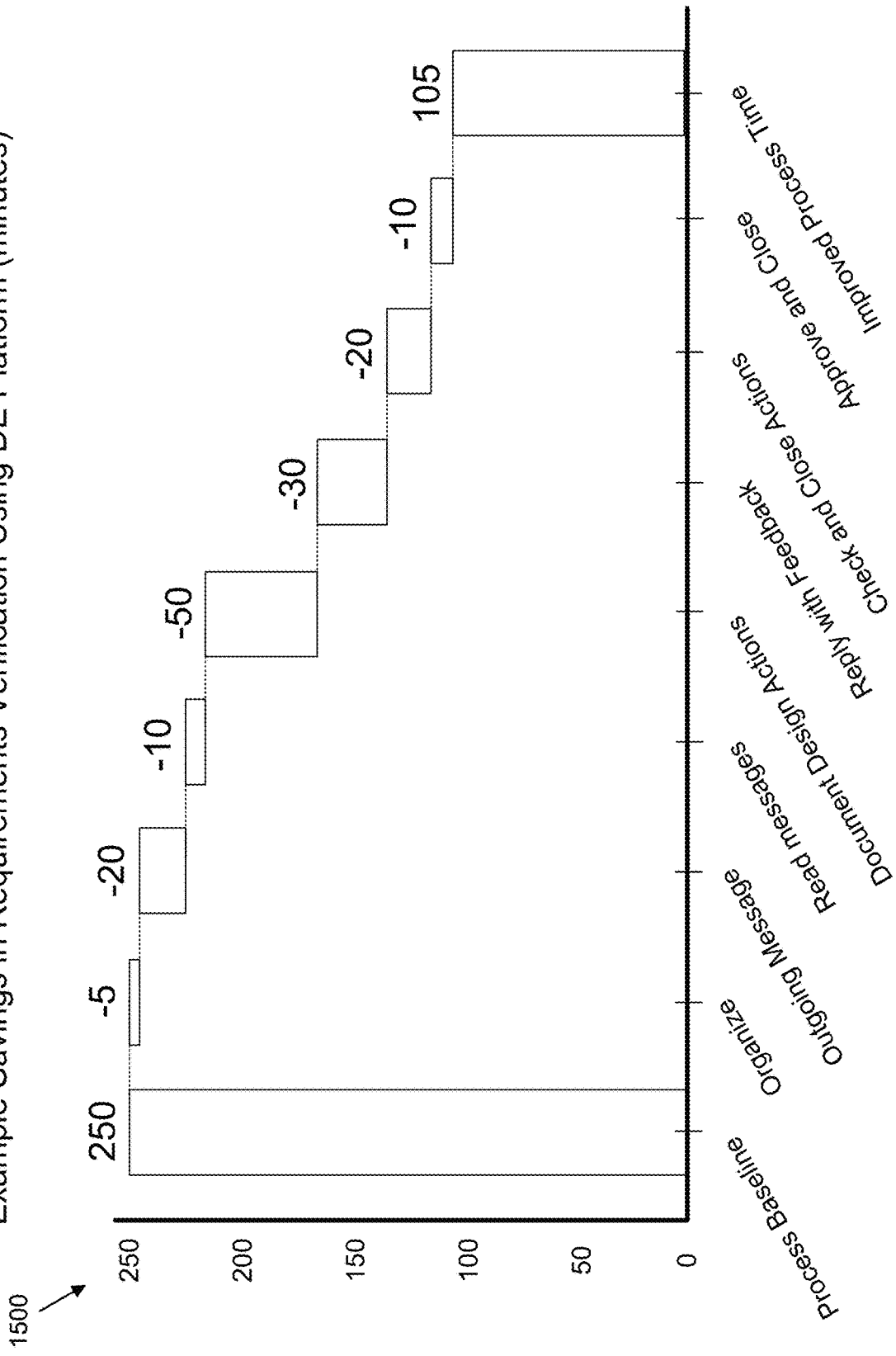
FIG. 15 is a graph illustrating example time savings estimates from the digital engineering platform.

FIG. 15 is a graph 1500 illustrating example time savings estimates from the digital engineering platform. The graph 1500 illustrates estimations for computational savings from performing workflows in a digital engineering platform instead of physical prototyping. For example, different task categories are depicted along the x-axis of the graph 1500 while the y-axis illustrates a computational load or load savings. For example, graph 1500 illustrates that a baseline value for performing the process can have a computational processing time of 250 minutes. The digital engineering platform can provide workflow efficiencies for different tasks, such as organizing inputs, conducting document design actions, providing feedback to actions in the design document, and approving/closing the action. As an example, the digital engineering platform can determine a computational savings of 50 minutes of processing time by utilizing the digital engineering platform in contrast to a physical prototype for the same workflow. Thus, the certification and development of each type of task in the workflow can achieve varying amounts of computational load savings, each corresponding to an amount of carbon emissions reduced by utilizing the digital engineering platform.

To achieve computational savings, the digital engineering platform leverages the idempotency tokens (e.g., fungible and non-fungible) to quantify an amount of time to perform a task associated with the token. Individual actions performed in the digital engineering platform can be tracked by the tokens, which can also be configured to log and analyze data. The digital engineering platform utilizes digital threads to perform digital certification of design products, e.g., by mapping individual steps of the workflow. The digital engineering platform can identify portions of the workflow performed by physical prototyping that can be replaced by the digital threads.

The digital engineering platform can also generate computational savings and reductions in carbon emissions by preemptively rectifying design issues before the design issues propagate downstream to other tasks in a design workflow, e.g., reducing iterations for designing a system. The digital engineering platform also improves efficiency of performing tasks by leveraging artificial intelligence techniques, analytics engines, and machine learning engines to improve execution time and accuracy of workflows during the design and certification process. As another example, the digital engineering platform expedites workflow and reduces computational time by minimizing the number of times a tool/model ports between different levels of a design process.

In some implementations, the digital engineering platform is configured to track computational costs and/or carbon emissions associated with the execution of inference and training tasks for a machine learning model. For example, the platform can be configured to monitor, e.g., using a token, the consumption of computational resources such as memory, storage, electricity, energy, server-time, etc., for performing inference and/or training tasks of a machine learning model, e.g., a digital model. The computation cost of a machine learning model can be based on model size, complexity, iterations, etc. As another example, costs for training tasks can include power consumption, e.g., from computing hardware such as GPUs. The digital platform can be configured to monitor metrics such as CPU/GPU usage, memory consumption, bandwidth, execution time, etc., for the machine learning tasks. The digital platform can continually update the estimates for cost of the machine learning tasks and generate recommendations to reduce complexity while maintaining model accuracy, by identifying redundant model parameters, features, nodes, and other model components.

The digital model platform enables specific and granular assessment of the carbon impact of AI model operations by linking these processes to duration, workload, and emissions estimates. Traditional environmental impact assessments of AI models are often outdated or averaged across various tasks. Owing to the evolving complexity and performance of both large and small AI models, there is a pressing need in the industry for specific and granular assessment of AI models. The digital model platform addresses this issue by providing granular estimates for individual tasks as well as aggregated sets of tasks, ensuring precise and up-to-date data. In various examples, the digital platform provides consistent trusted data use inputs to AI models, allowing for consistent assessment of AI models on the same datasets. In other examples, the platform supports providing a time series of performance monitoring of AI models by monitoring their efficiency over time, identifying opportunities to reduce computational costs and emissions. In other examples, the platform also utilizes fungible and non-fungible tokens to track and manage the application of multiple AI models to the same input, allowing for direct comparison of their operational performance and environmental impact. This tokenized tracking ensures reliable emissions estimates, while the platform's option for trusted data use ensures secure and verifiable AI model operations.

The digital platform allows for tracking and certification of carbon emissions and other costs (e.g., consumption of computing resources) associated with digital operations, while also comparing these metrics against baselines including historical metrics or corresponding baselines for their physical counterparts. During a digital operation, the platform tracks computational loads, energy consumption, and associated carbon emissions, referencing a baseline for the same task performed historically or physically. The baseline includes energy use, costs, and carbon emission profiles from historical examples, physical prototypes and testing. The platform digitally certifies the emissions and saves this data, creating a historical record for future reference. This allows future similar operations to leverage historical savings and trends, supporting efficiency gains. Additionally, the platform provides options for generating reports on savings and benchmarking operational performance, enabling users to assess trends and improvements over time. The use of idempotency tokens ensures reliable task execution, preventing duplicate tasks, optimizing resource utilization, and minimizing computational costs. AI-driven techniques and cost-efficient routing are applied to expedite workflows and reduce carbon footprints. This system provides verifiable tracking and savings estimates, offering a consistent methodology for benchmarking operational efficiency and avoided emissions.

Figure 16:
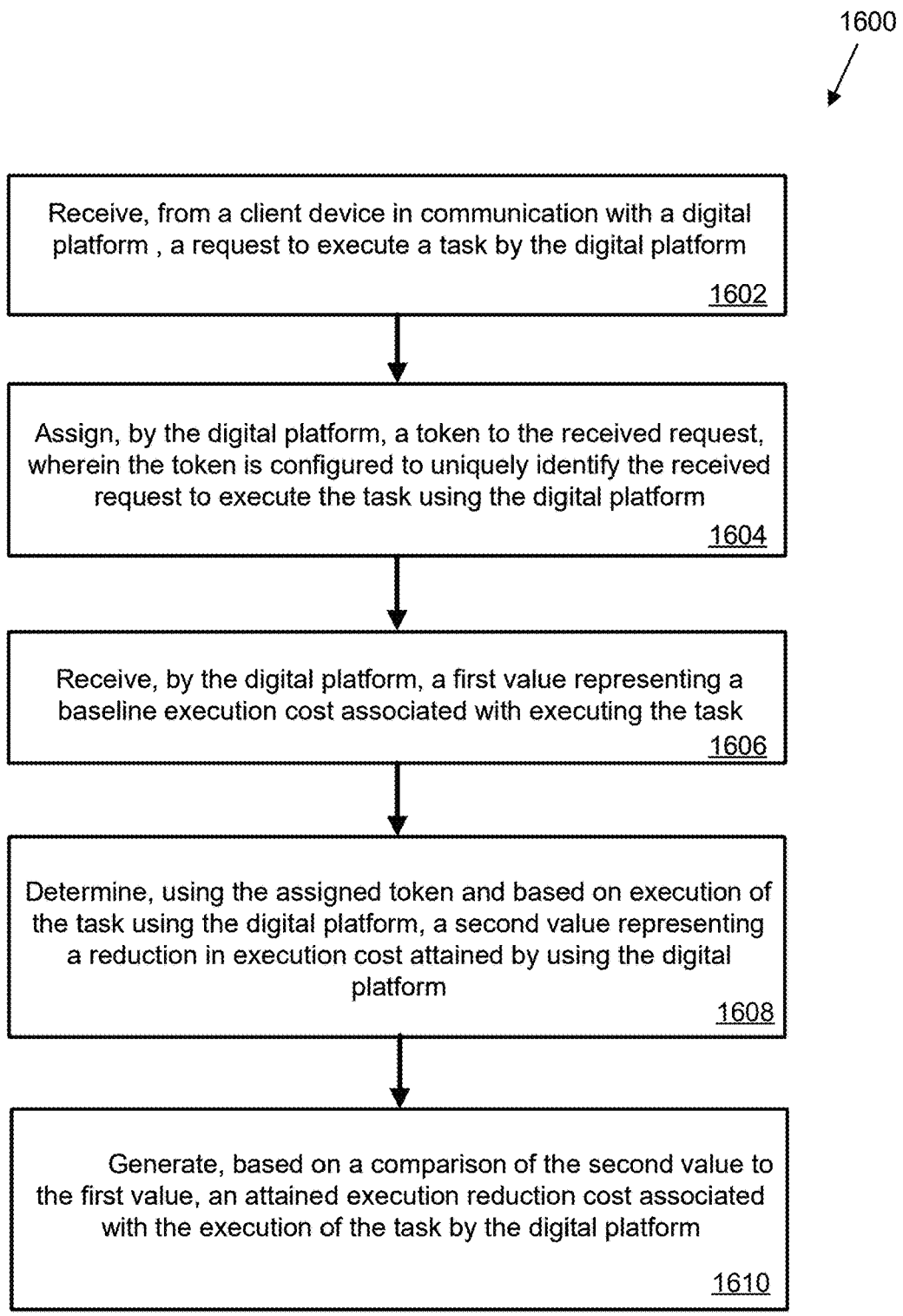
FIG. 16 is a data flow for estimating carbon emissions.

FIG. 16 is an example process 1600 for estimating carbon emissions using an idempotency token. The process 1600 can be executed by a computing system (e.g., computing system 108) of an interconnected digital engineering and certification ecosystem (e.g., the ecosystem 100).

The process 1600 includes receiving, from a client device in communication with a digital platform, a request to execute a task by the digital platform (1602). The client device can be communicatively coupled, e.g., in communication with, to the digital platform. In some implementations, the request can include multiple tasks to be executed by the digital platform, including by digital models of the digital platform. In some implementations, the process 1600 includes generating a digital thread that includes one or more connected modules (e.g., a plurality of connected modules) to execute the task from the request. Modules of the digital thread can include intra-module connections, e.g., connections between two or more components of the same model.

In some implementations, the task is one or more of (i) an inference task, or (ii) a training task, of a digital model. The digital platform can be configured to monitor execution of the task for a period of time. The digital model can be one or more of (i) a machine learning model, or (ii) a model configured to apply artificial intelligence techniques, e.g., to minimize redundant operations for executing a task.

The process 1600 includes assigning, by the digital platform, a token to the receive request (1604). The token is configured to uniquely identify the received request to execute the task using the digital platform. In some implementations, the token is an idempotency token (e.g., an NFIT, an FIT) configured to identify one or more tasks each having an operation common to an operation of the task for the received request.

The process 1600 includes receiving, by the digital platform, a first value representing a baseline execution cost associated with executing the task (1606). In some cases, the digital platform is configured to determine the baseline execution cost associated with executing the task, e.g., on a computing device, by obtaining data related to execution of the task and determining the execution cost, e.g., using a token to monitor operations for the task being performed. In some cases, the digital platform can be configured to determine a baseline cost by receiving the value from a server. In some cases, the digital platform can compute a first value of a baseline cost for executing the task without applying the token to reduce redundant operations in the task, and/or across multiple tasks, and generate a second value for a reduced execution cost from applying the token to identify and avoid the redundant operations for executing the task, e.g., to reduce consumption of power, storage, memory, and other types of resources for the task.

The process 1600 includes determining, using the assigned token and based on execution of the task using the digital platform, a second value representing a reduction in execution cost attained by using the digital platform (1608). In some implementations, the token that uniquely identifies the received request can include a unique identifier for monitoring the task by the digital platform. In some implementations, the token is configured to collect data related to one or both of (i) the update to the module, or (ii) the cost impact to the one or more other modules. The token can also be configured to determine, based on the collected data, a third value representing an additional reduction in execution cost attained by using the digital platform.

In some implementations, the process 1600 includes the digital platform being configured to utilize an engine configured to determine a cost associated with performing a workflow by the digital platform. Determining the cost comprises applying at least one of (i) machine learning or (ii) artificial intelligence techniques, to data related to the execution of the task collected by the token.

The process 1600 includes generating, based on a comparison of the second value to the first value, an attained execution reduction cost associated with the execution of the task by the digital platform (1610). In some implementations, the process 1600 includes monitoring, by the digital platform, an update to a module from the plurality of connected modules of the digital thread and determining, based on the update to the module, a cost impact, e.g., an execution cost, to one or more other modules from the plurality of connected modules of the digital thread. In some implementations, the attained execution reduction cost is (i) a computational processing cost, or (ii) an amount of carbon emissions reduced.

In some implementations, the process 1600 include identifying one or more tasks each having an operation in common to an operation of the task for the received request, and executing, by the digital platform, the operation of the identified one or more tasks that is common to the operation of the task for the received request to reduce execution redundancy by the digital platform. In some implementations, the process 1600 includes determining the second value representing the reduced execution cost attained by using the digital platform based on the execution of the operation of the identified one or more tasks that is common to the operations of the task for the received request.

In some implementations, the process 1600 includes generating, using the digital platform and for a plurality of tasks, a plurality of values corresponding to the plurality of tasks. Each of the plurality of values represents an attained execution reduction cost associated with the execution by the digital platform of the respective task from the plurality of tasks.

In some implementations, the process 1600 includes generating, based on the attained execution reduction cost associated with the execution of the task by the digital platform, a certified carbon credit, and providing the certified carbon credit to a computing device in communication with the digital platform.

In some implementations, the process 1600 includes selecting a set of tools for executing the task on the digital platform in response to receiving the request to execute the operation. The process 1600 can include generating a set of tokens for the execution of the task on the digital platform, each token in the set of tokens including data that identifies the selected tool for the set of tools. The process 1600 can include associating the token for the received request to the set of tokens for the execution of the task using the digital platform and determining, by the set of tokens, an amount of carbon emissions associated with the execution of the task on the digital platform. For example, values such as the first value representing a baseline execution cost associated with executing the task and/or the second value representing a reduction in execution cost attained by using the digital platform, can be an amount of carbon emissions.

In some implementations the set of tokens generated can include tokens, e.g., idempotency tokens. Each token of the set of tokens can include data that identifies the selected tool for the set of tools. The process 1600 can include associating data that uniquely identifies the request to the set of tokens for the execution of the task on the digital platform, e.g., by one or more digital models. The process 1600 can include determining, by the set of tokens and using the digital platform, an amount of carbon emissions associated with the execution of the task on the digital platform. In some implementations, selecting the tool for executing the task on the digital platform includes identifying a set of tools from a tools database.

The process 1600 includes the digital platform identifying, from a tools database, a set of tools. The process 1600 includes the digital platform identifying, for each tool in the set of tools, an execution cost associated with performing the execution of the operation on the digital model with the tool. The execution cost can be at least one of (i) an amount of carbon emissions, or (ii) a computational load of the digital platform. In some implementations, the digital platform selects the tool from the set of tools whose cost, e.g., execution cost, associated with performing the execution of the task by the digital platform satisfies a threshold value. For example, the selected tool can have an associated cost that is below a threshold amount of carbon emissions, a threshold amount of computational load, or some combination thereof.

In some implementations, the token can be used by the digital platform to track and monitor data related to executing the task by the digital platform. In some implementations, the token includes a unique identifier, timestamp data related to operations for performing the task, among other types of data related to the task. For example, the digital platform can generate a timestamp for the token, e.g., idempotency token, as a data field of the token, and additional data fields can be updated by the digital platform with additional timestamps as the token tracks operation of the task, e.g., in a digital thread, through the digital platform.

In some implementations, the process 1600 can include collecting, by the idempotency token and during execution of the operation by the digital model, data related to the execution of the operation. In some implementations, the digital platform is configured to monitor an update to a module from the plurality of connected modules of the digital thread from the collected data related to the execution of the operation in the digital platform. In some implementations, the digital platform is configured to determine an impact to one or more other modules from the plurality of connected modules of the digital thread, based on the update to the module.

In some implementations, the process 1600 includes determining, based on data related to the execution of the operation collected by an token, e.g., an idempotency token, a cost associated with the execution of the operation by the digital platform. For example, the cost can include tasks performed by one or more digital models of the digital thread generated for the executed operation. As an example, the cost can be a computational processing load, an amount of carbon emitted, computational time, computational cost, that is associated with the execution of the operation by the digital platform. In some implementations, the idempotency token is configured to collect additional data related to one or both of (i) the update to the module, or (ii) the impact to the one or more modules. The digital platform can be configured to determine, based on the collected additional data, one or both of (i) a second computation processing load, or (ii) a second amount of carbon emitted, by the digital platform based data collected by the token. In some implementations, the digital platform is configured to utilize an engine to determine an execution cost associated with performing a workflow by the digital platform. The engine can determine the cost by applying at least one of (i) machine learning, or (ii) artificial intelligence techniques, to the collected data of the token. For example, the analytics engine can perform predictive analytics to estimate computational loads associated with performing tasks through the digital platform.

As an example, the digital engineering platform can perform multiple tasks in a sequence of tasks to complete an objective, e.g., a systems engineering process. For each task, the idempotency token system creates a virtual representation of the task (e.g., digital task) to be done in the digital engineering platform, assigns the digital task to be performed by models of the digital engineering platforms, confirms the output of the digital tasks, and closes out the task to prevent excess processing beyond the tasks completion. The idempotency tokens (FITs and NFITs) of the digital engineering platform utilize time stamps from the origin of the token. Data from the token, including flags representing correctness of the task tracked by the token and certification/verification of the task, can be tracked as the task is performed in the digital engineering platform. Timing information from the timestamps of the tokens can be utilized to estimate a cost to perform the task on the digital platform, e.g., compared to performing the task using a physical prototype. Tokens can track metadata of the task being performed, thereby providing insight to the digital platform to identify which tasks can be performed efficiently and securely on the digital platform. The identified tasks can be transmitted to users, e.g., by client devices connected to the digital platform. A job of the token can be performed, assigned, released, etc. by the digital platform based on a prioritization scheme, e.g., first-in, first-out (FIFO), but can be independently prioritized by the digital platform. In some cases, functions of the digital engineering platform can include accessing external databases, e.g., to obtain independent assessments of digital computing costs from data centers.

Figure 17:
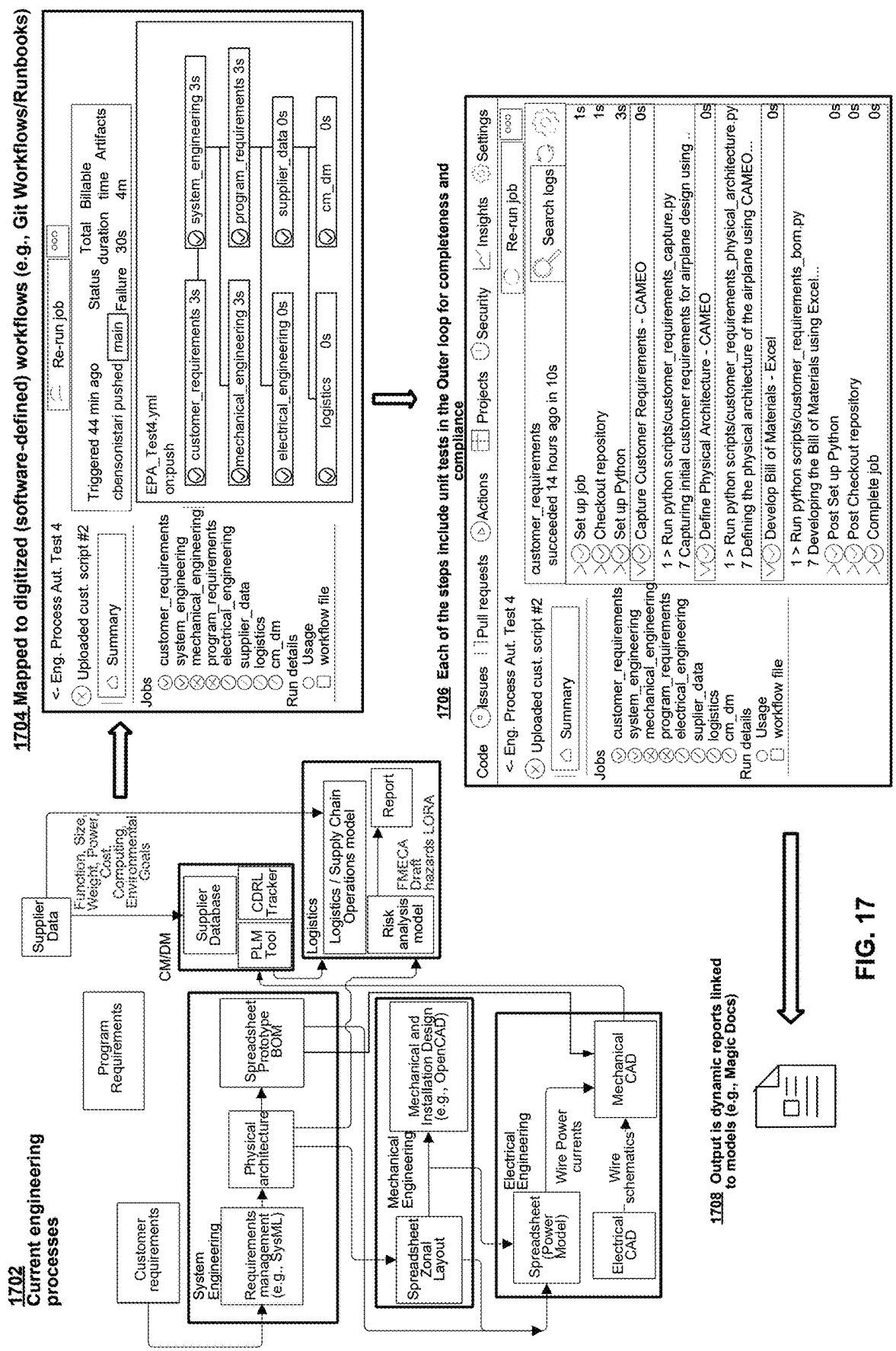
FIG. 17 is an example of a digital engineering process.

FIG. 17 illustrates an exemplary digital engineering process in the aerospace industry, showing outer loop processes, according to one embodiment of the present invention, e.g., converting digital workflows into digital thread scripts in an API-First Manner. The left side of FIG. 17 contains a simplified depiction 1702 of current engineering processes related to a digital engineering operation in the aerospace industry. The digital platform is instrumental in mapping those processes 1704 to digitized (software-defined) workflows. Each process step may be connected to software-defined digital threads (outer loop) using Git Workbooks or Runbooks. The generated workflows may belong to the inner or outer loops, as depicted in FIG. 7C. In some embodiments of the digital platform, the process examples shown in 1702 are described by FIT, and their corresponding digital thread scripts can be described by NFITs, so that the platform is able to aggregate workload related metrics.

For completeness and compliance, the digital platform may further add tests for the key steps and tasks of the digitized workflows in the outer loop 1706. In various embodiments, these tests in the outer loop may also evaluate the workload metrics in the inner loop (e.g. time, bandwidth, number of API calls). These outer-loop threads incorporate built-in feature tests and unit tests, ensuring the digital thread is validated as it is being created. Finally, the scripts for the digital threads are executed, generating outputs that can be presented as dynamic reports, such as magic docs, linked to digital models or data artifacts. The digital platform may hence generate dynamic reports 1708 (e.g., Magic Docs) linked to the inner-loop models used by the digital workflows. A Magic Doc can be composed on the digital platform by bringing various data artifacts, user commentary, and preparing documentation as requested. In various implementations, the digital platform adopts an API-first approach, where digital workflows are structured around secure and modular API integrations. In the digital platform, digital threads link to specific data artifacts through authorized API endpoints in a zero-trust framework, ensuring secure access. Process steps are connected to software-defined workflows using tools like Git Workbooks or Runbooks, with user intent driving both platform and tool-specific API calls. This approach enables seamless integration, modularity, and validation, with built-in feature and unit tests ensuring the reliability of each API interaction throughout the system.

As an example, the digital platform can demonstrate inter-dependent validation tasks across a digital thread for end-to-end workflow validation, in accordance with some embodiments of the present invention. Example of validation tests performed on the digital platform as described in reference to 1706 of FIG. 17. In this example, an aircraft build is checked against regulatory requirements during an airworthiness certification process, facilitated by the interconnected digital platform using unit-test-driven Continuous Compliance (CC). A digital thread or hierarchy of validation jobs that check individual elements, criteria, subsections, and sections of a regulation requirements document. An indicator can be used to show that the pipeline has passed validation.

A digital thread executes interconnected tasks in a zero-trust, zero-knowledge manner. Embodiments of the invention incorporate unit tests or feature tests at each step of the digital thread to ensure compliance is met throughout, providing end-to-end workflow validation. This approach allows dynamic changes in code, workflow parameters, and artifacts while continuously monitoring and ensuring compliance across the entire digital thread, as shown by the digital thread 792 in FIG. 7C. Such automation of digital threads in the platform provides opportunities to both continuously assess workloads, compare against options and improve implementation using lower cost, or lower compute load or simpler approaches. These can contribute to a continuous improvement loop for cost savings or carbon emission savings using the digital platform.

CC is an automated approach within the digital platform that ensures digital threads and workflows adhere to verification and validation (V&V) requirements throughout their lifecycle. Users can extract model artifacts and operational data from the digital platform to create digital threads that compute compliance in real-time. This provides traceability, prevents errors from propagating downstream, and enables rapid resolution of issues. As depicted in FIGS. 5 and 7A-7C, a digital thread visualized as a network of task nodes can be assisted by AI models, which generate function scripts for individual tasks. These scripts may derive digital artifacts, and corresponding unit tests can validate compliance against specific requirements. A successful unit test validates the digital artifact derived by the function script. In some embodiments, AI models can also assist with generating the relevant unit tests for digital thread scripts. The unit testing result then cascades through subsequent steps, ensuring continuous compliance across the entire digital thread.

In a manner similar to software Continuous Integration and Continuous Deployment (CI/CD) processes, CC ensures that any changes in a digital thread are automatically checked against compliance metrics. This enables rapid iteration and minimizes non-compliance risks during updates. In some embodiments, CC operates as "compliance as code," applicable to regulatory or hardware specification compliance. Thus, unit-test-driven CC functions throughout the lifecycle of the digital thread, adjusting to changes in workflow parameters, steps, or artifacts, and ensuring compliance in real-time.

Figure 18:
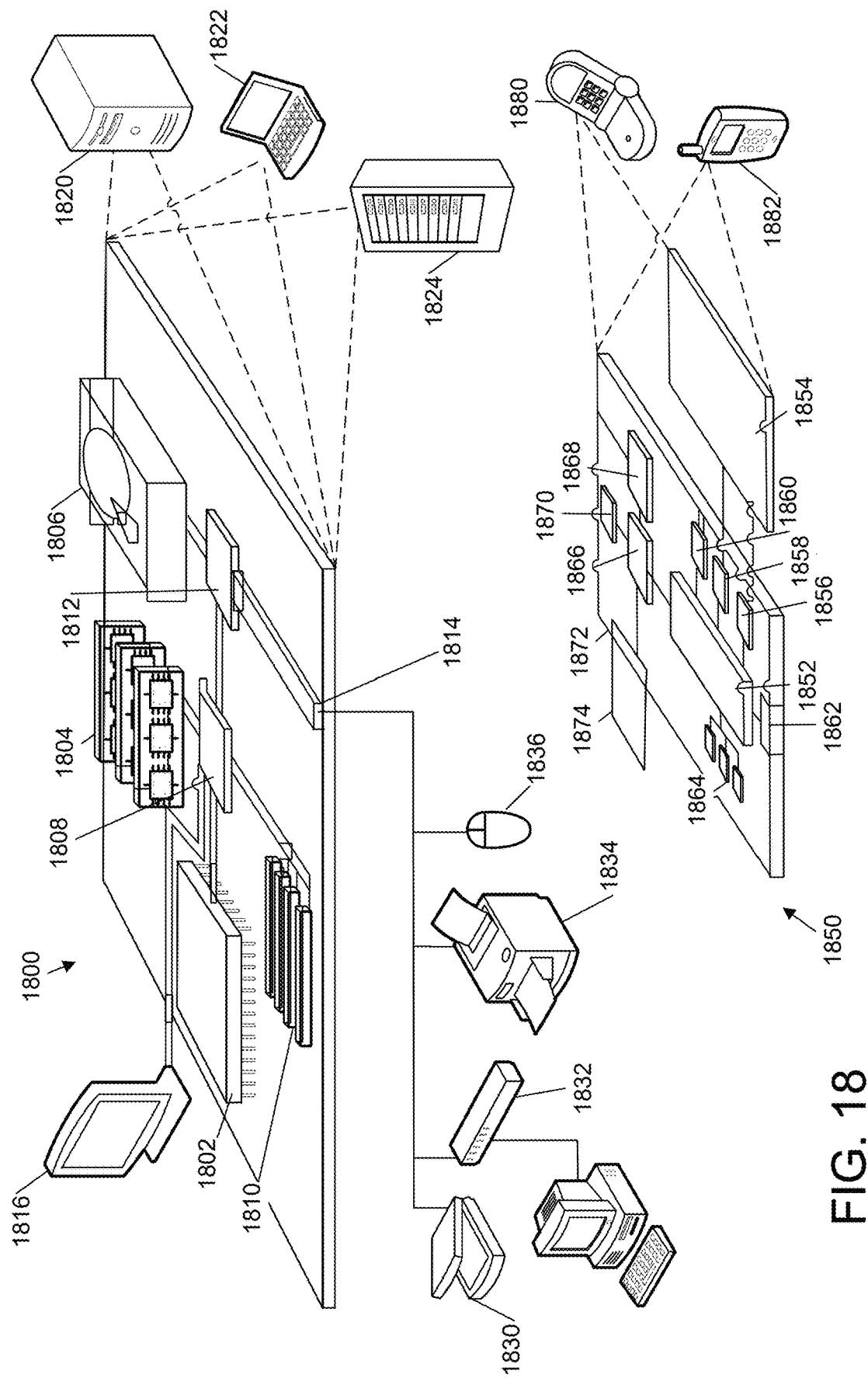
FIG. 18 is a diagram illustrating an example of a computing environment.

FIG. 18 shows an example of a computing device 1800 and a mobile computing device 1850 that are employed to execute implementations of the present disclosure. The computing device 1800 is intended to represent various forms of digital computers, such as laptops, desktops, workstations, personal digital assistants, servers, blade servers, mainframes, and other appropriate computers. The mobile computing device 1850 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting. The computing device 1800 and/or the mobile computing device 1850 can form at least a portion of the user device 106A or API 106B and the computing system 108 described above. As described previously, in some implementations, the computing system 108 can be a distributed computing system that includes multiple computing devices such as the computing device 1800 and/or the mobile computing device 1850. In other implementations the computing system 108 can comprise a single computing device. In some implementations, the API 106B can be implemented on the computing device 1800 and/or the mobile computing device 1850 to relay a digital computer file to a non-human, artificial user 104B (e.g., an artificial intelligence and/or an algorithmic user), which may itself be implemented on the computing device 1800 and/or the mobile computing device 1850 (or on a separate instance of the computing device 1800 and/or the mobile computing device 1850).

The computing device 1800 includes a processor 1802, a memory 1804, a storage device 1806, a high-speed interface 1808, and a low-speed interface 1812. In some implementations, the high-speed interface 2608 connects to the memory 2604 and multiple high-speed expansion ports 1810. In some implementations, the low-speed interface 1812 connects to a low-speed expansion port 1814 and the storage device 1806. Each of the processor 1802, the memory 1804, the storage device 1806, the high-speed interface 1808, the high-speed expansion ports 1810, and the low-speed interface 1812, are interconnected using various buses, and may be mounted on a common motherboard or in other manners as appropriate. The processor 1802 can process instructions for execution within the computing device 1800, including instructions stored in the memory 1804 and/or on the storage device 1806 to display graphical information for a graphical user interface (GUI) on an external input/output device, such as a display 1816 coupled to the high-speed interface 1808. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 1804 stores information within the computing device 1800. In some implementations, the memory 1804 is a volatile memory unit or units. In some implementations, the memory 1804 is a non-volatile memory unit or units. The memory 1804 may also be another form of a computer-readable medium, such as a magnetic or optical disk.

The storage device 1806 is capable of providing mass storage for the computing device 1800. In some implementations, the storage device 1806 may be or include a computer-readable medium, such as a floppy disk device, a hard disk device, an optical disk device, a tape device, a flash memory, or other similar solid-state memory device, or an array of devices including devices in a storage area network or other configurations. Instructions can be stored in an information carrier. The instructions, when executed by one or more processing devices, such as processor 1802, perform one or more methods, such as those described above. The instructions can also be stored by one or more storage devices, such as computer-readable or machine-readable mediums, such as the memory 1804, the storage device 1806, or memory on the processor 1802.

The high-speed interface 1808 manages bandwidth-intensive operations for the computing device 1800, while the low-speed interface 1812 manages lower bandwidth-intensive operations. Such allocation of functions is an example only. In some implementations, the high-speed interface 1808 is coupled to the memory 1804, the display 1816 (e.g., through a graphics processor or accelerator), and the high-speed expansion ports 1810, which may accept various expansion cards. In the implementation, the low-speed interface 1812 is coupled to the storage device 1806 and the low-speed expansion port 1814. The low-speed expansion port 1814, which may include various communication ports (e.g., Universal Serial Bus (USB), Bluetooth, Ethernet, wireless Ethernet) may be coupled to one or more input/output devices. Such input/output devices may include a scanner 1830, a printing device 1834, or a keyboard or mouse 1836. The input/output devices may also be coupled to the low-speed expansion port 1814 through a network adapter 1832. Such network input/output devices may include, for example, a switch or router.

The computing device 1800 may be implemented in a number of different forms, as shown in FIG. 18. For example, it may be implemented as a standard server 1820, or multiple times in a group of such servers. In addition, it may be implemented in a personal computer such as a laptop computer 1822. It may also be implemented as part of a rack server system 1824, high performance computing enclave, or quantum and/or non-silicon based computing system. Alternatively, components from the computing device 1800 may be combined with other components in a mobile device, such as a mobile computing device 1850. Each of such devices may contain one or more of the computing device 1800 and the mobile computing device 1850, and an entire system may be made up of multiple computing devices communicating with each other.

The mobile computing device 1850 includes a processor 1852; a memory 1864; an input/output device, such as a display 1854; a communication interface 1866; and a transceiver 1868; among other components. The mobile computing device 1850 may also be provided with a storage device, such as a micro-drive or other device, to provide additional storage. Each of the processor 1852, the memory 1864, the display 1854, the communication interface 1866, and the transceiver 1868, are interconnected using various buses, and several of the components may be mounted on a common motherboard or in other manners as appropriate. In some implementations, the mobile computing device 1850 may include a camera device(s).

The processor 1852 can execute instructions within the mobile computing device 1850, including instructions stored in the memory 1864. The processor 1852 may be implemented as a chipset of chips that include separate and multiple analog and digital processors. For example, the processor 1852 may be a Complex Instruction Set Computers (CISC) processor, a Reduced Instruction Set Computer (RISC) processor, or a Minimal Instruction Set Computer (MISC) processor. The processor 1852 may provide, for example, for coordination of the other components of the mobile computing device 1850, such as control of user interfaces (UIs), applications run by the mobile computing device 1850, and/or wireless communication by the mobile computing device 1850.

The processor 1852 may communicate with a user through a control interface 1858 and a display interface 1856 coupled to the display 1854. The display 1854 may be, for example, a Thin-Film-Transistor Liquid Crystal Display (TFT LCD) display, an Organic Light Emitting Diode (OLED) display, or other appropriate display technology. The display interface 1856 may include appropriate circuitry for driving the display 1854 to present graphical and other information to a user. The control interface 1858 may receive commands from a user and convert them for submission to the processor 1852. In addition, an external interface 1862 may provide communication with the processor 1852, so as to enable near area communication of the mobile computing device 1850 with other devices. The external interface 1862 may provide, for example, for wired communication in some implementations, or for wireless communication in other implementations, and multiple interfaces may also be used.

The memory 1864 stores information within the mobile computing device 1850. The memory 1864 can be implemented as one or more of a computer-readable medium or media, a volatile memory unit or units, or a non-volatile memory unit or units. An expansion memory 1874 may also be provided and connected to the mobile computing device 1850 through an expansion interface 1872, which may include, for example, a Single in Line Memory Module (SIMM) card interface. The expansion memory 1874 may provide extra storage space for the mobile computing device 1850, or may also store applications or other information for the mobile computing device 1850. Specifically, the expansion memory 1874 may include instructions to carry out or supplement the processes described above, and may also include secure information. Thus, for example, the expansion memory 1874 may be provided as a security module for the mobile computing device 1850, and may be programmed with instructions that permit secure use of the mobile computing device 1850. In addition, secure applications may be provided via the SIM cards, along with additional information, such as placing identifying information on the SIM card in a non-hackable manner.

The memory may include, for example, flash memory, and/or non-volatile random access memory (NVRAM), as discussed below. In some implementations, instructions are stored in an information carrier. The instructions, when executed by one or more processing devices, such as processor 1852, perform one or more methods, such as those described above. The instructions can also be stored by one or more storage devices, such as one or more computer-readable or machine-readable mediums, such as the memory 1864, the expansion memory 1874, or memory on the processor 1852. In some implementations, the instructions can be received in a propagated signal, such as over the transceiver 1868 or the external interface 1862.

The mobile computing device 1850 may communicate wirelessly through the communication interface 1866, which may include digital signal processing circuitry where necessary. The communication interface 1866 may provide for communications under various modes or protocols, such as Global System for Mobile (GSM) communications voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, or General Packet Radio Service (GPRS). Such communication may occur, for example, through the transceiver 1868 using a radio frequency. In addition, short-range communication, such as using Bluetooth or Wi-Fi, may occur. In addition, a Global Positioning System (GPS) receiver module 1870 may provide additional navigation- and location-related wireless data to the mobile computing device 1850, which may be used as appropriate by applications running on the mobile computing device 1850.

The mobile computing device 1850 may also communicate audibly using an audio codec 1860, which may receive spoken information from a user and convert it to usable digital information. The audio codec 1860 may likewise generate audible sound for a user, such as through a speaker (e.g., in a handset of the mobile computing device 1850). Such sound may include sound from voice telephone calls, may include recorded sound (e.g., voice messages, music files, etc.), and may also include sound generated by applications operating on the mobile computing device 1850.

The mobile computing device 1850 may be implemented in a number of different forms, as shown in FIG. 18. For example, it may be implemented as a phone device 1880, a personal digital assistant 1882, and/or a tablet device (not shown). The mobile computing device 1850 may also be implemented as a component of a smart-phone, AR device, or other similar mobile device.

Computing devices 1800 and/or 1850 can also include USB flash drives. The USB flash drives may store operating systems and other applications. The USB flash drives can include input/output components, such as a wireless transmitter or USB connector that may be inserted into a USB port of another computing device.

Other embodiments and applications not specifically described herein are also within the scope of the following claims. Elements of different implementations described herein may be combined to form other embodiments.

The invention claimed is:

1. A computer-implemented method comprising:
    receiving, from a client device in communication with a digital platform, a request to execute a task by the digital platform;
    assigning, by the digital platform, a token to the received request, wherein the token is configured to uniquely identify the received request to execute the task using the digital platform, wherein the token is an idempotency token configured to identify one or more tasks having operations common to an operation of the task for the received request;
    receiving, by the digital platform, a first value representing a baseline execution cost associated with executing the task;
    determining, using the assigned token and based on execution of the task using the digital platform, a second value representing a reduction in execution cost attained by using the digital platform;
    generating, based on a comparison of the second value to the first value, an attained execution reduction cost associated with the execution of the task by the digital platform;
    identifying one or more tasks each having an operation common to an operation of the task for the received request; and
    executing, by the digital platform, the operation of the identified one or more tasks that is common to the operation of the task for the received request to reduce execution redundancy by the digital platform.

2. The computer-implemented method of claim 1, further comprising:
    determining the second value representing the reduced execution cost attained by using the digital platform based on the execution of the operation of the identified one or more tasks that is common to the operations of the task for the received request.

3. The computer-implemented method of claim 1, further comprising:
    generating, based on the attained execution reduction cost associated with the execution of the task by the digital platform, a certified carbon credit; and
    providing the certified carbon credit to a computing device in communication with the digital platform.

4. The computer-implemented method of claim 1, wherein the task is one or more of (i) an inference task, or (ii) a training task, of a digital model, and wherein the digital platform is configured to monitor execution of the task for a period of time.

5. The computer-implemented method of claim 4, wherein the digital model is one or more of (i) a machine learning model, or (ii) a model configured to apply artificial intelligence techniques.

6. The computer-implemented method of claim 1, further comprising:
    generating, based on the request to execute the task, a digital thread of the digital platform, wherein the digital thread comprises a plurality of connected modules.

7. The computer-implemented method of claim 6, further comprising:
    monitoring, by the digital platform, an update to a module from the plurality of connected modules of the digital thread; and
    determining, based on the update to the module, a cost impact to one or more other modules from the plurality of connected modules of the digital thread.

8. The computer-implemented method of claim 7, wherein the token is configured to:
    collect data related to one or both of (i) the update to the module, or (ii) the cost impact to the one or more other modules; and
    determine, based on the collected data, a third value representing an additional reduction in execution cost attained by using the digital platform.

9. The computer-implemented method of claim 1, wherein the digital platform is configured to utilize an engine configured to determine a cost associated with performing a workflow by the digital platform, wherein determining the cost comprises applying at least one of (i) machine learning or (ii) artificial intelligence techniques, to data related to the execution of the task collected by the token.

10. The computer-implemented method of claim 1, wherein the token that uniquely identifies the received request comprises a unique identifier for monitoring the task by the digital platform.

11. The computer-implemented method of claim 1, wherein the attained execution reduction cost is (i) a computational processing cost, or (ii) an amount of carbon emissions reduced.

12. The computer-implemented method of claim 1, further comprising:
    in response to receiving the request to execute the task using the digital platform, selecting, a set of tools for executing the task using the digital platform;
    generating, by the digital platform, a set of tokens for the execution of the task on the digital platform, wherein each token of the set of tokens comprises data that identifies the selected tool for the set of tools;
    associating, by the digital platform, the token for the received request to the set of tokens for the execution of the task using the digital platform; and
    determining, by the set of tokens, the attained execution reduction cost associated with the execution of the task on the digital platform.

13. The computer-implemented method of claim 12, wherein selecting the tool for executing the task by the digital platform comprises:

identifying, by the digital platform and from a tools database, a set of tools;

for each tool of the set of tools, identifying by the digital platform, a cost associated with performing the execution of the task using the tool, wherein the cost is at least one of (i) an amount of carbon emissions, or (ii) a computational load of the digital platform; and selecting, by the digital platform, the tool whose cost associated with performing the execution of the task by the digital platform satisfies a threshold value.

14. The computer-implemented method of claim 1, further comprising:

generating, using the digital platform and for a plurality of tasks, a plurality of values corresponding to the plurality of tasks, each of the plurality of values representing an attained execution reduction cost associated with the execution by the digital platform of the respective task from the plurality of tasks.

15. A system, comprising:

one or more computers and one or more storage devices storing instructions that are operable, when executed by the one or more computers, to cause the one or more computers to perform operations comprising:

receiving, from a client device in communication with a digital platform, a request to execute a task by the digital platform;

assigning, by the digital platform, a token to the received request, wherein the token is configured to uniquely identify the received request to execute the task using the digital platform, wherein the token is an idempotency token configured to identify one or more tasks having operations common to an operation of the task for the received request;

receiving, by the digital platform, a first value representing a baseline execution cost associated with executing the task;

determining, using the assigned token and based on execution of the task using the digital platform, a second value representing a reduction in execution cost attained by using the digital platform;

generating, based on a comparison of the second value to the first value, an attained execution reduction cost associated with the execution of the task by the digital platform;

identifying one or more tasks each having an operation common to an operation of the task for the received request; and executing, by the digital platform, the operation of the identified one or more tasks that is common to the operation of the task for the received request to reduce execution redundancy by the digital platform.

16. The system of claim 15, wherein the digital platform is configured to utilize an engine configured to determine a cost associated with performing a workflow by the digital platform, wherein determining the cost comprises applying at least one of (i) machine learning or (ii) artificial intelligence techniques, to data related to the execution of the task collected by the token.

17. The system of claim 15, the operations further comprising:

generating, based on the request to execute the task, a digital thread of the digital platform, wherein the digital thread comprises a plurality of connected modules.

18. The system of claim 17, the operations further comprising:

monitoring, by the digital platform, an update to a module from the plurality of connected modules of the digital thread; and determining, based on the update to the module, a cost impact to one or more other modules from the plurality of connected modules of the digital thread.

19. The system of claim 18, wherein the token is configured to:

collect data related to one or both of (i) the update to the module, or (ii) the cost impact to the one or more other modules; and determine, based on the collected data, a third value representing an additional reduction in execution cost attained by using the digital platform.

20. The system of claim 15, wherein the task is one or more of (i) an inference task, or (ii) a training task, of a digital model, and wherein the digital platform is configured to monitor execution of the task for a period of time.

21. The system of claim 15, the operations further comprising:

generating, based on the attained execution reduction cost associated with the execution of the task by the digital platform, a certified carbon credit; and providing the certified carbon credit to a computing device in communication with the digital platform.

22. A non-transitory computer-readable medium storing software comprising instructions executable by one or more computers which, upon such execution, cause the one or more computers to perform operations comprising:

receiving, from a client device in communication with a digital platform, a request to execute a task by the digital platform;

assigning, by the digital platform, a token to the received request, wherein the token is configured to uniquely identify the received request to execute the task using the digital platform, wherein the token is an idempotency token configured to identify one or more tasks having operations common to an operation of the task for the received request;

receiving, by the digital platform, a first value representing a baseline execution cost associated with executing the task;

determining, using the assigned token and based on execution of the task using the digital platform, a second value representing a reduction in execution cost attained by using the digital platform;

generating, based on a comparison of the second value to the first value, an attained execution reduction cost associated with the execution of the task by the digital platform;

identifying one or more tasks each having an operation common to an operation of the task for the received request; and executing, by the digital platform, the operation of the identified one or more tasks that is common to the operation of the task for the received request to reduce execution redundancy by the digital platform.

23. The non-transitory computer-readable medium of claim 22, wherein the digital platform is configured to utilize an engine configured to determine a cost associated with performing a workflow by the digital platform, wherein determining the cost comprises applying at least one of (i) machine learning or (ii) artificial intelligence techniques, to data related to the execution of the task collected by the token.

24. The non-transitory computer-readable medium of claim 22, the operations further comprising:
   generating, based on the request to execute the task, a digital thread of the digital platform, wherein the digital thread comprises a plurality of connected modules.

25. The non-transitory computer-readable medium of claim 24, the operations further comprising:
   monitoring, by the digital platform, an update to a module from the plurality of connected modules of the digital thread; and
   determining, based on the update to the module, a cost impact to one or more other modules from the plurality of connected modules of the digital thread.

26. The non-transitory computer-readable medium of claim 25, wherein the token is configured to:
   collect data related to one or both of (i) the update to the module, or (ii) the cost impact to the one or more other modules; and
   determine, based on the collected data, a third value representing an additional reduction in execution cost attained by using the digital platform.

27. The non-transitory computer-readable medium of claim 22, wherein the task is one or more of (i) an inference task, or (ii) a training task, of a digital model, and wherein the digital platform is configured to monitor execution of the task for a period of time.

28. The non-transitory computer-readable medium of claim 22, the operations further comprising:
   generating, based on the attained execution reduction cost associated with the execution of the task by the digital platform, a certified carbon credit; and
   providing the certified carbon credit to a computing device in communication with the digital platform.

* * * * *